(12) United States Patent
Okamura et al.

(10) Patent No.: US 12,334,042 B2
(45) Date of Patent: *Jun. 17, 2025

(54) ELECTRONIC DEVICE, DATA USAGE METHOD, AND RECORDING MEDIUM

(71) Applicant: Roland Corporation, Shizuoka (JP)

(72) Inventors: Hiroshi Okamura, Shizuoka (JP); Akihiro Nagata, Shizuoka (JP); Tokio Takahashi, Shizuoka (JP); Yusuke Miyama, Shizuoka (JP); Ichiro Yazawa, Shizuoka (JP)

(73) Assignee: Roland Corporation, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,588

(22) Filed: Oct. 21, 2022

(65) Prior Publication Data

US 2023/0147370 A1 May 11, 2023

(30) Foreign Application Priority Data

Nov. 9, 2021 (JP) .................................. 2021-182814

(51) Int. Cl.
*G10H 1/00* (2006.01)
*H04L 65/1063* (2022.01)

(52) U.S. Cl.
CPC ....... *G10H 1/0083* (2013.01); *H04L 65/1063* (2013.01); *G10H 2240/165* (2013.01); *G10H 2240/211* (2013.01); *G10H 2240/285* (2013.01)

(58) Field of Classification Search
CPC .................................................. H04L 65/1063
See application file for complete search history.

(56) References Cited

U.S. PATENT DOCUMENTS

| | | |
|---|---|---|
| 5,892,171 A | 4/1999 | Ide |
| 7,944,577 B2 | 5/2011 | Chang et al. |
| 8,028,323 B2 | 9/2011 | Weel |
| 8,214,873 B2 | 7/2012 | Weel |
| 8,314,319 B2 | 11/2012 | Yokoyama et al. |
| 8,671,195 B2 | 3/2014 | Rothschild |
| 9,300,723 B2 | 3/2016 | Rothschild |

(Continued)

FOREIGN PATENT DOCUMENTS

| | | | | |
|---|---|---|---|---|
| EP | 1715437 A2 | * | 10/2006 | ............. G06F 21/62 |
| JP | 2009180757 | | 8/2009 | |

(Continued)

OTHER PUBLICATIONS

"Office Action of U.S. Related Application, U.S. Appl. No. 17/888,493", issued on Jun. 30, 2023, p. 1-p. 15.

(Continued)

*Primary Examiner* — Nicholas P Celani
(74) *Attorney, Agent, or Firm* — JCIPRNET

(57) ABSTRACT

An electronic device and a data usage method are provided. An electronic musical instrument confirms whether respective sound data stored in a timbre memory or a wave memory can be used or cannot be used based on management information acquired from a server. A sound data determined to be usable in the management information is validated so that it can be used for loading or writing. On the other hand, a sound data determined to be unusable in the management information is invalidated so that it cannot be used.

13 Claims, 36 Drawing Sheets

(56) References Cited

U.S. PATENT DOCUMENTS

| | | |
|---|---|---|
| 9,516,370 B1 | 12/2016 | Weel |
| 9,554,405 B2 | 1/2017 | Weel |
| 9,965,233 B2 | 5/2018 | Chang et al. |
| 9,967,248 B1 | 5/2018 | Cheng et al. |
| 10,140,073 B2 | 11/2018 | Chang et al. |
| 10,925,118 B1 | 2/2021 | Lin |
| 11,966,656 B2 | 4/2024 | Miyama et al. |
| 2003/0024376 A1 | 2/2003 | Gyoten et al. |
| 2003/0131719 A1 | 7/2003 | Kubita |
| 2005/0044016 A1* | 2/2005 | Irwin ............... G06Q 20/3672 705/30 |
| 2005/0114896 A1* | 5/2005 | Hug ............... H04N 21/25816 725/90 |
| 2005/0273399 A1 | 12/2005 | Soma et al. |
| 2006/0124735 A1 | 6/2006 | Mizuno et al. |
| 2007/0180496 A1 | 8/2007 | Fransdonk |
| 2008/0109362 A1 | 5/2008 | Fransdonk |
| 2008/0307237 A1* | 12/2008 | Holtzman ............ H04L 9/3297 713/193 |
| 2009/0007240 A1 | 1/2009 | Vantalon et al. |
| 2009/0019993 A1* | 1/2009 | Mizuhiki ............ G10H 1/0075 84/604 |
| 2010/0077907 A1 | 4/2010 | Tanaka et al. |
| 2011/0290098 A1 | 12/2011 | Thuillier |
| 2013/0325854 A1 | 12/2013 | Umeda |
| 2015/0141143 A1 | 5/2015 | Gordon et al. |
| 2015/0143978 A1 | 5/2015 | Oh et al. |
| 2015/0206521 A1 | 7/2015 | Sexton et al. |
| 2015/0304434 A1 | 10/2015 | Matsumoto |
| 2016/0026702 A1 | 1/2016 | McGregor et al. |
| 2016/0140440 A1 | 5/2016 | Hsueh et al. |
| 2017/0047057 A1 | 2/2017 | Kim et al. |
| 2018/0233119 A1 | 8/2018 | Patti et al. |
| 2019/0387051 A1 | 12/2019 | Chen et al. |
| 2021/0110004 A1 | 4/2021 | Ross et al. |
| 2021/0349969 A1 | 11/2021 | Miyama |
| 2022/0070074 A1 | 3/2022 | Kodama et al. |
| 2022/0232108 A1 | 7/2022 | Turner et al. |
| 2022/0239269 A1 | 7/2022 | Min et al. |
| 2022/0350765 A1 | 11/2022 | Ballard et al. |
| 2023/0143525 A1* | 5/2023 | Nagata ............... H04L 63/0853 726/9 |

FOREIGN PATENT DOCUMENTS

| | | |
|---|---|---|
| JP | 2018004744 | 1/2018 |
| JP | 2020082550 | 6/2020 |
| JP | 2021177219 | 11/2021 |
| WO | 2004017664 | 2/2004 |

OTHER PUBLICATIONS

"Office Action of U.S. Appl. No. 17/888,490", issued on Apr. 30, 2024, pp. 1-16.

"Office Action of U.S. Appl. No. 17/888,490", issued on Jul. 16, 2024, pp. 1-19.

"Office Action of U.S. Appl. No. 17/964,922", issued on Sep. 20, 2024, pp. 1-51.

"Office Action of U.S. Appl. No. 18/583,870", issued on Sep. 26, 2024, pp. 1-33.

"Office Action of U.S. Appl. No. 17/961,547", issued on Nov. 7, 2024, pp. 1-74.

"Office Action of U.S. Appl. No. 17/888,490", issued on Dec. 10, 2024, pp. 1-35.

"Office Action of U.S. Appl. No. 18/583,870", issued on Mar. 6, 2025, pp. 1-23.

"Office Action of U.S. Appl. No. 17/888,490", issued on Mar. 11, 2025, pp. 1-11.

"Office Action of U.S. Appl. No. 17/964,922", issued on Apr. 17, 2025, pp. 1-42.

"Advisory Action of U.S. Appl. No. 17/888,490", issued on May 14, 2025, pp. 1-2.

* cited by examiner

User DB 72b

| No. | Account | Password | User identifier |
|---|---|---|---|
| 1 | ABC@PPP.com | ******** | AAAA |
| 2 | DEF@PPP.com | ******** | AAAB |
| : | : | : | : |

FIG. 12A

User DB 72c

| NO. | Device identifier | Product info | User identifier |
|---|---|---|---|
| 1 | 0001 | p0001 | AAAA |
| 2 | 0002 | p0002 | AAAB |
| : | : | : | : |
| 100 | 0100 | – | – |
| : | : | : | : |

FIG. 12B

Sync data 72e

| No. | User identifier | Device identifier | Identifier of data | Attribute information of data |
|---|---|---|---|---|
| 1 | AAAA | 0001 | SD_A | P_SD_A |
| 2 | | | WV_D | P_WV_D |
| : | | | : | : |
| 20 | AAAB | 0021 | SD_C | P_SD_C |
| 21 | | | WV_G | P_WV_G |
| : | | | : | : |
| 25 | | 0023 | SD_B | P_SD_B |
| : | | | : | : |
| : | | : | : | : |

FIG. 12C

Load history 72f

| No. | User identifier | Identifier of timbre data | Load count |
|---|---|---|---|
| 1 | AAAA | SD_A | 10 |
| 2 | | SD_B | 12 |
| : | | : | : |
| 20 | AAAB | SD_A | 29 |
| : | : | : | : |

FIG. 12D

ELECTRONIC DEVICE, DATA USAGE METHOD, AND RECORDING MEDIUM

CROSS-REFERENCE TO RELATED APPLICATION

This application claims the priority benefit of Japan application serial no. 2021-182814, filed on Nov. 9, 2021. The entirety of the above-mentioned patent application is hereby incorporated by reference herein and made a part of this specification.

BACKGROUND

Technical Field

The disclosure relates to an electronic device, a data usage method, and a recording medium.

Related Art

Patent Document 1 (Japanese Patent Application Laid-open No. 2021-177219) discloses a PC 30 which puts on a performance using permanent-type sound data permitted to be used permanently upon purchase of a user, and subscription-type sound data permitted to be used within a predetermined period upon purchase of the user.

However, in an electronic musical instrument 50 of Patent Document 1, while the permanent-type sound data can be used, the subscription-type sound data cannot be used. As a result, since the sound data that can be used in the electronic musical instrument 50 are limited, there is an increasing demand to use the subscription-type sound data also in the electronic musical instrument 50.

SUMMARY

An electronic device according to an embodiment of the disclosure is an electronic device connected to a server which stores, for each user, management information related to allowability of use of data of a subscription type permitted to be used within a predetermined period, and the electronic device includes a data storage means, a confirmation means, and a permission means. The data storage means stores the data. The confirmation means confirms, with the server, management information of a user of the electronic device. The permission means permits using, in the electronic device, data deemed usable in the management information confirmed by the confirmation means, among data of the subscription type stored in the data storage means.

A data usage method according to an embodiment of the disclosure is a data usage method executed in an electronic device connected to a server which stores, for each user, management information related to allowability of use of data of a subscription type permitted to be used within a predetermined period, and the data usage method includes the following steps. Management information of a user of the electronic device is confirmed with the server. It is permitted to use, in the electronic device, data deemed usable in the confirmed management information, among data of the subscription type stored in the electronic device.

BRIEF DESCRIPTION OF THE DRAWINGS

FIG. 12A schematically illustrates a user database (DB). FIG. 12B schematically illustrates a device DB. FIG. 12C is schematically illustrates sync data. FIG. 12D schematically illustrates a load history.

DESCRIPTION OF THE EMBODIMENTS

Embodiments of the disclosure provide an electronic device and a data usage method capable of using subscription-type data.

Figure 1A:
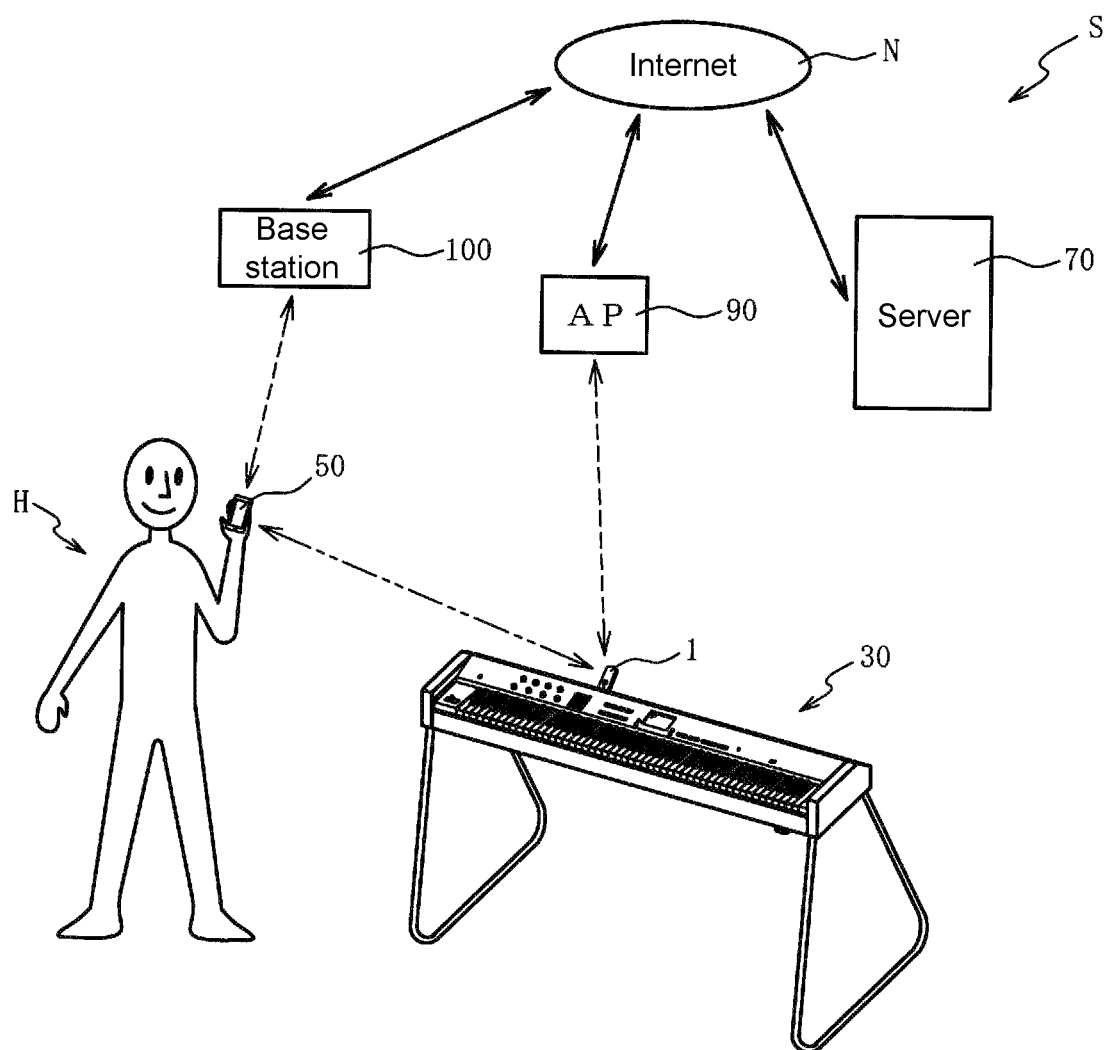
FIG. 1A illustrates an outline of a communication system.
Figure 1B:
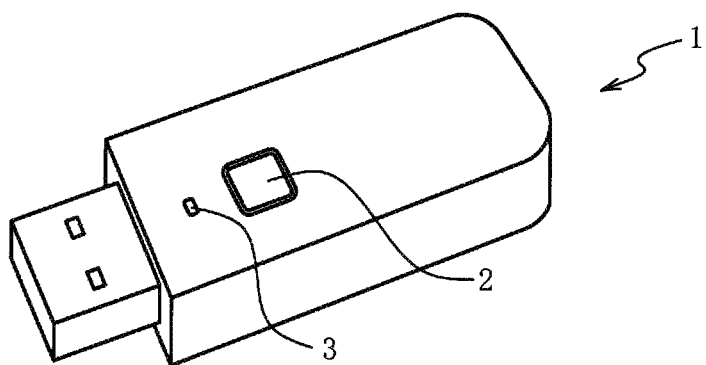
FIG. 1B illustrates an appearance of a communication device.

Hereinafter, exemplary embodiments will be described with reference to the accompanying drawings. An outline of a communication system S of the present embodiment will be described with reference to FIG. 1A and FIG. 1B. FIG. 1A illustrates the outline of the communication system S, and FIG. 1B illustrates an appearance of a communication device 1. As shown in FIG. 1A, the communication system S includes an electronic musical instrument 30, a mobile terminal 50, and a server 70. The electronic musical instrument 30 is connected to an access point (AP) 90 by wireless communication by Wi-Fi®, and is connected to the Internet N from the AP 90. The mobile terminal 50 is connected to a base station 100, and is connected to the Internet N from the base station 100. Since the server 70 is also connected to the Internet N, the electronic musical instrument 30 and the server 70 as well as the mobile terminal 50 and the server 70 are configured to be mutually communicable via the Internet N. Accordingly, information can be exchanged between the electronic musical instrument 30 and the mobile terminal 50 via the server 70.

The electronic musical instrument 30 is a device (electronic device) that produces a musical tone based on a performance of a user H. The electronic musical instrument 30 is provided with timbre data having information about timbre and wave data, and a timbre according to selection of the user H is acquired from the timbre data and the wave data and outputted as a musical tone. The timbre data and the wave data may be built in the electronic musical instrument 30 at the time of factory shipment, and may also be acquired from the server 70 via the Internet N. Next, communication by the electronic musical instrument 30 like this with an external device such as the server 70 will be described.

The communication device 1 is connected to the electronic musical instrument 30. The communication device 1 is a device that communicates with the external device by Wi-Fi or Bluetooth®, and is detachably connected to the electronic musical instrument 30 via USB®. The data inputted from the electronic musical instrument 30 to the communication device 1 via USB is transmitted to the external device via Wi-Fi or Bluetooth. On the other hand, the data received by the communication device 1 from the external device via Wi-Fi or Bluetooth is inputted to the electronic musical instrument 30 via USB. As shown in FIG. 1B, the communication device 1 is provided with an operation button 2 for inputting an instruction from the user H, and an LED 3. An operation state of the communication device 1 is notified to the user H by a lighting state or blinking state of the LED 3.

The communication device 1 is connected to the AP 90 by Wi-Fi communication, and is connected to the Internet N via the AP 90. Since the server 70 is connected to the Internet N, the electronic musical instrument 30 is able to communicate with the server 70 via the communication device 1.

The mobile terminal 50 is an information processing device (computer) that performs a processing according to the instruction inputted from the user H. The mobile terminal 50 is configured to be able to acquire the timbre data from the server 70 to the electronic musical instrument 30 in response to the instruction from the user H, and details thereof will be described later. In the mobile terminal 50, the timbre data stored on the server 70 can also be acquired via the Internet N and utilized.

The server 70 is an information processing device that stores timbre data, wave data, etc. to be used in the electronic musical instrument 30 and the mobile terminal 50. The timbre data are data composed of a plurality of variable values (attack, decay, cutoff, etc.) related to the timbre. The wave data are digitally converted from basic waveforms such as sine waves, square waves, triangular waves, saw-toothed waves, and sound waveforms of acoustic instruments collected by a microphone. Based on the wave data selected by the user H as an original sound, the electronic musical instrument 30 processes the sound according to each variable value set in the timbre data similarly selected by the user H and produces a sound of the processed timbre.

In addition to the timbre data and the wave data, the server 70 also stores musical score data or the like to be utilized by the electronic musical instrument 30 or the mobile terminal 50. Hereinafter, data such as the timbre data stored on the server 70 that can be utilized by the electronic musical instrument 30 or the mobile terminal 50 will be referred to as "resources".

When connecting the communication device 1 to the AP 90, it is necessary to set information about the AP 90 to be connected and a password for connecting to the AP 90 in the communication device 1. Since the communication device 1 and the electronic musical instrument 30 to which the communication device 1 is connected are only provided with a display device having the minimum necessary display capability or input capability, it is difficult for the user H to input the information about the AP 90 and the password of the AP 90 by the communication device 1 and the electronic musical instrument 30.

In the present embodiment, in the mobile terminal 50, a list of APs 90 searched by the communication device 1 is displayed, and the user H selects one AP 90 from the displayed list and inputs the password for connecting to the AP 90. The information about the selected AP 90 and the inputted password are transmitted to the communication device 1, and the communication device 1 performs connection to the AP 90 by using the received information about the AP 90 and the received password of the AP 90. Accordingly, since there is no need for the user H to input the information about the AP 90 or the password of the AP 90 by the communication device 1 and the electronic musical instrument 30, time and effort in connecting the communication device 1 and the electronic musical instrument 30 to the AP 90 can be reduced.

Figure 2:
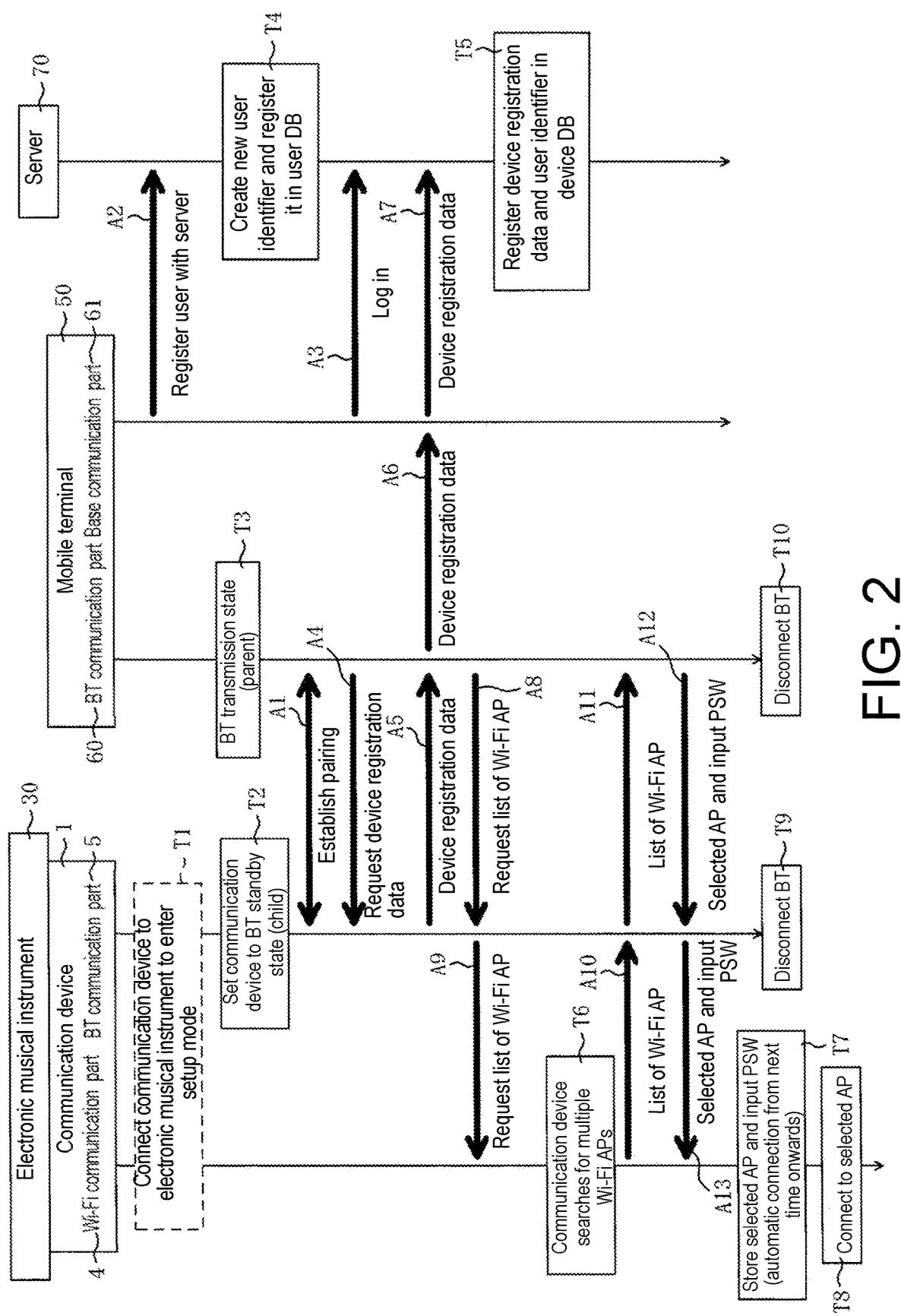
FIG. 2 illustrates communication performed by a communication device, an electronic musical instrument, a mobile terminal, and a server in a setup mode.
Figure 3:
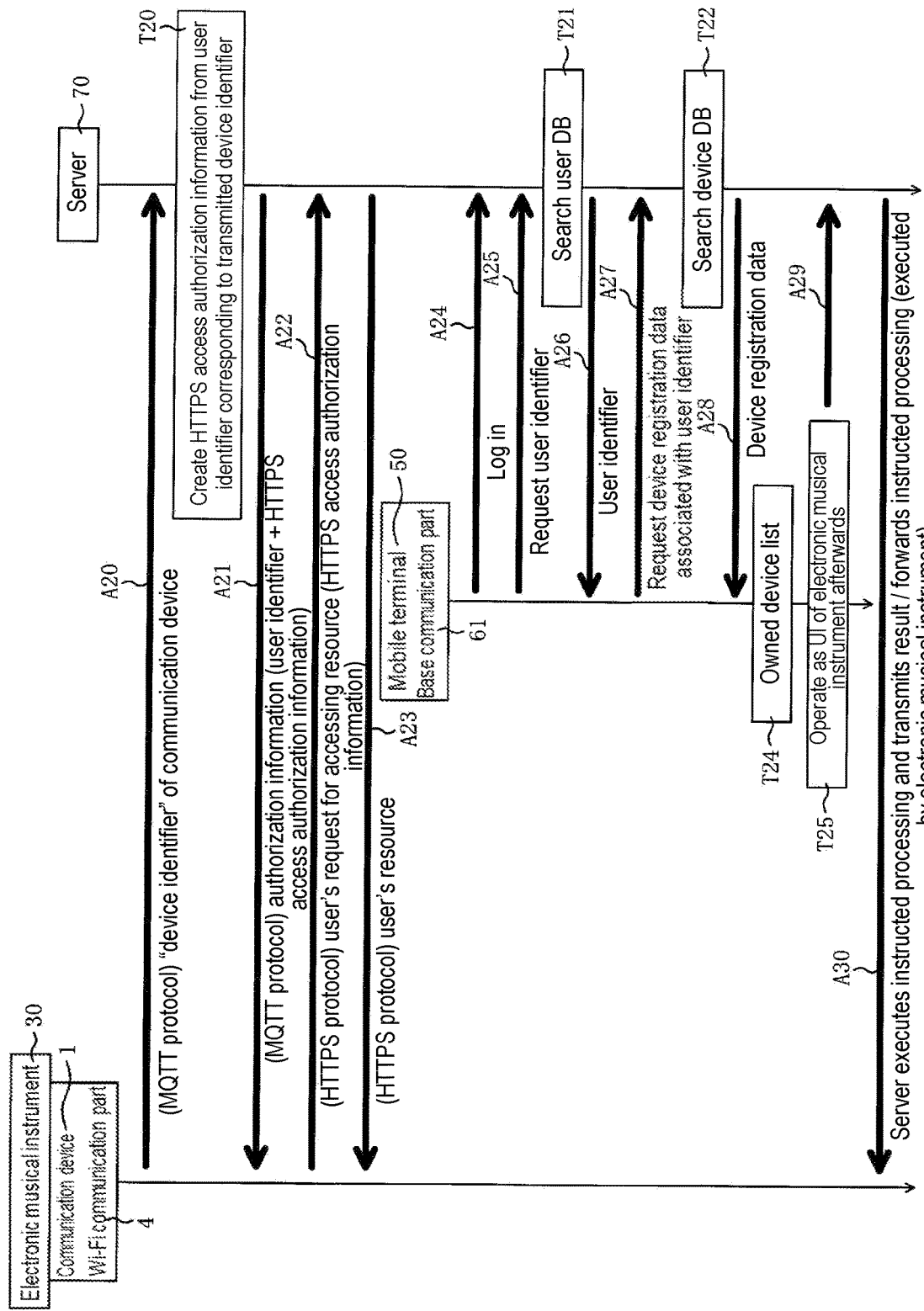
FIG. 3 illustrates communication performed by the communication device, the electronic musical instrument, the mobile terminal, and the server after the setup mode.

Next, communication performed by the communication device 1, the electronic musical instrument 30, the mobile terminal 50, and the server 70 will be described with reference to FIG. 2 and FIG. 3. FIG. 2 illustrates the communication performed by the communication device 1, the electronic musical instrument 30, the mobile terminal 50, and the server 70 in a setup mode. In the communication system S, in the case where an instruction for a setup mode is given from the user H to the communication device 1 via the operation button 2, connection to each of the communication device 1, the electronic musical instrument 30, the mobile terminal 50, and the server 70 is performed.

Among them, the communication device 1 is provided with a Wi-Fi communication part 4 that performs communication by Wi-Fi and a BT communication part 5 that performs communication by Bluetooth. The mobile terminal 50 is provided with a BT communication part 60 that performs communication by Bluetooth and a base communication part 61 that communicates with a mobile phone base station 100 (hereinafter abbreviated as "base station 100").

The setup mode is a mode for the communication device 1 to acquire from the mobile terminal 50 the information about the AP 90 (one selected as a connection destination by the user H) to be connected by Wi-Fi in order to connect the communication device 1 to the AP 90. In the setup mode, reception of the information about the AP 90 from the mobile terminal 50 to the communication device 1 is performed by Bluetooth via the BT communication part 5. In the setup mode, the communication of the information about the AP 90 is not necessarily performed by Bluetooth but may also be performed by other short-range wireless communication standards such as ZigBee®.

First, in the case where the communication device 1 is inserted into the electronic musical instrument 30 and the operation button 2 of the communication device 1 is pressed and held (e.g., the operation button 2 is continuously pressed for 5 seconds), the communication device 1 shifts to the setup mode (T1). The user H may be notified that the communication device 1 is in the setup mode by blinking the LED 3 at intervals of a predetermined time (e.g., 0.5 seconds) during execution of the setup mode.

The instruction for the setup mode is not limited to the case where the operation button 2 is pressed and held, but it is also possible to shift to the setup mode in the case where the operation button 2 is pressed a predetermined number of times (e.g., three times) in succession. The shift to the setup mode is not necessarily performed by operating the operation button 2 of the communication device 1. For example, it is also possible to shift to the setup mode in response to an instruction from the electronic musical instrument 30 connected to the communication device 1.

In order to pair the communication device 1 that has shifted to the setup mode by the processing of T1 with the mobile terminal 50 by Bluetooth, the BT communication part 5 is set to a standby state, that is, a slave (child) state (T2). On the other hand, in the mobile terminal 50, in the case where the instruction for the setup mode is inputted to the mobile terminal 50, the BT communication part 60 is set to a transmission state, that is, a master (parent) state (T3). The mobile terminal 50 that has discovered the communication device 1 in the standby state by the processing of T3 establishes pairing with the communication device 1 (A1).

In the pairing between the communication device 1 and the mobile terminal 50 in the processings of T2 and T3, the communication device 1 is set to the standby state and the mobile terminal 50 is set to the transmission state. However, the disclosure is not limited thereto. The mobile terminal 50 may also be set to the standby state and the communication device 1 may also be set to the transmission state.

Herein, the mobile terminal 50 registers the user H with the server 70 via the base communication part 61 before the processings of T3 and A1 (A2). In response to such user registration, the server 70 creates a user identifier being an identifier unique to each user and registers the user identifier in a user DB 72b (see FIG. 12A) of the server 70 (T4). After the processing of T4, the mobile terminal 50 logs in to the server 70 by the user H (A3). At the time of login, hypertext transfer protocol secure (HTTPS) access authorization information is transmitted from the server 70 to the mobile terminal 50, and will be used for subsequent HTTPS protocol communication from the mobile terminal 50 to the server 70.

After the pairing by the processing of A1 is established, the mobile terminal 50 requests device registration data from the communication device 1 via the BT communication part 60 (A4). The device registration data is composed of a device identifier being an identifier uniquely set for each communication device 1 and product information indicating a product name or the like of the communication device 1. The device identifier of the communication device 1 like this is registered with the server 70 to be described later. Since the device identifier is uniquely set for each communication device 1, even if the user H owns multiple electronic musical instruments 30, by sharing and using one registered communication device 1 in the multiple electronic musical instruments 30, time and effort to register with the server 70 for each electronic musical instrument 30 can be saved.

The device identifier is not limited to an identifier unique to each communication device 1, but may also be an identifier that identifies the electronic musical instrument 30 connected to the communication device 1. In this case, the communication device 1 can uniquely identify the electronic musical instrument 30 by acquiring the identifier of the electronic musical instrument 30 from the electronic musical instrument 30 connected to the communication device 1.

In response to the request for device registration data by the processing of A4, the communication device 1 transmits the device registration data including its own device identifier and product information to the mobile terminal 50 via the BT communication part 5 (A5). The mobile terminal 50 that has received the device registration data of the communication device 1 by the processing of A5 transmits the device registration data to the server 70 via the base communication part 61 (A6, A7).

The server 70 registers the device registration data received by the processing of A7 in a device DB 72c (see FIG. 12B) together with the user identifier corresponding to the user H who has logged in by the above processing of A3 (T5). Thus, the user identifier of the logged-in user H and the device registration data of the communication device 1 connected to the electronic musical instrument 30 used by the user H are stored in association in the device DB 72c.

After transmission of the device registration data of the communication device 1 by the above processing of A5, in order to acquire the list of APs 90 searched by the communication device 1, the mobile terminal 50 requests the list of APs 90 from the communication device 1 via the BT communication part 60 (A8). The request for the list of APs 90 received by the BT communication part 5 of the communication device 1 by the processing of A8 is transmitted to the Wi-Fi communication part 4 (A9). The Wi-Fi communication part 4 that has received the request for the list of APs 90 by the processing of A9 searches for APs 90 capable of communication with the Wi-Fi communication part 4 and creates a list of APs 90 searched (T6).

The BT communication part 5 acquires the list of APs 90 created by the Wi-Fi communication part 4 by the processing of T6 (A10), and the list of APs 90 is transmitted to the mobile terminal 50 via the BT communication part 5 (A11). The mobile terminal 50 that has received the list of APs 90 by the processing of A11 displays the list of APs 90 and causes the user H to select one of the APs 90. Then, the selected AP 90 and the password (input PSW) for connecting to the AP 90 are acquired and transmitted to the communication device 1 via the BT communication part 60 (A12).

The communication device 1 that has received the selected AP 90 and the input PSW thereof by the processing of A12 transmits these pieces of information to the Wi-Fi communication part 4 (A13) and stores these pieces of information (T7). After the processing of T7, the Wi-Fi communication part 4 connects to the AP 90 in the received information by using the received input PSW (T8).

From this point on, or in the case where the communication system S does not shift to the setup mode, the communication device 1 is connected to the AP 90 using the information stored by the processing of T7. Accordingly, the communication device 1 and the electronic musical instrument 30 are connected to the AP 90 via the Wi-Fi communication part 4, and are able to communicate with the server 70 via the AP 90 and the Internet N.

In the BT communication part 5 of the communication device 1 and the BT communication part 60 of the mobile terminal 50, in the case where the transmission by the processing of A11 is completed, the Bluetooth communication is disconnected and the pairing is canceled (T9, T10). In the present embodiment, the device registration data is first registered with the server 70 by the processings of A4 to A7, and after that, the information about the AP 90 or the like is transmitted from the mobile terminal 50 to the communication device 1 by the processings of A8 to A13, T6, and T7. However, the disclosure is not limited thereto. The processings of A8 to A13, T6, and T7 may also be performed first, followed by the processings of A4 to A7, or the processings of A4 to A7 may also be performed in parallel with the processings of A8 to A13, T6, and T7.

As described above, in the setup mode, the information about the AP 90 connected by the Wi-Fi communication part 4 of the communication device 1 is transmitted from the mobile terminal 50 by Bluetooth communication. Accordingly, the AP 90 can be connected without inputting the information about the AP 90, i.e., the target AP 90 and the input PSW thereof, by the communication device 1 and the electronic musical instrument 30 that are more restricted as input devices as compared with the mobile terminal 50. Accordingly, the time and effort to be spent by the user H when connecting the communication device 1 and the electronic musical instrument 30 to the AP 90 can be reduced.

Herein, when the information about the AP is to be transmitted by Bluetooth communication, it is necessary to pair the BT communication part 5 of the communication device 1 with the BT communication part 60 of the mobile terminal 50. However, in such pairing, there is no need for the user H to input authentication information or the like. Thus, the time and effort to be spent by the user H when connecting the communication device 1 and the electronic musical instrument 30 to the AP 90 can be reduced.

When the pairing between the BT communication part 5 of the communication device 1 and the BT communication part 60 of the mobile terminal 50 is established, the device registration data of the communication device 1 is transmitted to the server 70 via the mobile terminal 50, and is registered in the device DB 72*c* together with the user identifier of the user H who has logged in to the server 70 from the mobile terminal 50. Accordingly, the device registration data of the communication device 1 can be reliably registered with the server 70 in association with the user identifier of the user H.

Based on the device registration data and the user identifier registered with the server 70 in this way, after the setup mode, resources stored on the server 70 can be accessed from the electronic musical instrument 30. Further, when the pairing between the BT communication part 5 of the communication device 1 and the BT communication part 60 of the mobile terminal 50 is established, since the device registration data of the communication device 1 is automatically transmitted to the server 70, the time and effort to be spent by the user H when registering the device registration data with the server 70 can be reduced.

Next, communication performed by the communication device 1, the electronic musical instrument 30, the mobile terminal 50, and the server 70 after the communication device 1 is connected to the AP 90 by the setup mode of FIG. 2 will be described. FIG. 3 illustrates the communication performed by the communication device 1, the electronic musical instrument 30, the mobile terminal 50, and the server 70 after the setup mode.

In the communication system S, after the setup mode, a resource stored on the server 70 is received by the communication device 1, and the received resource is utilized by the electronic musical instrument 30. Specifically, first, the device identifier of the communication device 1 is transmitted from the communication device 1 to the server 70 via the Wi-Fi communication part 4 (A20). In the processing of A20, the transmission of the device identifier from the communication device 1 to the server 70 is performed by communication using a message queuing telemetry transport (MQTT) protocol. The communication of the communication device 1 with the server 70 in and after A20 is performed via the Wi-Fi communication part 4.

The server 70 that has received the device identifier by the processing of A20 acquires the user identifier corresponding to the device identifier from the device DB 72*c* (see FIG. 12B), and creates the HTTPS access authorization information based on the user identifier (T20). The HTTPS access authorization information is information for authorizing the user H to access a resource when the communication device 1 communicates with the server 70 by HTTPS.

The HTTPS access authorization information created by the processing of T20 and the user identifier corresponding to the device identifier transmitted by the processing of A20 are transmitted to the communication device 1 by communication using the MQTT protocol (A21). The user identifier received by the processing of A21 will be used for subsequent communication between the communication device 1 and the server 70 using the MQTT protocol. The user identifier and the HTTPS access authorization information received together with the user identifier will be used for subsequent communication between the communication device 1 and the server 70 using an HTTPS protocol.

After the processing of A21, a request of the user H for accessing the resource is transmitted from the communication device 1 to the server 70 in response to an instruction from the electronic musical instrument 30 (A22). The transmission of the request in the processing of A22 is performed by communication using the HTTPS protocol, and at that time, the request is transmitted including the user identifier and the HTTPS access authorization information received by the processing of A21.

In the case where the server 70, upon receiving the request by the processing of A22, determines that the HTTPS access authorization information is valid for the requested resource, the server 70 transmits the resource to the communication device 1 that made the request by the processing of A22 (A23). The transmission from the server 70 to the communication device 1 by the processing of A23 is also performed by communication using the HTTPS protocol, like the processing of A22. The resource transmitted by the processing of A23 is transmitted from the communication device 1 to the electronic musical instrument 30, and is utilized by the electronic musical instrument 30. In the processing of A22, in order to confirm (verify) whether the requested resource belongs to the user H, the user identifier included in the received request may be confirmed, or both the HTTPS access authorization information and the user identifier may be confirmed.

As described above, after the setup mode, the communication device 1 transmits its own device identifier to the server 70, and the user identifier corresponding to the device identifier and the HTTPS access authorization information created based on the user identifier are transmitted from the server 70 to the communication device 1. The communication device 1 acquires the resource from the server 70 by using the received HTTPS access authorization information or the user identifier, and the resource acquired by the communication device 1 is utilized by the electronic musical instrument 30. That is, when the resource on the server 70 is to be acquired in the electronic musical instrument 30, the resource can be directly acquired from the server 70 without acquiring via another recording medium or the like. Accordingly, the resource on the server 70 can be easily acquired and utilized on the electronic musical instrument 30.

Further, the communication device 1 receives the user identifier of the user H of the connected electronic musical instrument 30 and the HTTPS access authorization information created based on the user identifier, and acquires the resource of the user H from the server 70 by using these pieces of information. That is, since the resource of the user H corresponding to the communication device 1 is acquired by the electronic musical instrument 30 of the user H, it is possible to prevent the electronic musical instrument 30 of the user H from accessing a resource of another user H.

The transmission of the device identifier from the communication device 1 by the processings of A20 and A21 and the transmission of the user identifier and the HTTPS access authorization information are performed by communication using the MQTT protocol. Since communication using the MQTT protocol is more lightweight than communication using the HTTPS protocol, the transmission of the device identifier and the transmission of the user identifier and the HTTPS access authorization information by the processings of A20 and A21 can be quickly performed.

Further, the acquisition of the HTTPS access authorization information and the user identifier from the server 70 by the communication device 1 is performed immediately after each time the communication between the communication device 1 and the server 70 is established, whether the setup mode has been executed or not. Accordingly, since the HTTPS access authorization information in particular will be the latest when communication with the server 70 is established, it is possible to prevent using the same HTTPS access authorization information for a long period of time.

For example, by regularly updating the format of the HTTPS access authorization information transmitted by the server 70 to the communication device 1, even if the HTTPS access authorization information or the request by the processing of A22 based on the HTTPS access authorization information is leaked, after the HTTPS access authorization information is updated, no more resources can be acquired from the server 70 by the leaked HTTPS access authorization information. Thus, leakage of the resource on the server 70 can be more effectively prevented.

The communication of A20 and A21 is not limited to communication using the MQTT protocol, but may also be performed according to other communication methods such as communication using the HTTPS protocol. Also, the communication of A22 and A23 is not limited to communication using the HTTPS protocol, but may also be performed according to other communication methods such as communication using the MQTT protocol.

In addition to utilization of the resource on the server 70 by the electronic musical instrument 30 in response to an instruction of the user H given to the electronic musical instrument 30 in this way, the resource on the server 70 can also be utilized by the electronic musical instrument 30 in response to an instruction of the user H given to the mobile terminal 50. Such utilization of the resource on the server 70 by the electronic musical instrument 30 in response to the instruction to the mobile terminal 50 will be described.

After the setup mode described with reference to FIG. 2, the mobile terminal 50 logs in to the server 70 via the base communication part 61 (A24). At the time of login, the HTTPS access authorization information is transmitted from the server 70 to the mobile terminal 50, and will be used for subsequent HTTPS protocol communication from the mobile terminal 50 to the server 70. The login by the processing of A24 may be omitted in the case where the login by the processing of A3 of FIG. 2 described above continues (that is, in the case where no logout has occurred). Subsequent communication of the mobile terminal 50 with the server 70 will be performed via the base communication part 61.

After the processing of A24, the user identifier of the logged-in user H is requested (A25), the server 70 searches the user DB 72b for the requested user identifier (T21), and the searched user identifier is transmitted to the mobile terminal 50 that made the request for the user identifier (A26). The mobile terminal 50 requests from the server 70 the device registration data corresponding to the user identifier received by the processing of A26 (A27).

The server 70 searches the device DB 72c for the device registration data corresponding to the user identifier requested by the processing of A27 (T22), and transmits the corresponding device registration data to the mobile terminal 50 that made the request (A28).

The mobile terminal 50 registers the device registration data received by the processing of A28 in an owned device list (T24). In the case where multiple pieces of device registration data are registered in the owned device list by the processing of T24, such as where the user H has multiple electronic musical instruments 30, the user H is caused to select the device registration data corresponding to the communication device 1 of the electronic musical instrument 30 that will utilize the resource on the server 70 according to the instruction to the mobile terminal 50.

After the processing of T24, the mobile terminal 50 operates as a user interface (UI) of the electronic musical instrument 30 to which the communication device 1 corresponding to the selected device registration data is connected (T25). A request based on an instruction for the electronic musical instrument 30 or the server 70 and accompanying information, and the user identifier received by the processing of A26 and the device identifier of the selected device registration data is transmitted from the mobile terminal 50 to the server 70 (A29).

The server 70 transmits the request by the processing of A29 to the communication device 1, the communication device 1 transmits the request received from the server 70 to the electronic musical instrument 30, and a processing corresponding to the request is executed in the electronic musical instrument 30 (A30). In the processing of A30, the server 70 may perform a necessary processing in response to the request transmitted from the mobile terminal 50, and transmit a result thereof to the communication device 1.

As a specific example of the processings of A29 and A30, a request (including a target parameter name and a set value after change) for instructing that a change be made to the parameter of the electronic musical instrument 30 is transmitted from the mobile terminal 50 to the server 70 (A29). The server 70 transmits the received request to the communication device 1. The communication device 1 transmits the request transmitted from the server 70 to the electronic musical instrument 30. The electronic musical instrument 30 performs a processing (parameter setting) according to the received request (A30). Other requests transmitted by the processing of A29 include transmission of a parameter value of the electronic musical instrument 30 to the mobile terminal 50.

As another specific example of the processings of A29 and A30, the server 70 may perform a necessary processing in response to the request transmitted from the mobile terminal 50, and transmit a result thereof to the communication device 1. In this case, a request (including information for specifying a resource) for instructing that a list of predetermined resources stored on the server 70 be displayed is transmitted from the mobile terminal 50 to the server (A29). In response to the request, the server 70 creates a list of applicable resources and transmits a request (including the created list) instructing that the list be displayed to the communication device 1. The communication device 1 transmits the received request to the electronic musical instrument 30, and the electronic musical instrument 30 displays the list on an LCD 36 (see FIG. 9) to be described later (A30).

As yet another specific example of the processings of A29 and A30, the electronic musical instrument 30 may transmit a request to the server 70 in response to the request transmitted from the communication device 1, and acquire a result of processing of the request in the server 70. In this case, a request (including information for specifying a resource) for instructing that a resource utilized by the electronic musical instrument 30 be acquired from the server 70 is transmitted from the mobile terminal 50 to the server 70 (A29).

The server 70 transmits the received request to the communication device 1, and the communication device 1 transmits the transmitted instruction to the electronic musical instrument 30. Based on the received instruction, the electronic musical instrument 30 transmits a request to the communication device 1 instructing that the specified resource be transmitted to the electronic musical instrument 30. The communication device 1 transmits the request to the server 70. The server 70 transmits the resource specified by the received request to the communication device 1. The communication device 1 transmits the received resource to the electronic musical instrument 30. The electronic musical instrument 30 utilizes the resource transmitted from the communication device 1 (A30).

As described above, the instruction (request) from the mobile terminal 50 is transmitted from the server 70 to the communication device 1 and the electronic musical instrument 30. The mobile terminal 50 is equipped with a display device having more abundant functions than the communication device 1 and the electronic musical instrument 30. In this manner, for example, by transmitting information instructing the resource to be used by the electronic musical instrument 30 from the mobile terminal 50, usability for the user H concerning resource utilization by the electronic musical instrument 30 can be improved.

In the processings of A24 to A28, after the mobile terminal 50 logs in to the server 70, the user identifier is requested from the server 70, the requested user identifier is transmitted to the mobile terminal 50, and the mobile terminal 50 transmits the transmitted user identifier to the server 70, thereby acquiring the corresponding device registration data from the server 70. However, the disclosure is not limited thereto. When the mobile terminal 50 has logged in to the server 70, the user DB 72*b* may be searched for the user identifier of the logged-in user H, the device DB 72*c* may be searched for the device registration data corresponding to the searched user identifier, and the searched device registration data may be transmitted to the mobile terminal 50 together with the user identifier. In this case, the processings of A25 and A27 performed by the mobile terminal 50 and the processing of A26 performed by the server 70 may be omitted.

Figure 4:
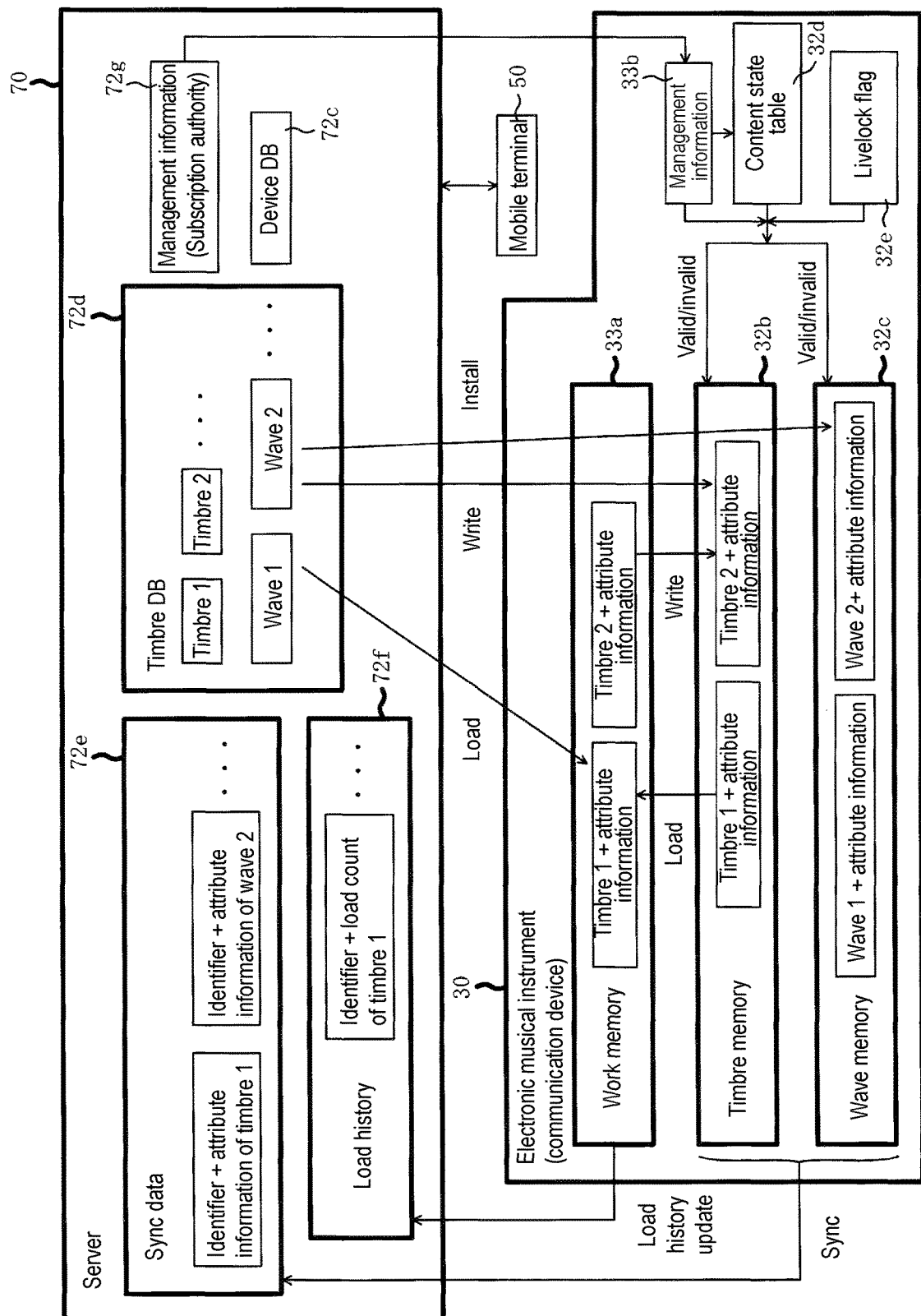
FIG. 4 is a view illustrating an outline of loading, writing, and installation.

Herein, specific examples of the processings of T25, A29, and A30 will be described with reference to FIG. 4 to FIG. 7. FIG. 4 is a view illustrating an outline of loading, writing, and installation. In the present embodiment, loading, writing, and installation are provided as instructions from the mobile terminal 50 to the electronic musical instrument 30 for using the resources of the server 70.

Loading is an instruction for acquiring a timbre data which is a type of the resources stored in the server 70 and setting as the timbre data to be actually (currently) used for sound production by the electronic musical instrument 30. Writing is an instruction for acquiring a timbre data stored in the server 70 and storing to the electronic musical instrument 30 so that it can be used for sound production in the electronic musical instrument 30. Installation is an instruction for acquiring a wave data which is a type of the resources stored in the server 70 and storing to the electronic musical instrument 30 so that it can be used for sound production in the electronic musical instrument 30.

First, a configuration of the communication system S related to loading, writing, and installation will be described. The electronic musical instrument 30 is provided with a work memory 33*a*, a timbre memory 32*b*, and a wave memory 32*c*. The work memory 33*a* stores the timbre data used in a current performance of the user H and the attribute information of the timbre data. The work memory 33*a* may store a plurality of timbre data and their attribute information, and among them, the timbre data with which the performance of the user H is directly reflected is referred to as "current". The user H may select "current" by operating the electronic musical instrument 30. The timbre memory 32*b* stores a plurality of timbre data and their attribute information as candidates to be stored in the work memory 33*a* and used for sound production, and the wave memory 32*c* stores a plurality of wave data and their attribute information.

Herein, the attribute information stored together with the timbre data in the work memory 33*a* or the like is configured with information associated with the timbre data and the wave data, such as the creator of the timbre data and the wave data, the date/time of creation of the timbre data and the wave data, etc.

The server 70 is provided with a timbre DB 72*d*, management information 72*g*, and the device DB 72*c* described above. The timbre DB 72*d* stores a plurality of timbre data (timbre 1, timbre 2, . . . ) and a plurality of wave data (wave 1, wave 2, . . . ). The management information 72*g* stores information related to the use of the data on the server 70 for each user H, such as information about the timbre data or the wave data purchased by the user H, the subscription authority owned by the user H, etc. Hereinafter, the timbre data and the wave data will be collectively referred to as "sound data".

The subscription authority indicates the contract type for the user H to use the sound data on the server 70, and is set to multiple levels of authority (specifically, "normal", "core", "professional", and "ultimate"). By purchasing the subscription authority of a desired level, the user H can acquire the sound data that is permitted to be used at this level from the server 70 and use the sound data within a predetermined period (e.g., one year) after purchase. Hereinafter, sound data that can be used within a predetermined period according to the purchased subscription authority will be referred to as "subscription-type sound data".

In addition to such subscription-type sound data, the server 70 is provided with "permanent-type sound data" which are sound data that are permanently usable upon purchase by the user H. Further, the server 70 also stores sound data combining the subscription type and the permanent type. In the case where the user H purchases the subscription authority to which the sound data belongs, the sound data can be used as a subscription-type sound data within a predetermined period, and in the case where the user H purchases the sound data, the sound data can be used as a permanent-type sound data regardless of the period.

The management information 72g stores, for each user H, the subscription authority owned by the user H and information about the permanent-type sound data purchased by the user H.

Next, an outline of a processing of the communication system S in loading will be described. In the case where an instruction for loading to the electronic musical instrument 30 is sent from the mobile terminal 50 to the server 70, the timbre DB 72d is searched for the timbre data instructed for loading. In the case where the timbre data is present in the timbre DB 72d, by referring to the management information 72g, it is confirmed whether the timbre data can be used by the user H of the mobile terminal 50, that is, whether the timbre data has been purchased by the user H or whether the timbre data can be used with the subscription authority of the user H.

Then, in the case where it is determined that the timbre data can be used by the user H, the server 70 transmits the timbre data and an instruction for loading the timbre data to the electronic musical instrument 30. Based on the received instruction, the electronic musical instrument 30 stores the timbre data received together with the instruction to the work memory 33a. At the time of this storage, the user H may set whether to automatically select the received timbre data as "current". Therefore, according to the instruction from the mobile terminal 50, the timbre data that can be used by the user H and stored in the server 70 can be used in the current performance of the electronic musical instrument 30.

In addition to storing the timbre data stored in the server 70 to the work memory 33a of the electronic musical instrument 30, as shown in FIG. 4, loading also includes storing the timbre data stored in the timbre memory 32b to the work memory 33a. Also in this case, it is confirmed whether the target timbre data can be used based on the management information 72g of the server 70, and the details thereof will be described later. The loading instruction for the electronic musical instrument 30 is not necessarily sent from the mobile terminal 50 via the server 70, but the user H may also directly input the loading instruction to the electronic musical instrument 30.

Next, an outline of a processing of the communication system S in writing will be described. In the case where an instruction for writing to the electronic musical instrument 30 is sent from the mobile terminal 50 to the server 70, the timbre DB 72d is searched for the instructed timbre data in the same manner as in loading. In the case where the timbre data is present in the timbre DB 72d, by referring to the management information 72g, it is confirmed whether the timbre data can be used by the user H of the mobile terminal 50, that is, whether the timbre data has been purchased by the user H or whether the timbre data can be used with the subscription authority of the user H.

Then, in the case where it is determined that the timbre data can be used by the user H, the server 70 transmits the timbre data and an instruction for writing the timbre data to the electronic musical instrument 30. Based on the received instruction, the electronic musical instrument 30 stores the timbre data received together with the instruction to a predetermined area of the timbre memory 32b. Therefore, according to the instruction from the mobile terminal 50, the timbre data that can be used by the user H and stored in the server 70 can be stored to the timbre memory 32b of the electronic musical instrument 30, and can be used in the performance of the electronic musical instrument 30 by a subsequent instruction of the user H for the electronic musical instrument 30 or the mobile terminal 50.

In addition to storing the timbre data stored in the server 70 to the timbre memory 32b of the electronic musical instrument 30, as shown in FIG. 4, writing also includes storing the timbre data stored in the work memory 33a to the timbre memory 32b in response to an instruction for writing from the mobile terminal 50 described above. Also in this case, it is confirmed whether the target timbre data can be used based on the management information 72g of the server 70, and the details thereof will be described later. The instruction for writing to the electronic musical instrument 30 is not necessarily sent from the mobile terminal 50 via the server 70, but the user H may also directly input the instruction for writing to the electronic musical instrument 30.

Next, an outline of a processing of the communication system S in installation will be described. In the case where an instruction for installation to the electronic musical instrument 30 is sent from the mobile terminal 50 to the server 70, the timbre DB 72d is searched for the instructed wave data. In the case where the wave data is present in the timbre DB 72d, by referring to the management information 72g, it is confirmed whether the wave data can be used by the user H of the mobile terminal 50, that is, whether the wave data has been purchased by the user H or whether the wave data can be used with the subscription authority of the user H.

Then, in the case where it is determined that the wave data can be used by the user H, the server 70 transmits the wave data and an instruction for installing the wave data to the electronic musical instrument 30. Based on the received instruction, the electronic musical instrument 30 stores the wave data received together with the instruction to a predetermined area of the wave memory 32c. The wave data stored in the wave memory 32c will be appropriately used in performance according to an instruction of the user H for the electronic musical instrument 30. Therefore, according to the instruction from the mobile terminal 50, the wave data that can be used by the user H and is stored in the server 70 is stored to the wave memory 32c of the electronic musical instrument 30, and will be used in subsequent performance of the electronic musical instrument 30.

The wave data to be used in a performance of the electronic musical instrument 30 is not necessarily set according to an instruction of the user H to the electronic musical instrument 30, but may also be set according to an instruction to the electronic musical instrument 30 via the mobile terminal 50 and the server 70.

In the case where loading, writing, or installation is performed in the electronic musical instrument 30 in this manner, the contents of the work memory 33a, the timbre memory 32b, and the wave memory 32c are changed, and a processing is performed for the server 70 and the mobile terminal 50 to learn about the changed contents.

Specifically, the server 70 is provided with a load history 72f and sync data 72e. The load history 72f stores a count of a timbre data being stored to the work memory 33a of the electronic musical instrument 30. Specifically, an identifier for identifying a timbre data, and a load count, which is a count of the timbre data being stored to the work memory 33a and used for performance, are stored in association with each other for each user in the load history 72f.

In the case where loading has been performed in the electronic musical instrument 30, the identifier of the loaded timbre data is transmitted to the server 70. In the server 70, 1 is added to the load count of the timbre data corresponding to the identifier in the load history 72f for the user H of the electronic musical instrument 30 from which the identifier of the timbre data has been transmitted to update the load count. Accordingly, in the case where loading has been performed in the electronic musical instrument 30, the load count is also reflected in the server 70.

By confirming the load count of such a load history 72f, in the server 70, it is possible to learn about the preferred timbre data of the user H that were frequently loaded by the user H in the past. Further, by transmitting the load count of such a load history 72f to the mobile terminal 50, and displaying the timbre data in a sequence of loading frequency, i.e., in a sequence of preference of the user H, on the mobile terminal 50, the user H can preferentially load the preferred timbre data into the electronic musical instrument 30.

On the other hand, by confirming the load count of the load history 72f, in the server 70, it is also possible to learn about the timbre data rarely loaded by the user H in the past. Such rarely loaded timbre data may not be recognized by the user H as timbre data that are available. Therefore, by displaying the rarely loaded timbre data on the mobile terminal 50, it is possible to allow the user H to recognize that the timbre data are available and prompt the user H to use the timbre data.

The update of the load history 72f of the server 70 is not limited to when loading has been performed in the electronic musical instrument 30. For example, the load history 72f may also be updated at regular time intervals (e.g., every 10 minutes) or when the power of the electronic musical instrument 30 is turned on.

Herein, in the case where the load history 72f of the server 70 is updated only when loading has been performed in the electronic musical instrument 30, the processing of the electronic musical instrument 30 for the update (e.g., a communication processing with the server 70) may coincide with a processing related to the performance of the electronic musical instrument 30, and the processing of the electronic musical instrument 30 may be delayed as a whole. As a result, the user H who is about to perform with the newly loaded timbre data has to wait.

In contrast, by setting the timing for updating the load history 72f at regular time intervals or to turn-on of the power of the electronic musical instrument 30, it is possible to prevent the processing of the update from coinciding with the processing related to the performance of the electronic musical instrument 30. Accordingly, the response of the electronic musical instrument 30 can be improved, so that the newly loaded timbre data can be quickly used for the performance of the user H, and further, the load count of the loaded timbre data can be appropriately reflected in the load history 72f of the server 70.

The sync data 72e store information about the timbre data and the wave data stored in the timbre memory 32b and the wave memory 32c of the electronic musical instrument 30. The sync data 72e store the identifiers and attribute information of the timbre data and the wave data for each electronic musical instrument 30 and each user H of the electronic musical instrument 30.

In the case where writing or installation has been performed in the electronic musical instrument 30, the identifier and attribute information of the target timbre data or the target wave data stored in the timbre memory 32b or the wave memory 32c are transmitted to the server 70. In the server 70, the transmitted identifier and attribute information of the timbre data or the wave data are stored to an area in the sync data 72e corresponding to the electronic musical instrument 30 from which the identifier of the timbre data or the wave data has been transmitted and the user H of the electronic musical instrument 30. Accordingly, the information about the timbre data or the wave data written or installed in the electronic musical instrument 30 is also reflected in the server 70.

With the sync data 72e, in the server 70, it is possible to learn about the timbre data and the wave data stored in the timbre memory 32b and the wave memory 32c of the electronic musical instrument 30. Further, such sync data 72e are transmitted to the mobile terminal 50. Then, when the timbre data or the wave data that may be written or installed are displayed on the mobile terminal 50 in the case where writing or installation is to be performed, among these data, the timbre data or the wave data determined according to the sync data 72e to have been written or installed may be displayed in gray or attached with a strikethrough to change the display mode. Accordingly, the user H is allowed to recognize that the timbre data or the wave data have been written or installed, and it is possible to prevent the timbre data or the wave data from being repeatedly written or installed.

When writing or installation has been performed, the identifier and attribute information of the target timbre data or the like stored in the timbre memory 32b or the wave memory 32c are transmitted to the server 70, but the disclosure is not limited thereto. For example, the identifier and attribute information of the timbre data and the wave data stored in the timbre memory 32b and the wave memory 32c may all be transmitted to the server 70 at regular time intervals (e.g., every 10 minutes) or at the time of turn-on of the power of the electronic musical instrument 30. Accordingly, the identifier and attribute information of the timbre data and the wave data acquired by the electronic musical instrument 30 via a storage medium such as a USB memory can also be transmitted to the server 70 in the same manner as the timbre data and the wave data acquired from the server 70.

Herein, in the case where the reflection to the sync data 72e of the server 70 is performed only when writing or installation has been performed in the electronic musical instrument 30, the processing of the electronic musical instrument 30 for the reflection (e.g., a communication processing with the server 70) may coincide with a processing related to the performance of the electronic musical instrument 30, and the processing of the electronic musical instrument 30 may be delayed as a whole. In contrast, by setting the timing of the reflection to the sync data 72e at regular time intervals or to the turn-on of the power of the electronic musical instrument 30, it is possible to prevent the processing of the reflection from coinciding with the processing related to the performance of the electronic musical instrument 30. Accordingly, the response of the electronic musical instrument 30 can be improved, and the identifier and attribute information of the written or installed loaded timbre data or wave data can be appropriately reflected in the sync data 72e of the server 70.

Herein, also in the case of using sound data, such as loading or writing timbre data or switching wave data used for performance according to an instruction from the electronic musical instrument 30, it is confirmed whether the target sound data can be used based on the management information 72g of the server 70. Specifically, management information of the user H who is using the electronic musical instrument 30 is acquired from the management information 72g of the server 70 and is stored to management information 33b of the electronic musical instrument 30.

Then, based on the management information stored in the management information 33b, it is confirmed whether the sound data stored in the timbre memory 32b or the wave memory 32c can be used or cannot be used. At this time, the state "usable" or "unusable" of each sound data is stored to a content state table 32d. Then, the sound data determined to be usable in the management information stored in the management information 33b is set to be "valid" so that it can be used for loading, writing, etc., and the sound data determined to be unusable is set to be "invalid" so that it cannot be used.

Accordingly, also in the case where the subscription-type sound data is used according to an instruction from the electronic musical instrument 30, the sound data can be appropriately used based on the management information 72g of the server 70. Therefore, a performance with rich expression by the electronic musical instrument 30 can be realized with such subscription-type sound data and permanent-type sound data.

In addition, the electronic musical instrument 30 may be used in an environment such as an outdoor stage where communication with the server 70 cannot be established. In such an environment, since the electronic musical instrument 30 cannot receive the management information from the management information 72g of the server 70, the subscription-type sound data stored in the timbre memory 32b or the wave memory 32c cannot be used.

Therefore, in the present embodiment, the communication between the electronic musical instrument 30 and the server 70 continues to be unable to be established, and up to when the power of the electronic musical instrument 30 has been turned on 10 times during this period, the sound data stored in the timbre memory 32b or the wave memory 32c are set to be valid or invalid according to the state of "usable" or "unusable" of the sound data stored in the content state table 32d based on the management information 33b immediately before it becomes possible to establish the communication.

Accordingly, even if the electronic musical instrument 30 cannot communicate with the server 70, the subscription-type sound data that have been usable by the user H can be used for a certain period of time immediately before it becomes possible to establish the communication. Therefore, regardless of the usage environment of the electronic musical instrument 30, the subscription-type sound data usable by the user H can be maintained, and a richly expressive performance can be realized. Further, by setting the period of setting validity or invalidity of the sound data to 10 times of power-on of the electronic musical instrument 30, it is possible to suppress such an exceptional state of validity or invalidity of the sound data from unreasonably continuing for a long period of time.

Further, in the present embodiment, based on the intention of the user H, it is possible to set validity or invalidity of the sound data stored in the timbre memory 32b or the wave memory 32c according to the state of "usable" or "unusable" of the sound data stored in the content state table 32d.

Specifically, the electronic musical instrument 30 is provided with a livelock flag 32e. The livelock flag 32e is a flag that can be switched on and off by a predetermined operation of the user H on a setting key 35 of the electronic musical instrument 30 to be described later. In the case where the livelock flag 32e is set to on by an operation of the user H on the setting key 35, the sound data stored in the timbre memory 32b or the wave memory 32c is set to be valid or invalid according to the state of "usable" or "unusable" of the sound data stored in the content state table 32d immediately before the livelock flag 32e is turned on.

Accordingly, even in the case where the user H brings and uses the electronic musical instrument 30 in an environment where communication with the server 70 is not guaranteed or in the case where the user H wants to maintain the subscription-type sound data that can be used with the current subscription authority, since it is possible to maintain the use of the subscription-type sound data that have been usable immediately before the livelock flag 32e is turned on, the user H can use the sound data without concern.

Further, while the livelock flag 32e is on, a limitation (penalty) is imposed on the subscription-type sound data. Specifically, while the livelock flag 32e is on, storage of edited subscription-type timbre data to the timbre memory 32b, and addition to new subscription-type sound data to the timbre memory 32b and the wave memory 32c are prohibited. Specifically, a button (not shown) for instructing storage of subscription-type timbre data or a button (not shown) for adding new sound data displayed on the LCD 36 (see FIG. 9) of the electronic musical instrument 30 are hidden.

That is, by turning on the livelock flag 32e, the subscription-type sound data can be used, but on the other hand, storage or addition of the sound data is prohibited, and a limitation is imposed on the music activity of the user H. Accordingly, the user H may be made to recognize that the livelock flag 32e is in the on state, and may be motivated to turn off the livelock flag 32e.

Figure 5:
FIG. 5 is a view showing the communication performed by the communication device, the electronic musical instrument, the mobile terminal, and the server in loading.
Figure 6:
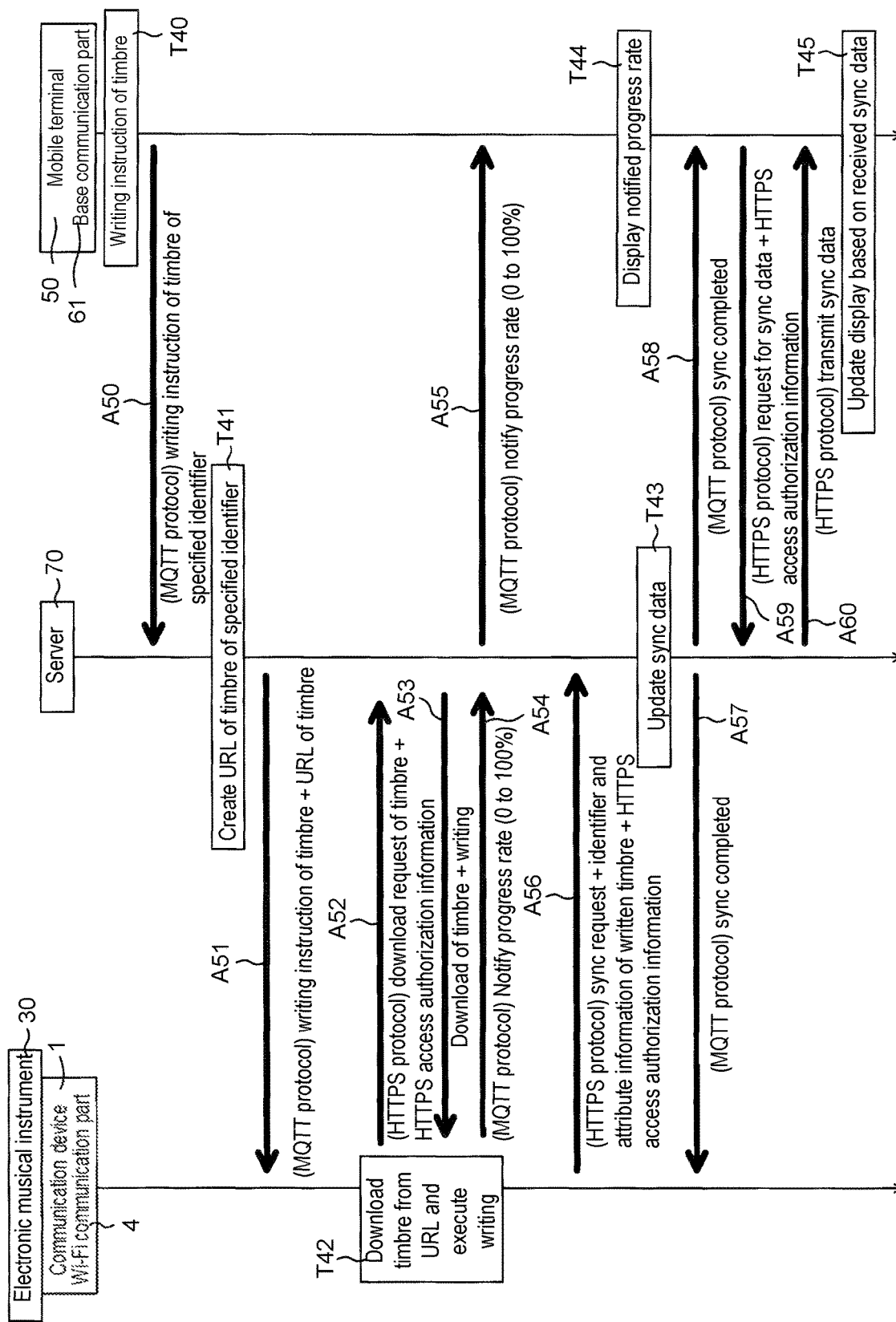
FIG. 6 is a view showing the communication performed by the communication device, the electronic musical instrument, the mobile terminal, and the server in writing.
Figure 7:
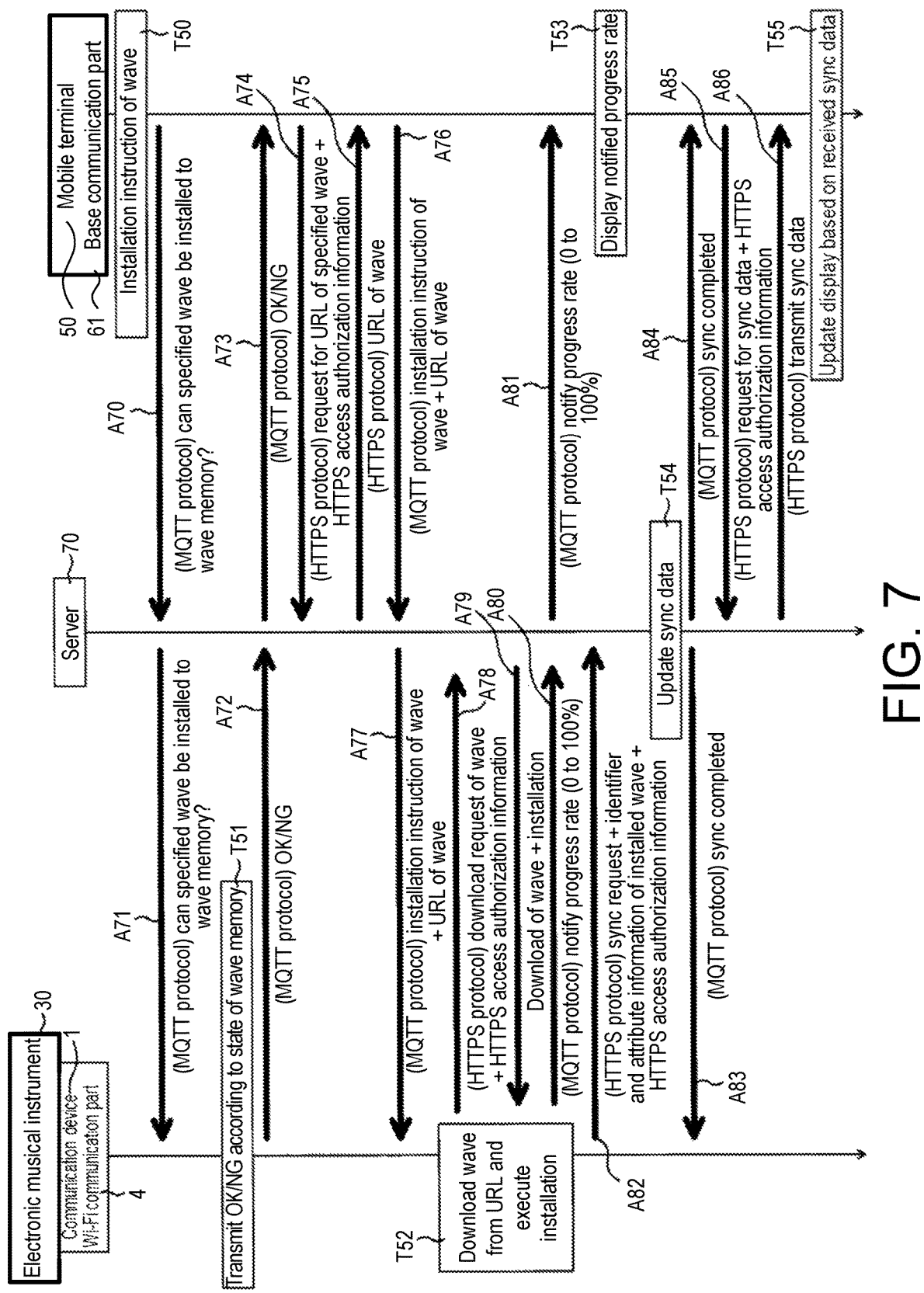
FIG. 7 is a view showing the communication performed by the communication device, the electronic musical instrument, the mobile terminal, and the server in installation.

Next, communication performed by the communication device 1, the electronic musical instrument 30, the mobile terminal 50, and the server 70 in loading, writing, and installation will be described with reference to FIG. 5 to FIG. 7. First, the communication in loading will be described. FIG. 5 is a view showing the communication performed by the communication device 1, the electronic musical instrument 30, the mobile terminal 50, and the server 70 in loading.

In the loading, first, at the mobile terminal 50, the user H is caused to select the timbre data to be loaded into the electronic musical instrument 30 (T30). After the processing of T30, the mobile terminal 50 transmits the identifier of the timbre data selected by the processing of T30 and an instruction for loading the timbre data to the server 70 by communication using the MQTT protocol (A40).

The server 70 that has received the MQTT data by the processing of A40 acquires, from the timbre DB 72d, the timbre data corresponding to the identifier of the timbre data included in the received MQTT data (T31). After the processing of T31, the server 70 transmits the instruction for loading the timbre data received by the processing of A40 and the timbre data acquired by the processing of T31 to the communication device 1 by communication using the MQTT protocol (A42).

The communication device 1 that has received the instruction for loading the timbre data and the timbre data by the processing of A42 transmits the instruction and the timbre data to the electronic musical instrument 30, and then, in the electronic musical instrument 30, the received timbre data is stored to the work memory 33a (T32). Accordingly, the timbre data instructed from the mobile terminal 50 is loaded into the electronic musical instrument 30.

In the following, the electronic musical instrument 30 is also communicated with the server 70 via the communication device 1, but the reference to the communication device 1 will be omitted for the sake of brevity. Therefore, for example, "transmitting a data A from the electronic musical instrument 30 to the server 70" means that the data A is transmitted from the electronic musical instrument 30 to the communication device 1, and the data A is transmitted from the communication device 1 to the server 70. Similarly, "transmitting a data B from the server 70 to the electronic musical instrument 30" means that the data B is transmitted from the server 70 to the communication device 1, and the data B is transmitted from the communication device 1 to the electronic musical instrument 30.

After the processing of T32, the electronic musical instrument 30 transmits the identifier of the timbre data loaded by the processing of T32 to the server 70 by communication using the MQTT protocol (A43). The server 70 that has received the identifier of the timbre data loaded by the processing of A43 adds 1 to the load count corresponding to the identifier in the load history 72f for the user H of the electronic musical instrument 30 from which the identifier of the timbre data has been transmitted (T33).

As described above, in the loading of the communication system S, in the case where the identifier of the timbre data and the instruction for loading the timbre data have been transmitted from the mobile terminal 50 to the server 70 by the processing of A40, the server 70 acquires the timbre data corresponding to the identifier of the timbre data from the timbre DB 72d, and transmits the timbre data together with the received instruction to the electronic musical instrument 30. In the electronic musical instrument 30, in response to the instruction received from the server 70, the received timbre data is stored to the work memory 33a. Accordingly, the data on the server 70 can be used in the electronic musical instrument 30 without connecting another storage medium to the electronic musical instrument 30.

At this time, since the timbre data acquired in advance in the server 70 by the processing of T31 is transmitted together with the instruction to the electronic musical instrument 30, after receiving the instruction, the electronic musical instrument 30 does not need to request the timbre data from the server 70 again. Accordingly, the data on the server 70 can be quickly used by the electronic musical instrument 30.

Further, the instruction for the electronic musical instrument 30 is transmitted from the mobile terminal 50. Since the mobile terminal 50 is provided with more abundant input devices and display devices than the electronic musical instrument 30, usability for using the timbre data on the server 70 in the electronic musical instrument 30 can be improved.

Further, the loading instruction from the mobile terminal 50 to the server 70 and the loading instruction from the server 70 to the electronic musical instrument 30 are sent by communication using the MQTT protocol. By performing communication using the MQTT protocol which is more lightweight than communication using the HTTPS protocol, these instructions can be communicated quickly. Accordingly, it is possible to reduce the time required from sending a loading instruction at the mobile terminal 50 until loading is actually completed at the electronic musical instrument 30.

In the case where the identifier of the timbre data and the instruction for loading the timbre data have been transmitted to the server 70 by the processing of A40, the server 70 acquires the timbre data corresponding to the identifier of the timbre data from the timbre DB 72d (T31) and transmits the timbre data together with the received instruction to the electronic musical instrument 30 (A42), but the disclosure is not limited thereto. For example, the processing of T31 of the server 70 may be omitted, the server 70 may directly transmit the identifier and the loading instruction of the processing of A40 to the electronic musical instrument 30, and the electronic musical instrument 30 may request the server 70 for the corresponding timbre data.

Further, the processing of T31 may be omitted in the server 70, and instead, a URL may be created as a data request destination for acquiring the timbre data corresponding to the identifier of the processing of A40 from the timbre DB 72d, and the URL and the loading instruction may be transmitted to the electronic musical instrument 30. The electronic musical instrument 30 may transmit a request for timbre data based on the received URL to the server 70 by communication using the HTTPS protocol, and the timbre data corresponding to the request may be transmitted from the server 70 to the electronic musical instrument 30 by communication using the HTTPS protocol. At this time, the request for timbre data transmitted from the electronic musical instrument 30 may be transmitted including the HTTPS access authorization information received by the processing of A21 in FIG. 3.

Next, communication in writing will be described. FIG. 6 is a view showing the communication performed by the communication device 1, the electronic musical instrument 30, the mobile terminal 50, and the server 70 in writing. In the writing, first, at the mobile terminal 50, the user H is caused to select the timbre data to be written to the electronic musical instrument 30 (T40). After the processing of T40, the mobile terminal 50 transmits the identifier of the timbre data selected by the processing of T40 and an instruction for writing the timbre data to the server 70 by communication using the MQTT protocol (A50).

The server 70 that has received the MQTT data by the processing of A50 creates a URL for acquiring the timbre data corresponding to the identifier of the timbre data included in the received MQTT data from the timbre DB 72d (T41). After the processing of T41, the server 70 transmits the instruction for writing the timbre data received by the processing of A50 and the URL acquired by the processing of T41 to the electronic musical instrument 30 by communication using the MQTT protocol (A51).

The electronic musical instrument 30 that has received the URL and the writing instruction by the processing of A51 acquires the timbre data from the URL and writes the acquired timbre data (T42). Specifically, the electronic musical instrument 30 transmits a request for timbre data based on the received URL to the server 70 by communication using the HTTPS protocol (A52). At this time, the HTTPS access authorization information received by the processing of A21 in FIG. 3 is also transmitted.

The server 70 from which the timbre data has been requested by the processing of A52 acquires the corresponding timbre data from the timbre DB 72d, and transmits the acquired timbre data to the electronic musical instrument 30 by communication using the HTTPS protocol. The electronic musical instrument 30 stores the transmitted timbre data to the timbre memory 32b (A53).

In this manner, the transmission of the timbre data from the server 70 to the electronic musical instrument 30 in the processing of A53 is performed by communication using the HTTPS protocol. Since communication using the HTTPS protocol can transmit a larger amount of data than communication using the MQTT protocol, the timbre data of various capacities stored in the server 70 can be directly acquired by the electronic musical instrument 30 from the server 70 to be used. Therefore, the time and effort to be spent by the user H when writing the timbre data to the electronic musical instrument 30 can be reduced, and the electronic musical instrument 30 can perform with rich expression.

Further, in addition to transmitting the URL created by the server 70 by the processings of T41 and A51 to the electronic musical instrument 30, a request for timbre data of the server 70 is also sent from the electronic musical instrument 30 by the processings of A52 and A53. That is, in the transmission of resources such as timbre data from the server 70 to the electronic musical instrument 30, the resources may be directly transmitted from the server 70 to the electronic musical instrument 30 (A23, A42), or the resources may be transmitted from the server 70 in response to a request from the electronic musical instrument 30 (A52, A53). By appropriately using these means, resources can be flexibly transmitted from the server 70 to the electronic musical instrument 30.

Along with the processings of A52 and A53 described above, a progress rate (0 to 100%) of the writing of the timbre data is transmitted from the electronic musical instrument 30 to the server 70 by communication using the MQTT protocol (A54), and the progress rate is transmitted from the server 70 to the mobile terminal 50 (A55). After the processing of A55, the mobile terminal 50 displays the received progress rate on the LCD 56 (see FIG. 11) (T44), so that the user H is notified of the estimated time required for the writing to be completed.

In the case where the writing by the processings of A52 and A53 is completed, the electronic musical instrument 30 transmits the identifier and attribute information of the written timbre data and a sync instruction to the server 70 by communication using the HTTPS protocol (A56). At this time, the HTTPS access authorization information received by the processing of A21 in FIG. 3 is also transmitted.

The server 70 that has received the sync instruction by the processing of A56 stores the identifier and the attribute information received together with the instruction to the sync data 72e (T43). After the processing of T43, a notification that the storage to the sync data 72e is completed is transmitted to the electronic musical instrument 30 and the mobile terminal 50 by communication using the MQTT protocol (A57, A58).

The mobile terminal 50 that has received the notification that the storage to the sync data 72e is completed by the processing of A58 transmits a request to the server 70 for the sync data 72e by communication using the HTTPS protocol (A59). At this time, the HTTPS access authorization information received by the processing of A3 in FIG. 2 is also transmitted.

The server 70 that has received the request for the sync data 72e by the processing of A59 transmits the sync data 72e to the mobile terminal 50 by communication using the HTTPS protocol (A60). The mobile terminal 50 that has received the sync data 72e by the processing of A60 performs display on the LCD 56 based on the sync data 72e (T45).

In the case where the identifier of the timbre data and the instruction for writing the timbre data have been transmitted to the server 70 by the processing of A50, the server 70 creates a URL for acquiring the timbre data corresponding to the identifier of the timbre data from the timbre DB 72d (T41), and transmits the URL together with the received instruction to the electronic musical instrument 30 (A51), but the disclosure is not limited thereto. For example, the server 70 may omit the processing of T41, acquire the timbre data corresponding to the identifier of the processing of A50 from the timbre DB 72d, and transmit the timbre data together with the received instruction to the electronic musical instrument 30. Further, the processing of T41 may be omitted, and the server 70 may transmit the identifier and the writing instruction of the processing of A50 directly to the electronic musical instrument 30, and the electronic musical instrument 30 may request the server 70 for the corresponding timbre data.

Next, communication in installation will be described. FIG. 7 is a view showing the communication performed by the communication device 1, the electronic musical instrument 30, the mobile terminal 50, and the server 70 in installation. In the installation, first, at the mobile terminal 50, the user H is caused to select the wave data to be installed to the electronic musical instrument 30 (T50).

After the processing of T50, the mobile terminal 50 transmits to the server 70 a request for confirming whether the wave data selected by the processing of T50 can be installed by communication using the MQTT protocol (A70), and the server 70 transmits the received request to the electronic musical instrument 30 by communication using the MQTT protocol (A71). At this time, a size of the wave data to be installed is also transmitted.

The electronic musical instrument 30 that has received the request for confirming whether installation is possible by the processing of A71 confirms a free space of the wave memory 32c, and confirms whether the wave data of the transmitted size can be installed (T51). After the processing of T51, the result of the processing of T51 is transmitted to the server 70 by communication using the MQTT protocol (A72), and the server 70 transmits the received result to the mobile terminal 50 by communication using the MQTT protocol (A73).

After the processing of A73, if the result received by the processing of A73 is "installable", the mobile terminal 50 transmits a request for creating a URL of the wave data specified by the user H to the server 70 by communication using the HTTPS protocol (A74). At this time, the HTTPS access authorization information received by the processing of A3 in FIG. 2 is also transmitted. The server 70 that has been requested to create a URL of the wave data by the processing of A74 creates a URL for acquiring the corresponding wave data from the timbre DB 72d, and transmits the created URL to the mobile terminal 50 by communication using the HTTPS protocol (A75).

After the processing of A75, the mobile terminal 50 transmits the received URL and an installation instruction to the server 70 by communication using the MQTT protocol (A76), and the server 70 transmits the received URL and the installation instruction to the electronic musical instrument 30 by communication using the MQTT protocol (A77).

The electronic musical instrument 30 that has received the URL and the installation instruction by the processing of A77 acquires the wave data from the URL and installs the acquired wave data (T52). Specifically, the electronic musical instrument 30 transmits a request for wave data based on the received URL to the server 70 by communication using the HTTPS protocol (A78). At this time, the HTTPS access authorization information received by the processing of A21 in FIG. 3 is also transmitted.

The server 70 that has been requested for the wave data by the processing of A78, acquires the corresponding wave data from the timbre DB 72*d*, and transmits the acquired wave data to the electronic musical instrument 30 by communication using the HTTPS protocol. The electronic musical instrument 30 stores the transmitted wave data to the wave memory 32*c* (A79).

Along with the processings of A78 and A79, a progress rate (0 to 100%) of the installation of the wave data is transmitted from the electronic musical instrument 30 to the server 70 by communication using the MQTT protocol (A80), and the progress rate is transmitted from the server 70 to the mobile terminal 50 (A81). After the processing of A81, the mobile terminal 50 displays the received progress rate on the LCD 56 (T53), so that the user H is notified of the estimated time required for the installation to be completed.

In the case where the installation by the processings of A78 and A79 is completed, the electronic musical instrument 30 transmits the identifier and attribute information of the installed wave data and a sync instruction to the server 70 by communication using the HTTPS protocol (A82). At this time, the HTTPS access authorization information received by the processing of A21 in FIG. 3 is also transmitted.

The server 70 that has received the sync instruction by the processing of A82 stores the identifier and the attribute information received together with the instruction to the sync data 72*e* (T54). After the processing of T54, a notification that the storage to the sync data 72*e* is completed is transmitted to the electronic musical instrument 30 and the mobile terminal 50 by communication using the MQTT protocol (A83, A84).

The mobile terminal 50 that has received the notification that the storage to the sync data 72*e* is completed by the processing of A84 transmits a request for the sync data 72*e* to the server 70 by communication using the HTTPS protocol (A85). The server 70 that has received the request for the sync data 72*e* by the processing of A85 transmits the sync data 72*e* to the mobile terminal 50 by communication using the HTTPS protocol (A86). At this time, the HTTPS access authorization information received by the processing of A3 in FIG. 2 is also transmitted. The mobile terminal 50 that has received the sync data 72*e* by the processing of A86 performs display on the LCD 56 based on the sync data 72*e* (T55).

Figure 8:
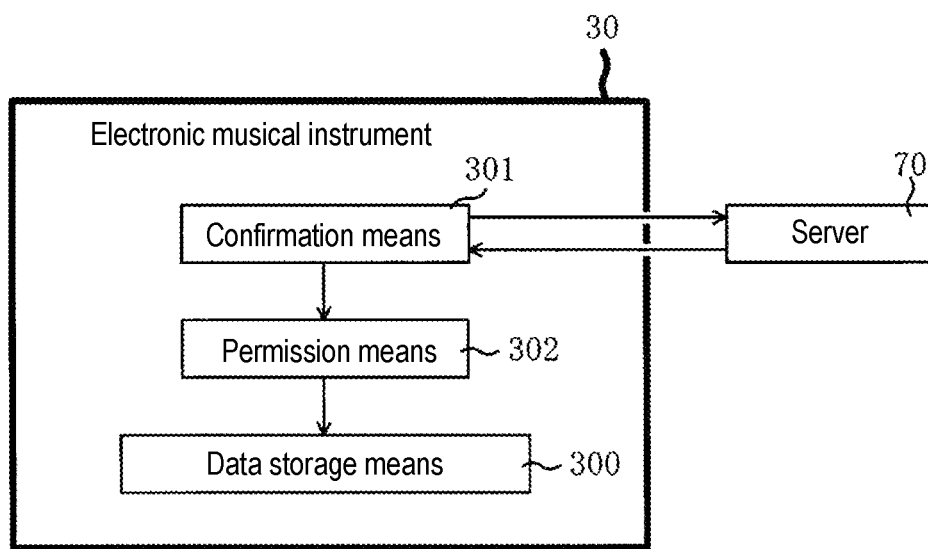
FIG. 8 is a functional block diagram of the electronic musical instrument.

Next, the functions of the electronic musical instrument 30 will be described with reference to FIG. 8. FIG. 8 is a functional block diagram of the electronic musical instrument 30. As shown in FIG. 8, the electronic musical instrument 30 includes a data storage means 300, a confirmation means 301, and a permission means 302.

Figure 9:
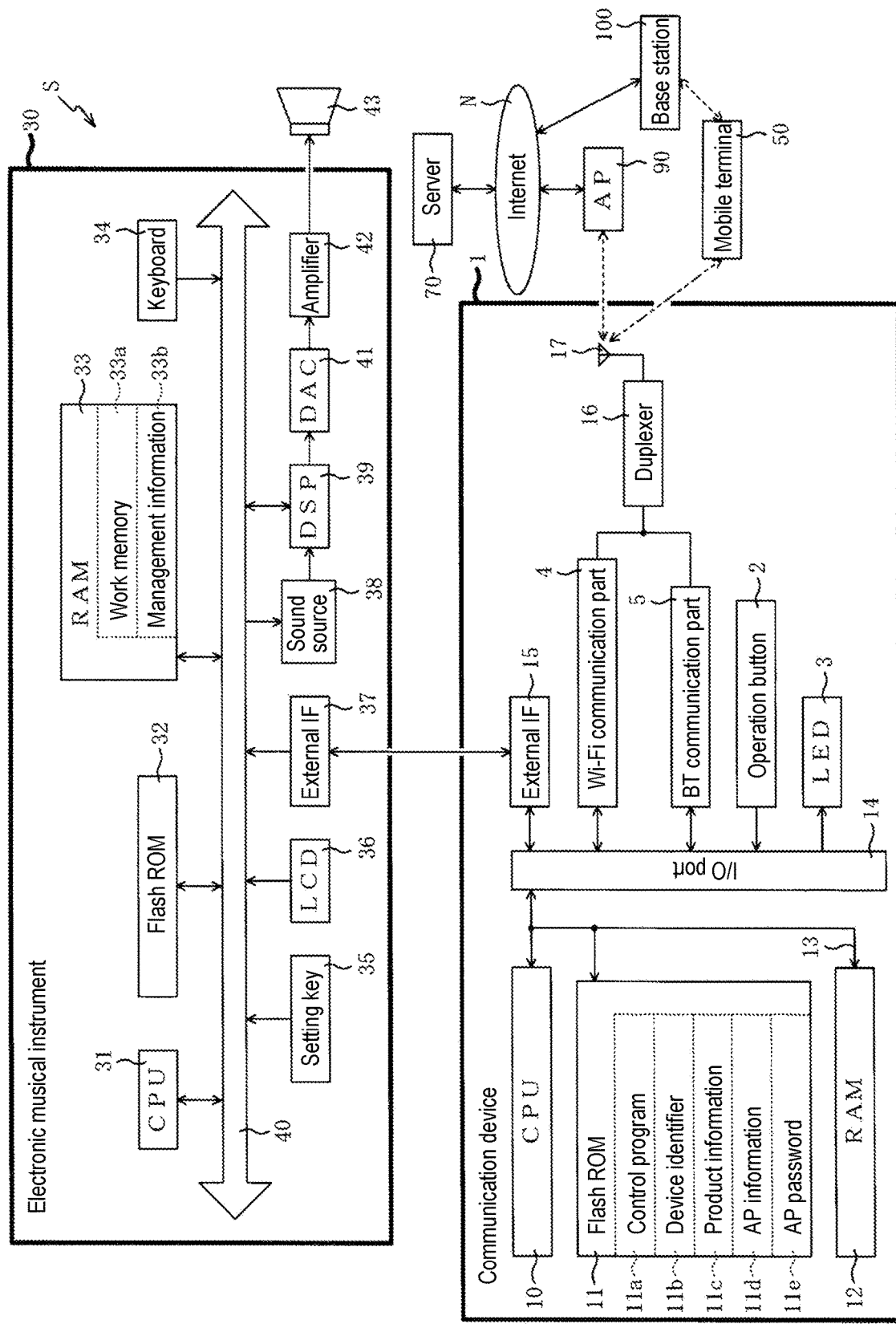
FIG. 9 is a block diagram showing electrical configurations of the communication device and the electronic musical instrument in the communication system.

The data storage means 300 is a means for storing sound data and is realized by a flash ROM 32 to be described later with reference to FIG. 9. The confirmation means 301 is a means for confirming with the server 70 the management information of the user H of the electronic musical instrument 30, and is realized by a CPU 31 to be described later with reference to FIG. 9. The permission means 302 is a means for permitting using, in the electronic musical instrument 30, sound data deemed usable in the management information confirmed by the confirmation means 301, among the subscription-type sound data stored in the data storage means 300, and the permission means 302 is realized by the CPU 31.

The electronic musical instrument 30 confirms with the server 70 the management information of the user H of the electronic musical instrument 30 managed by the server 70, and permits the use of the sound data deemed usable in the confirmed management information, among the subscription-type sound data stored in the electronic musical instrument 30. Accordingly, the subscription-type sound data can also be used in the electronic musical instrument 30.

Next, an electrical configuration of the communication system S will be described with reference to FIG. 9 to FIG. 13. First, electrical configurations of the communication device 1 and the electronic musical instrument 30 will be described with reference to FIG. 9. FIG. 9 is a block diagram showing electrical configurations of the communication device 1 and the electronic musical instrument 30 in the communication system S. The communication device 1 includes a CPU 10, a flash ROM 11, and a RAM 12 each of which is connected to an input/output (I/O) port 14 via a bus line 13. The operation button 2, the LED 3, the Wi-Fi communication part 4, and the BT communication part 5 described above and an external IF 15 are further connected to the I/O port 14.

Figure 14A:
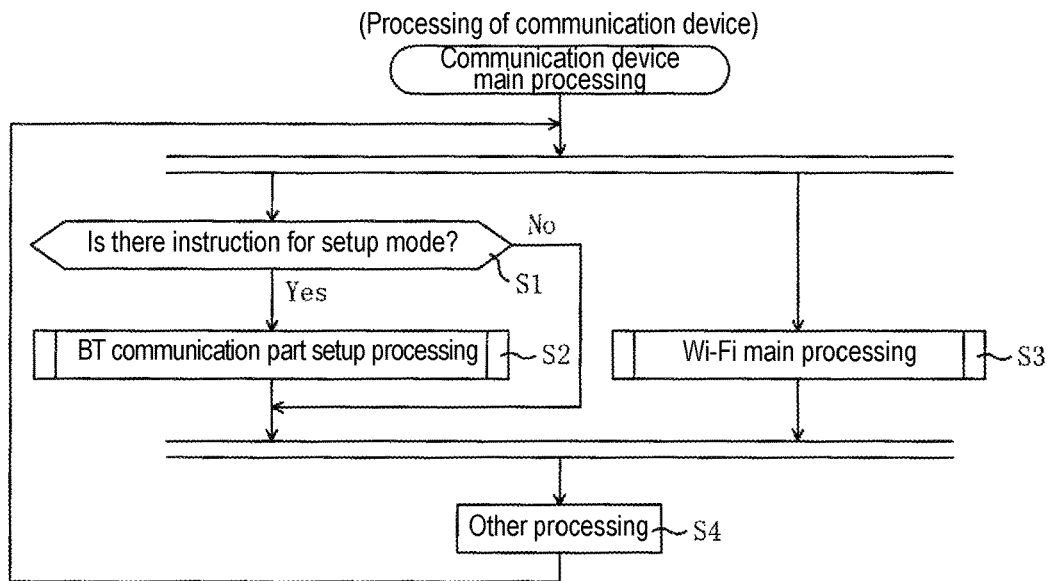
FIG. 14A is a flowchart of a communication device main processing.

The CPU 10 is an arithmetic unit that controls each part connected by the bus line 13. The flash ROM 11 is a rewritable non-volatile storage device storing programs executed by the CPU 10, fixed value data, etc., and includes a control program 11*a*, a device identifier 11*b* in which the device identifier of the communication device 1 is stored, product information 11*c* in which product information of the communication device 1 is stored, AP information 11*d* in which the information about the selected AP 90 acquired from the mobile terminal 50 is stored, and an AP password 11*e* in which the input PSW of the selected AP 90 is stored. When the control program 11*a* is executed by the CPU 10, a communication device main processing of FIG. 14A is executed. The RAM 12 is a memory rewritably storing various work data, flags, etc. when the CPU 10 executes a program.

The external IF 15 is a device for connecting to an external device, and is connected to an external IF 37 of the electronic musical instrument 30 to be described later. In the present embodiment, the external IF 15 is composed of a device based on USB standards. However, the external IF 15 may also be a device based on a communication standard other than USB. Communication between the communication device 1 and the electronic musical instrument 30 is performed via the external IF 15 and the external IF 37.

The Wi-Fi communication part 4 and the BT communication part 5 are connected to a duplexer 16. The duplexer 16 is a device that integrates radio waves transmitted and received by the Wi-Fi communication part 4 with radio waves transmitted and received by the BT communication part 5. An antenna 17 is connected to the duplexer 16. The radio waves transmitted by the Wi-Fi communication part 4 and the radio waves transmitted by the BT communication part 5 are integrated and transmitted from the antenna 17. The radio waves received by the antenna 17 are appropriately distributed to the Wi-Fi communication part 4 and the BT communication part 5. By connecting the Wi-Fi communication part 4 and the BT communication part 5 to the duplexer 16, transmission and reception of the radio waves of these two communication parts can be realized by one antenna 17. The duplexer 16 may be omitted, and an antenna may be provided in each of the Wi-Fi communication part 4 and the BT communication part 5.

Next, an electrical configuration of the electronic musical instrument 30 will be described. The electronic musical instrument 30 includes a CPU 31, a flash ROM 32, a RAM 33, a keyboard 34 acquiring performance information according to a performance of the user H, a setting key 35 for the user H to input various settings, the LCD 36 displaying a setting state of the electronic musical instrument 30 or the like, the external IF 37, a sound source 38, and a digital signal processor 39 (hereinafter referred to as "DSP 39") each of which is connected via a bus line 40.

The CPU 31 is an arithmetic unit that controls each part connected by the bus line 40. The flash ROM 32 is a rewritable non-volatile storage device storing programs executed by the CPU 31, fixed value data, etc. Herein, the flash ROM 32 will be described with reference to FIG. 10A and FIG. 10B.

Figures 10A, 10B:
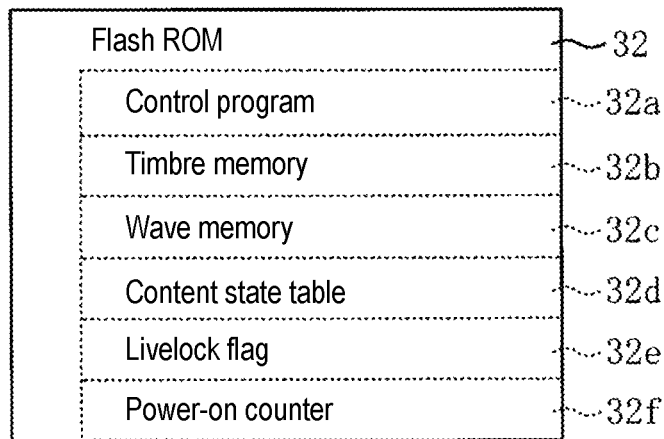
FIG. 10A is a view schematically showing a flash ROM.
FIG. 10B is a view schematically showing a content state table.
Figure 21A:
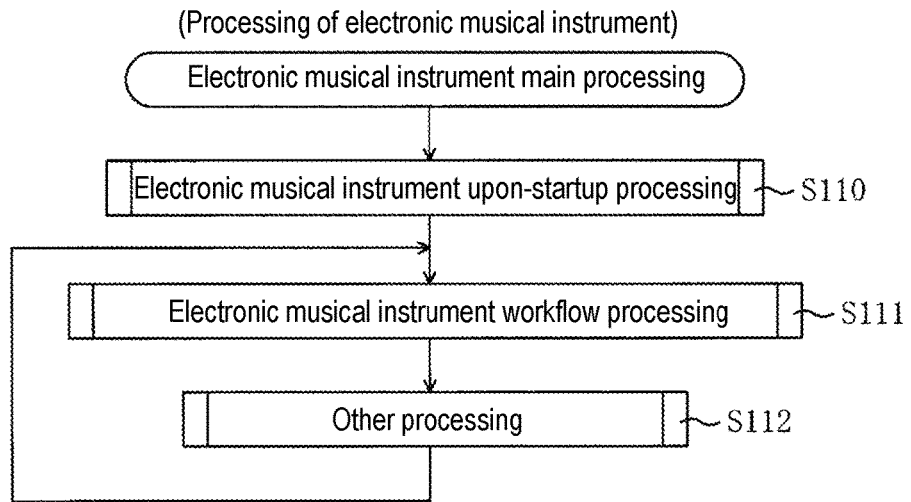
FIG. 21A is a flowchart of an electronic musical instrument main processing.

FIG. 10A is a view schematically showing the flash ROM 32. As shown in FIG. 10A, the flash ROM 32 includes a control program 32a, the above timbre memory 32b, the wave memory 32c, the content state table 32d, and a power-on counter 32f. When the control program 32a is executed by the CPU 31, an electronic musical instrument main processing of FIG. 21A is executed. The content state table 32d stores whether the sound data stored in the timbre memory 32b and the wave memory 32c can be used or cannot be used based on the management information of the management information 33b. Herein, the content state table 32d will be described with reference to FIG. 10B.

FIG. 10B is a view schematically showing the content state table 32d. As shown in FIG. 10B, in the content state table 32d, the identifier of the sound data stored in the timbre memory 32b and the wave memory 32c, the license type, and "valid/invalid" are stored in association with each other. In the "license type", in the case where the target sound data is the subscription type, it is stored as "subscription"; and in the case where the target sound data is the permanent type, it is stored as "permanent". In "valid/invalid", in the case where the target sound data is usable, it is stored as "valid"; and in the case where the target sound data is unusable, it is stored as "invalid".

In the content state table 32d, in the case where a timbre data is added to the timbre memory 32b by writing, the identifier of the timbre data is added to the content state table 32d; and in the case where a timbre data is deleted from the timbre memory 32b, the identifier of the timbre data is deleted from the content state table 32d. Similarly, in the case where a wave data is added to the wave memory 32c by installation, the identifier of the wave data is added to the content state table 32d; and in the case where a wave data is deleted from the wave memory 32c, the identifier of the wave data is deleted from the content state table 32d.

Returning to FIG. 10A, the power-on counter 32f stores a value related to power-on of the electronic musical instrument 30. Specifically, in the case where "10" is set as the initial value of the power-on counter 32f and the communicate with the server 70 continues to be unable to be established, when the power of the electronic musical instrument 30 is turned on, 1 is subtracted from the power-on counter 32f. When the power-on counter 32f becomes 0, the subscription-type sound data becomes unusable.

Returning to FIG. 9, the RAM 33 is a memory for rewritably storing various work data, flags, etc. when the program is executed by the CPU 31, and includes the above work memory 33a and the management information 33b. The details of the management information 33b will be described later with reference to FIG. 13.

The external IF 37 is a device for connecting to an external device, and is mainly connected to the external IF 15 of the communication device 1 described above. In the present embodiment, like the external IF 15, the external IF 37 is configured by a device based on a USB standard. However, the external IF 37 may also be a device based on a communication standard other than USB as long as it is of the same communication standard as the external IF 15.

The sound source 38 is a device that outputs waveform data based on the timbre data of the current of the work memory 33a and the wave data of the wave memory 32c according to the performance information inputted from the keyboard 34. The DSP 39 is an arithmetic unit for arithmetically processing the waveform data inputted from the sound source 38. The sound source 38 and a digital-to-analog converter (DAC) 41 are connected to the DSP 39, an amplifier 42 is connected to the DAC 41, and a speaker 43 is connected to the amplifier 42.

Figure 11:
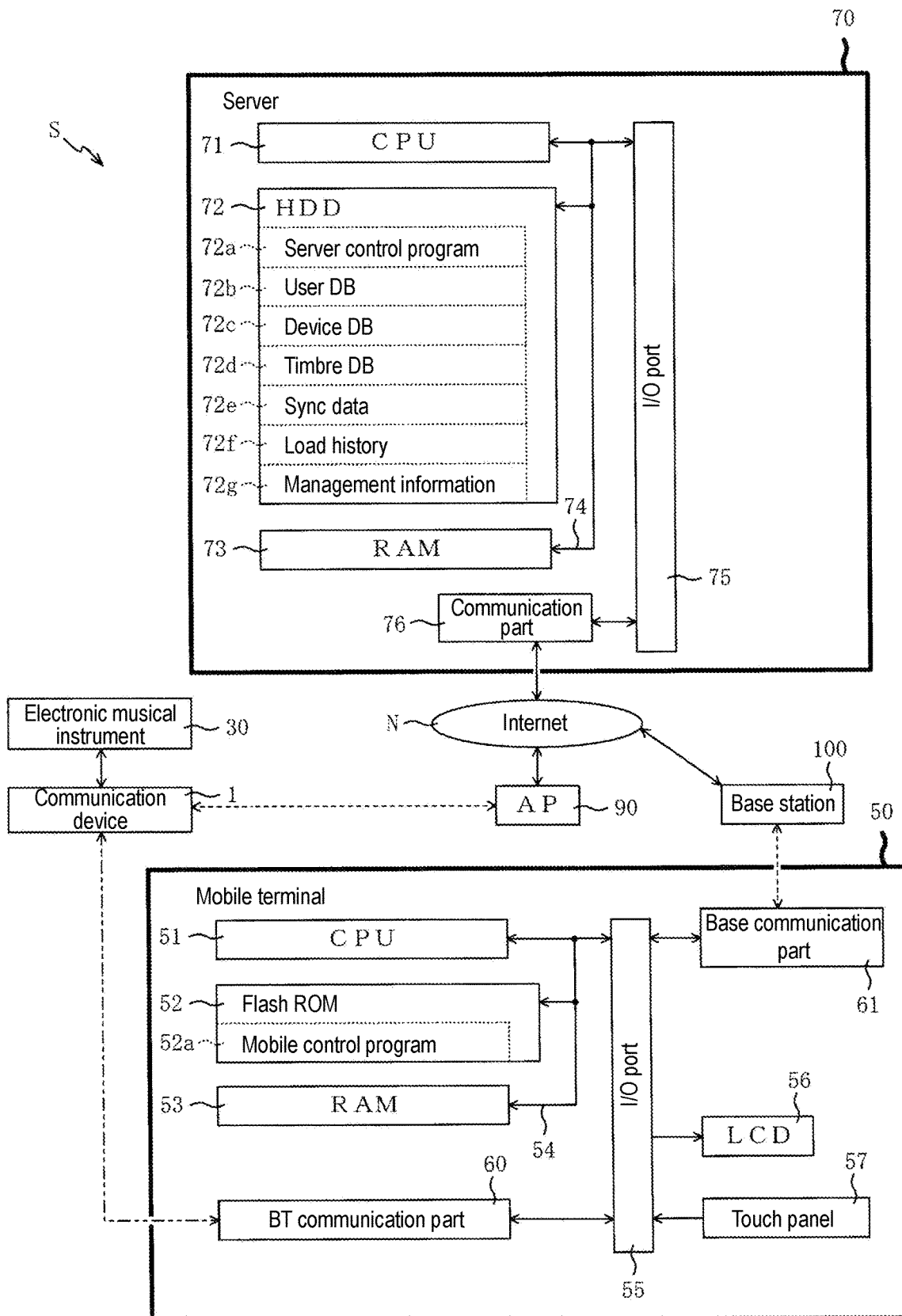
FIG. 11 is a block diagram showing electrical configurations of the mobile terminal and the server in the communication system.

Next, electrical configurations of the mobile terminal 50 and the server 70 in the communication system S will be described with reference to FIG. 11 to FIG. 13. FIG. 11 is a block diagram showing the electrical configurations of the mobile terminal 50 and the server 70 in the communication system S.

The mobile terminal 50 includes a CPU 51, a flash ROM 52, and a RAM 53 each of which is connected to an I/O port 55 via a bus line 54. The BT communication part 60 and the base communication part 61 described above, an LCD 56 displaying a setting state of the mobile terminal 50 or the like, and a touch panel 57 to which an instruction from the user H is inputted are further connected to the I/O port 55.

Figure 14B:
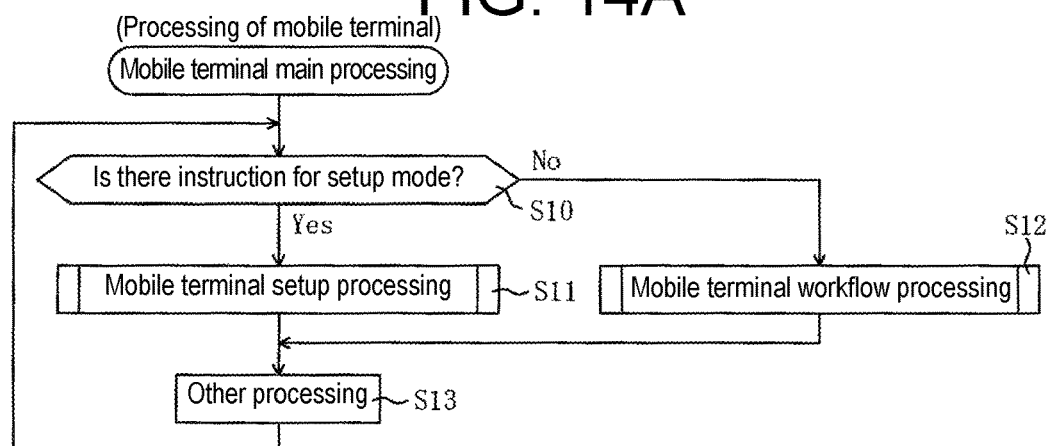
FIG. 14B is a flowchart of a mobile terminal main processing.

The CPU 51 is an arithmetic unit that controls each part connected by the bus line 54. The flash ROM 52 is a rewritable non-volatile storage device storing programs executed by the CPU 51, fixed value data, etc., in which a mobile control program 52a is stored. When the mobile control program 52a is executed by the CPU 51, a mobile terminal main processing of FIG. 14B is executed. The RAM 53 is a memory for rewritably storing various work data, flags, etc. when the CPU 51 executes a program.

The server 70 includes the CPU 71, the HDD 72, and a RAM 73 each of which is connected to an I/O port 75 via a bus line 74. A communication part 76 that communicates with the Internet N is further connected to the I/O port 75.

Figure 14C:
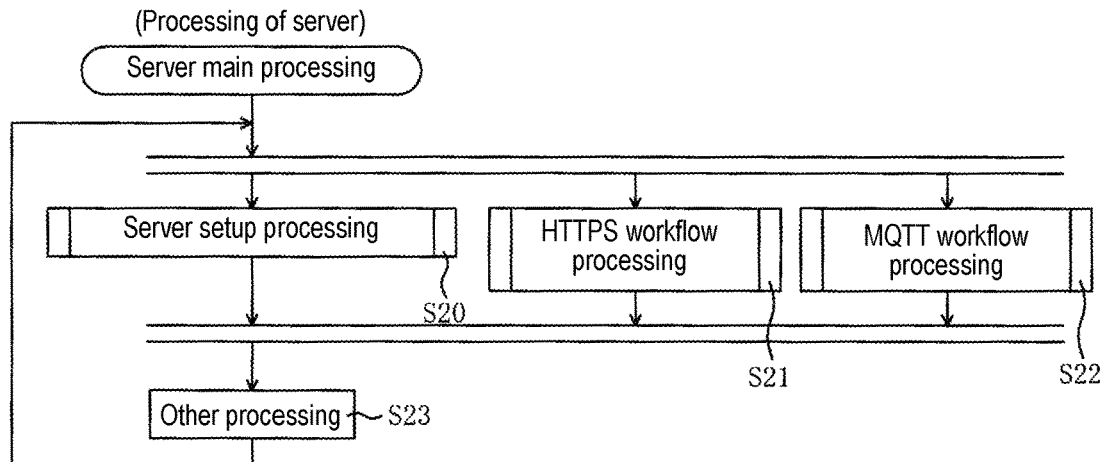
FIG. 14C is a flowchart of a server main processing.

The CPU 71 is an arithmetic unit that controls each part connected by the bus line 74. The HDD 72 is a rewritable non-volatile storage device storing programs executed by the CPU 71, fixed value data, etc., and includes a server control program 72a, the user DB 72b, the device DB 72c, the above timbre DB 72d, the sync data 72e, the load history 72f, and the management information 72g. When the server control program 72a is executed by the CPU 71, a server main processing of FIG. 14C is executed.

The user DB 72b stores login-related information and the user identifier of the user H who has been registered. The device DB 72c stores the device identifier and the product information of the communication device 1, and the user identifier of the user H who utilizes the communication device 1 (electronic musical instrument 30). The user DB 72*b*, the device DB 72*c*, the sync data 72*e*, the load history 72*f*, and the management information 72*g* will be described with reference to FIG. 12A to FIG. 13.

FIG. 12A schematically illustrates the user DB 72*b*. As shown in FIG. 12A, the user DB 72*b* stores an account (e-mail address) and a password being the login-related information of the user H who has been registered in association with the user identifier created when the user H is registered. The account stored in the user DB 72*b* is not limited to an e-mail address, but may also be a name of the user H or a uniquely set arbitrary character string.

FIG. 12B schematically illustrates the device DB 72*c*. As shown in FIG. 12B, the device DB 72*c* stores the device identifier and product information of the communication device 1 that has been registered, and the user identifier of the user H who utilizes the communication device 1 (electronic musical instrument 30) in association with each other. Among them, the device identifier is registered in the device DB 72*c* at the time of factory shipment of the communication device 1, and the product information and the user identifier are registered in the device DB 72*c* in the setup mode described above.

FIG. 12C is a view schematically showing the sync data 72*e*. As shown in FIG. 12C, the sync data 72*e* stores the identifier of the timbre data or the wave data in association with the attribute information for each user identifier and device identifier. Further, FIG. 12D is a view schematically showing the load history 72*f*. As shown in FIG. 12D, the load history 72*f* stores the identifier of the timbre data and the load count in association with each other for each user identifier.

Figure 13:
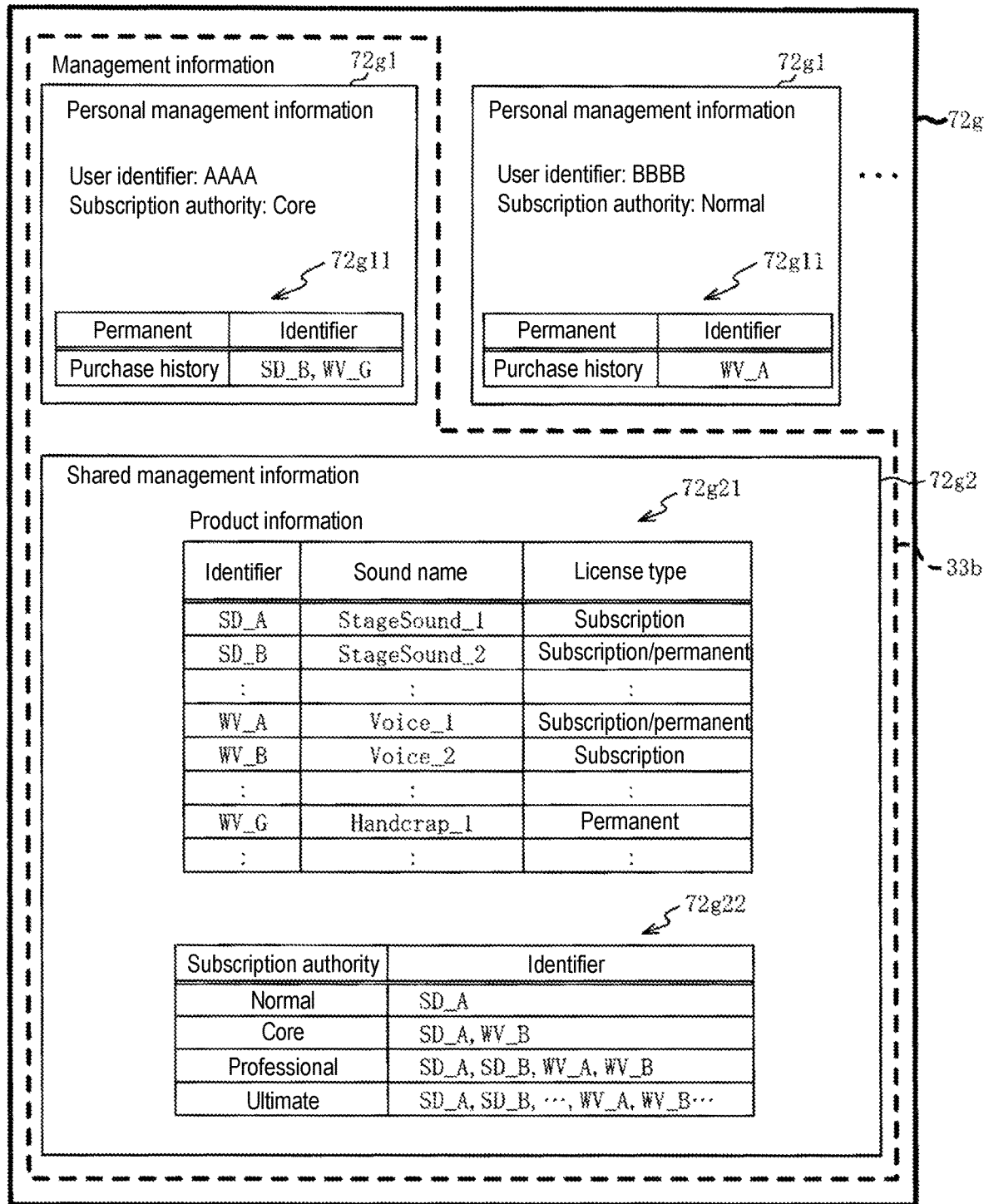
FIG. 13 is a view schematically showing management information.

FIG. 13 is a view schematically showing the management information 72*g*. The management information 72*g* stores management information related to sound data usable by each user H. The management information 72*g* includes personal management information 72*g*1 of each user H registered with the service for obtaining sound data from the server 70, and shared management information 72*g*2 common to all the users H.

The personal management information 72*g*1 stores a user identifier, a subscription authority owned by the user H, and a purchase history 72*g*11 indicating the purchase history of the permanent-type sound data of the user H. When the registration of the user H is canceled, the personal management information 72*g*1 of the user H is deleted from the management information 72*g*.

One of "normal", "core", "professional", and "ultimate" is set as the subscription authority. "Core", "professional", and "ultimate" indicate a contract state in which the user H pays a fixed monthly fee and purchases the right to use specific sound data for a certain period of time.

The shared management information 72*g*2 stores a product information table 72*g*21 in which product information of sound data is stored, and an authority table 72*g*22 in which identifiers of sound data usable with each subscription authority are stored.

The product information table 72*g*21 stores information related to sound data currently being distributed. Specifically, the product information table 72*g*21 stores an identifier, a name, and a license type of a sound data for each sound data. The license type is set to a subscription type ("subscription"), a permanent type ("permanent"), or a combined type ("subscription/permanent") combining the subscription type and the permanent type.

The personal management information 72*g*1 of the user H of the electronic musical instrument 30 among the personal management information 72*g*1 of the management information 72*g* of FIG. 13 and the shared management information 72*g*2 are acquired from the server 70 and stored as management information to the management information 33*b* of the electronic musical instrument 30 described with reference to FIG. 9.

Returning to FIG. 11, the RAM 73 is a memory for rewritably storing various work data, flags, etc. when a program is executed by the CPU 71.

The server 70 performs two types of communication, namely, the communication using the HTTPS protocol and the communication using the MQTT protocol, with the communication device 1 and the mobile terminal 50. Specifically, in the communication using the MQTT protocol, the communication with the communication device 1 and the mobile terminal 50 is performed by exchanging a "topic" being a character string including a user identifier and a device identifier of a target to and from which a data is to be transmitted and received. Examples of the "topic" include "topic/{user identifier}/{device identifier}/# (#: any command such as data request)".

A "subscribe" function is provided for the communication using the MQTT protocol. In the "subscribe" function, by registering (hereinafter referred to as "subscription registration") the user identifier and device identifier for each communication device 1 and mobile terminal 50 with the server 70 in advance, when a topic is transmitted to the server 70, the server 70 transmits the topic to the communication device 1 and the mobile terminal 50 that correspond to the user identifier and the device identifier of the topic among multiple communication devices 1 and mobile terminals 50.

Accordingly, in the subscription registration of each of the communication device 1 (electronic musical instrument 30) and the mobile terminal 50 used by the user H with respect to the server 70, by registering the device identifier of the communication device 1 and the user identifier of the user H, a result obtained by transmitting the topic from the communication device 1 to the server 70 is transmitted to the communication device 1 and also to the mobile terminal 50, and a result obtained by transmitting the topic from the mobile terminal 50 to the server 70 is transmitted to the mobile terminal 50 and also to the communication device 1. By doing so, the communication device 1 and the mobile terminal 50 become able to exchange necessary information via the server 70.

In the subscription registration of the communication device 1, a character string indicating "for the communication device 1" may be registered in addition to the user identifier and the device identifier. In the subscription registration of the mobile terminal 50, a character string indicating "for the mobile terminal 50" may be registered in addition to the user identifier and so on. If registration is performed without addition of these character strings, in the case where a certain topic is processed by the server 70, a processing result is transmitted as well, and the topic transmitted by each of the communication device 1 and the mobile terminal 50 is transmitted (returned) to both of them. Therefore, even if a processing result according to the topic only needs to be transmitted to one of the communication device 1 and the mobile terminal 50, the processing result will always be transmitted to the other of them as well. In order to avoid this, in the subscription registration of the communication device 1, the character string indicating "for the communication device 1" is registered in addition to the user identifier and so on. In the subscription registration of the mobile terminal 50, the character string indicating "for the mobile terminal 50" is registered in addition to the user identifier and so on.

Then, the communication device 1 transmits a topic including the character string indicating "for the communication device 1", and the mobile terminal 50 transmits a topic including the character string indicating "for the mobile terminal 50". Further, the server 70 transmits a topic including the character string "for the communication device 1" in a processing result with respect to the topic including the character string indicating "for the communication device 1". On the other hand, the server 70 transmits a topic including the character string "for the mobile terminal 50" in a processing result with respect to the topic including the character string indicating "for the mobile terminal 50". By doing so, the communication device 1 and the mobile terminal 50 are able to receive only a topic directed to themselves and a processing result according to the topic.

On the contrary, when instructing transmission of a processing result according to a topic for the mobile terminal 50 from the communication device 1, the communication device 1 may transmit a topic including a character string indicating "for the mobile terminal 50". When instructing transmission of a processing result according to a topic for the communication device 1 from the mobile terminal 50, the mobile terminal 50 may transmit a topic including a character string indicating "for the communication device 1".

Next, processings executed by the CPU 10 of the communication device 1, the CPU 51 of the mobile terminal 50, the CPU 71 of the server 70, and the CPU 31 of the electronic musical instrument 30 will be described with reference to FIG. 14A to FIG. 35. First, main processings of the communication device 1, the mobile terminal 50, and the server 70 will be described with reference to FIG. 14A to FIG. 14C. FIG. 14A is a flowchart of a communication device main processing, FIG. 14B is a flowchart of a mobile terminal main processing, and FIG. 14C is a flowchart of a server main processing.

The communication device main processing is a processing executed in the case where power of the communication device 1 is turned on. As shown in FIG. 14A, in the communication device main processing, first, it is confirmed whether an instruction for the setup mode has been given by a long pressing operation on the operation button 2 (S1). In the processing of S1, if there is an instruction for the setup mode (S1: Yes), a BT communication part setup processing (S2) is executed; if there is no instruction for the setup mode (S1: No), the BT communication part setup processing (S2) is skipped. A Wi-Fi main processing (S3) is executed in parallel with the processings of S1 and S2. In the BT communication part setup processing, a processing concerning the BT communication part 5 in the setup mode is performed, and details thereof will be described later with reference to FIG. 15.

Figure 20:
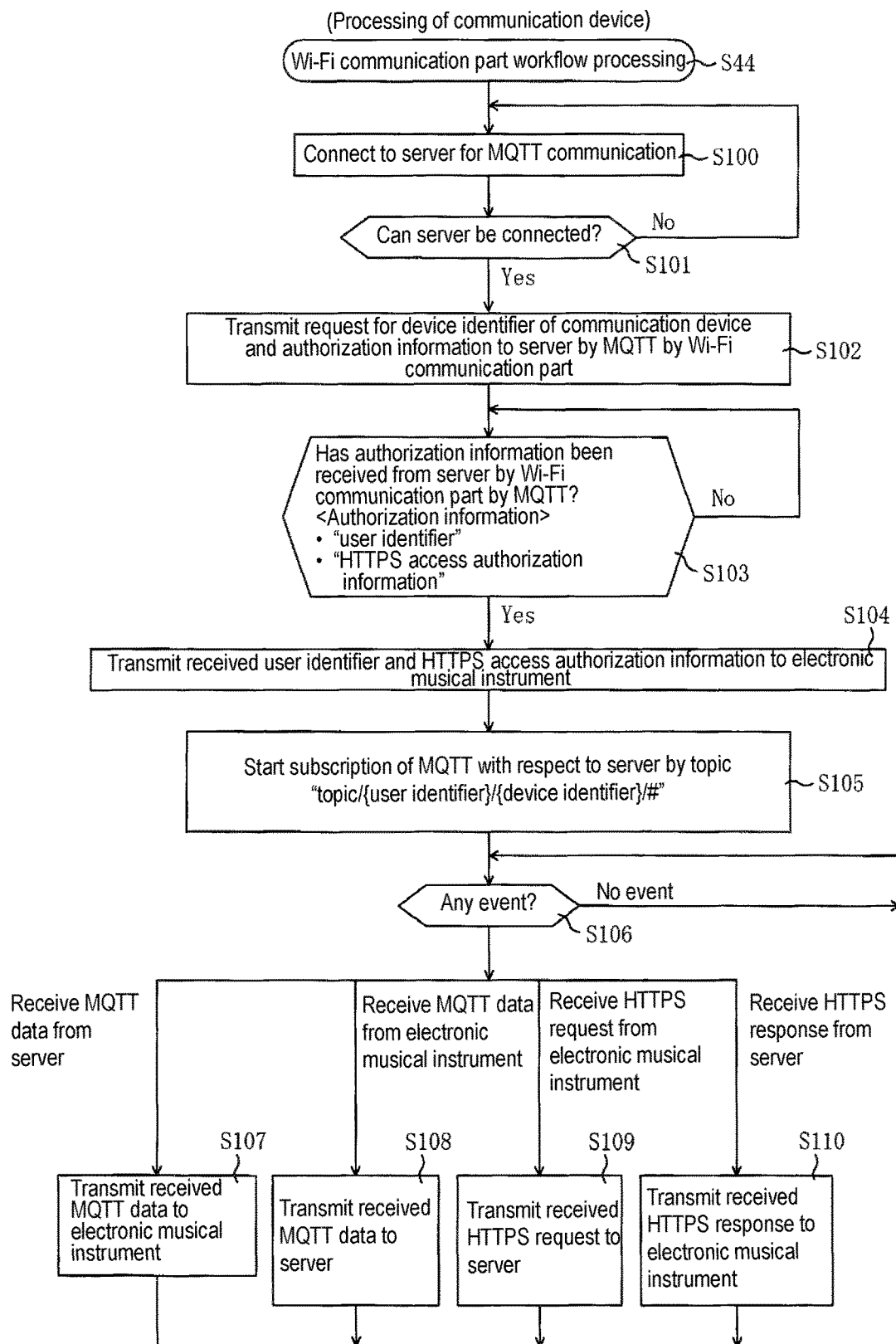
FIG. 20 is a flowchart of a Wi-Fi communication part workflow processing.

In the Wi-Fi main processing, a processing (specifically, a Wi-Fi setup processing to be described later with reference to FIG. 17) concerning the Wi-Fi communication part 4 in the setup mode and a processing (specifically, a Wi-Fi communication part workflow processing to be described later with reference to FIG. 20) concerning the Wi-Fi communication part 4 after the setup mode are performed. Details thereof will be described later.

After the processings of S1 to S3, other processings (S4) concerning the communication device 1 are executed, and after that, the processings of S1 to S3 onwards are repeated. The processings of S1 and S2 and the processing of S3 are not necessarily executed in parallel. The processing of S3 may be executed after the processings of S1 and S2, or the processings of S1 and S2 may be executed after the processing of S3.

The mobile terminal main processing is a processing executed in the case where an application program for the communication system S is launched on the mobile terminal 50. As shown in FIG. 14B, in the mobile terminal main processing, first, it is confirmed whether there is an instruction for the setup mode via the touch panel 57 (S10). In the processing of S10, if there is an instruction for the setup mode (S10: Yes), a mobile terminal setup processing (S11) is executed; if there is no instruction for the setup mode (S10: No), a mobile terminal workflow processing (S12) is executed.

Figure 18:
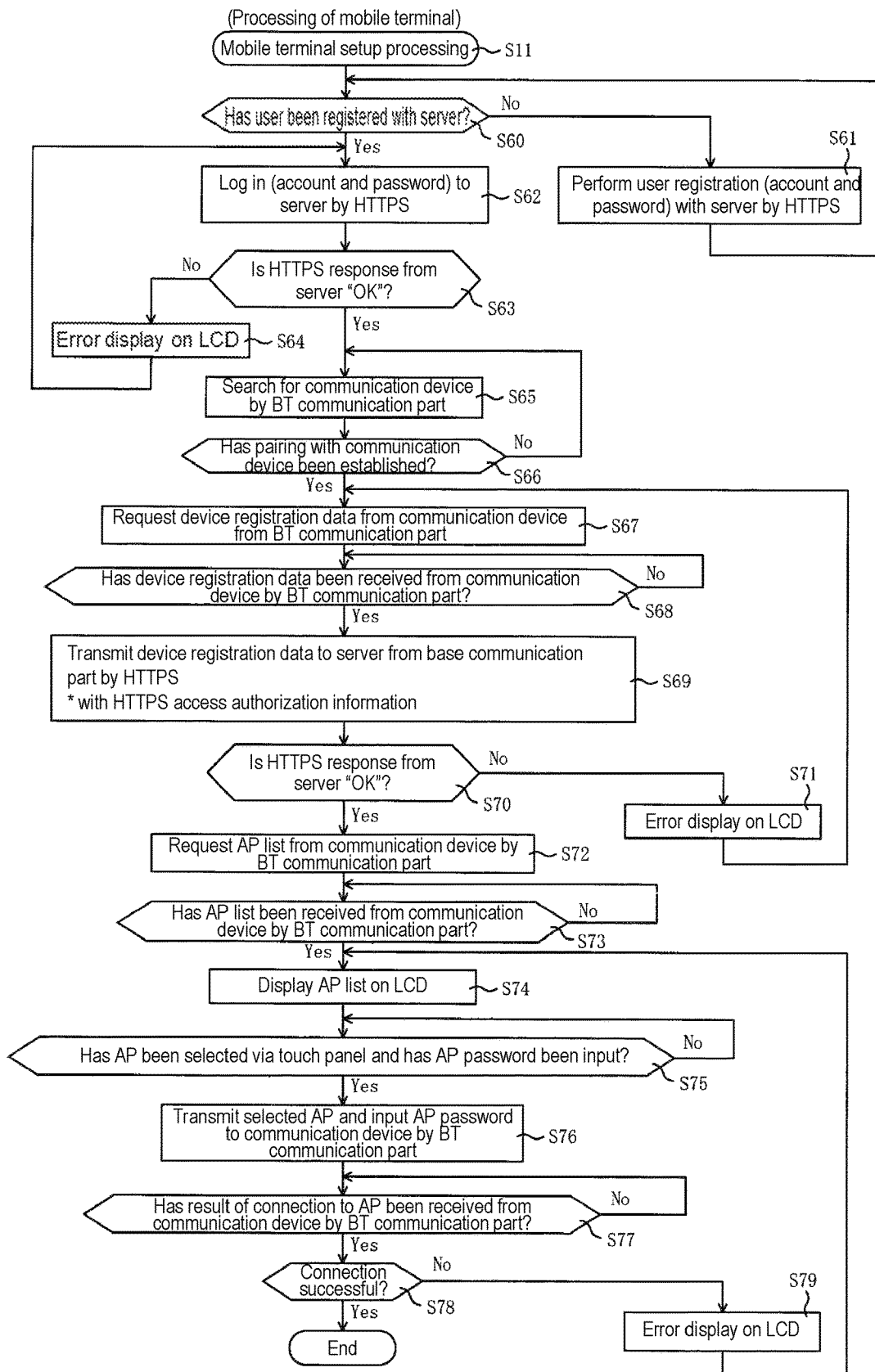
FIG. 18 is a flowchart of a mobile terminal setup processing.

The mobile terminal setup processing of S11 is a processing in the setup mode of the mobile terminal 50, and details thereof will be described later with reference to FIG. 18. The mobile terminal workflow processing of S12 is a processing of the mobile terminal 50 after the setup mode, and details thereof will be described later with reference to FIG. 22. After the processings of S11 and S12, other processings (S13) concerning the mobile terminal 50 are executed, and after that, the processing of S10 onwards is repeated.

The server main processing is a processing executed in the case where power of the server 70 is turned on. As shown in FIG. 14C, in the server main processing, first, a server setup processing (S20), an HTTPS workflow processing (S21), and an MQTT workflow processing (S22) are executed in parallel.

Figure 19:
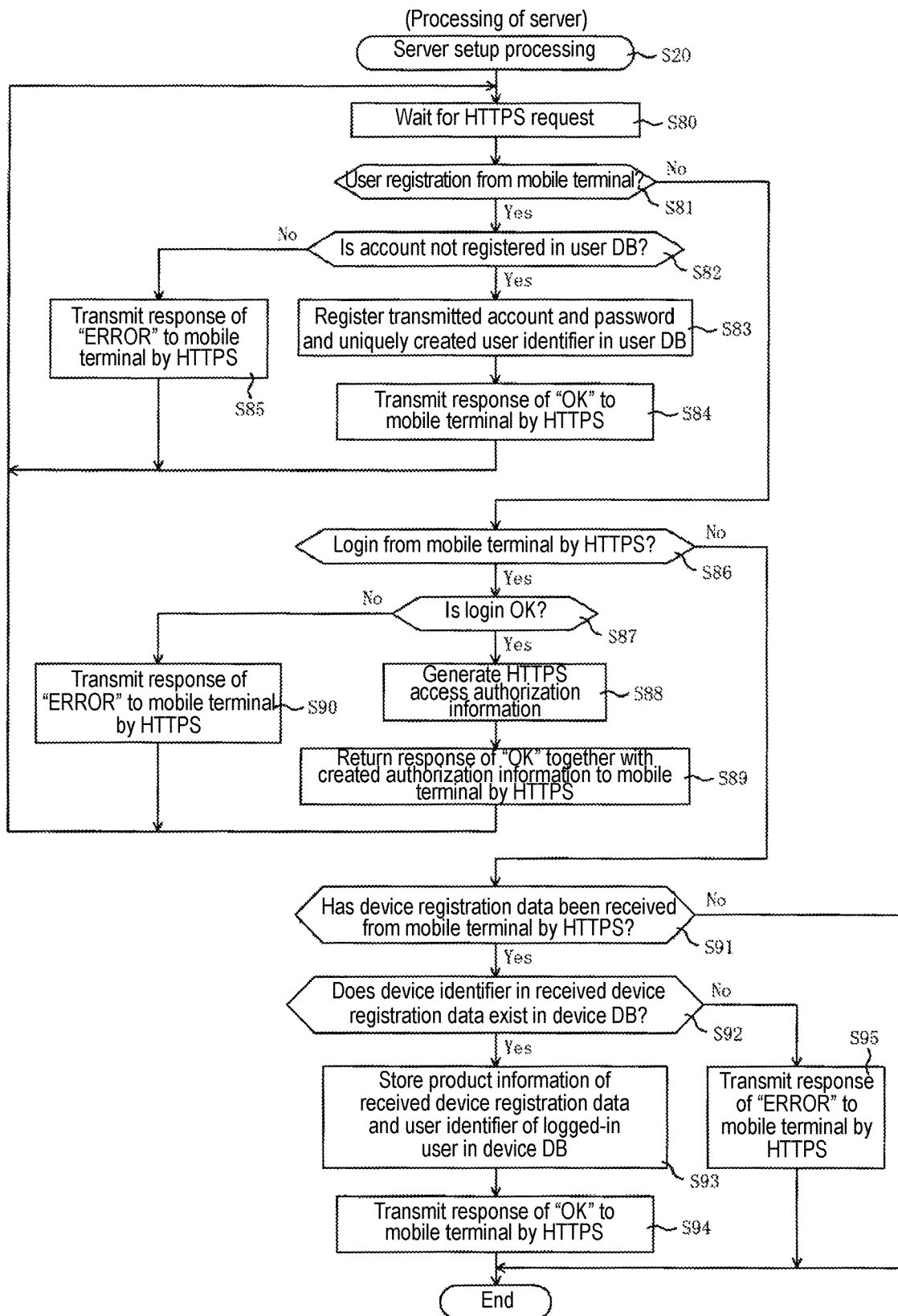
FIG. 19 is a flowchart of a server setup processing.

The server setup processing of S20 is a processing in the setup mode of the server 70, and details thereof will be described later with reference to FIG. 19. The HTTPS workflow processing of S21 is a processing concerning HTTPS protocol communication of the server 70 after the setup mode, and details thereof will be described later with reference to FIG. 23. The MQTT workflow processing of S22 is a processing concerning MQTT protocol communication of the server 70 after the setup mode, and details thereof will be described later with reference to FIG. 24. After the processings of S20 to S22, other processings (S23) concerning the server 70 are executed, and after that, the processings of S20 to S22 onwards are repeated.

The three processings of S20 to S22 are not necessarily executed in parallel. For example, the processing of S20, the processing of S21, and the processing of S22 may be executed one by one in this order. Two of the processings of S20 to S22 may be executed in parallel, followed by the remaining processing; for example, the processing of S20 and the processing of S21 are executed in parallel, followed by the processing of S22. Alternatively, one of the processings of S20 to S22 may be executed, followed by the remaining processings in parallel; for example, the processing of S21 and the processing of S22 are executed in parallel after the processing of S20.

Figure 15:
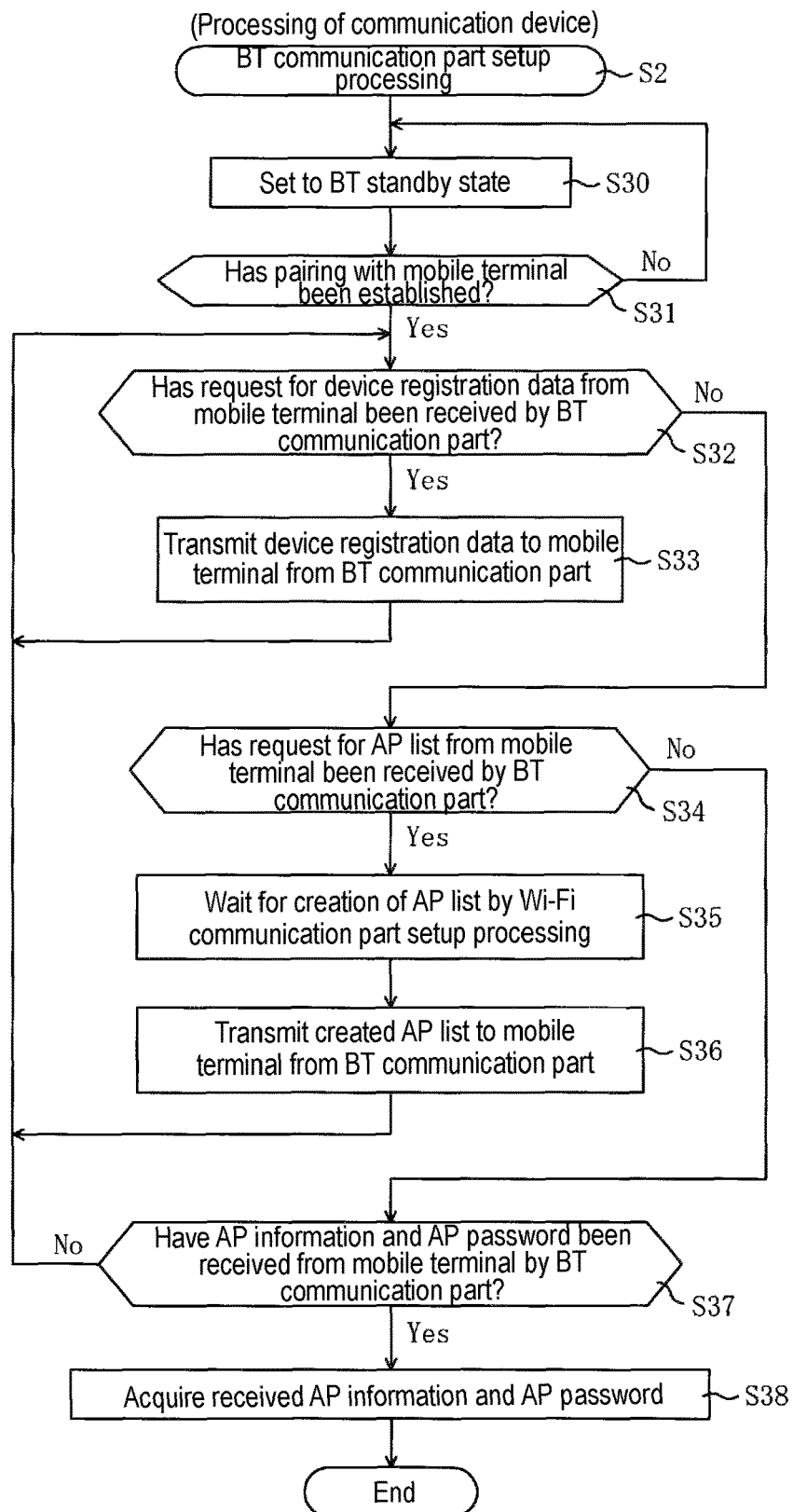
FIG. 15 is a flowchart of a BT communication part setup processing.

First, a processing of the setup mode of the communication device 1 will be described. FIG. 15 is a flowchart of the BT communication part setup processing (S2). In the BT communication part setup processing, first, the BT communication part 5 is set to a standby state (S30). After the processing of S30, it is confirmed whether pairing with the mobile terminal 50 has been established (S31). In the processing of S31, if the pairing has not been established (S31: No), the processing of S30 onwards is repeated.

In the processing of S31, if the pairing with the mobile terminal 50 has been established (S31: Yes), it is confirmed whether a request for the device registration data from the mobile terminal 50 has been received by the BT communication part 5 (S32). In the processing of S32, if the request for the device registration data has been received (S32: Yes), the device registration data of the communication device 1, that is, the device identifier of the device identifier 11b and the product information of the product information 11c, are transmitted to the mobile terminal 50 by the BT communication part 5 (S33). After the processing of S33, the processing of S32 onwards is repeated.

In the processing of S32, if no request for the device registration data has been received (S32: No), it is confirmed whether a request for the list of APs 90 has been received from the mobile terminal 50 by the BT communication part 5 (S34). In the processing of S34, if the request for the list of APs 90 has been received (S34: Yes), standby is performed until the list of APs 90 is created by the processing of S51 of the Wi-Fi communication part setup processing (see FIG. 17) to be described later (S35). After the processing of S35, the created list of APs 90 is transmitted to the mobile terminal 50 from the BT communication part 5 (S36). After the processing of S36, the processing of S32 onwards is repeated.

In the processing of S34, if no request for the list of APs 90 has been received (S34: No), it is confirmed whether the information (AP information) about the AP 90 selected by the user H and the input PSW (AP password) of the AP 90 have been received from the mobile terminal 50 (S37). In the processing of S37, if the information about the AP 90 and the input PSW have been received (S37: Yes), the received information about the AP 90 and the received input PSW are acquired (S38).

The information about the AP 90 and the input PSW acquired by the processing of S38 are respectively stored in the AP information 11d and the AP password 11e. The information about the AP 90 and the input PSW stored in the AP information 11d and the AP password 11e will be used in the connection to the AP 90 after the setup mode.

In the processing of S37, if the information about the AP 90 and the input PSW have not been received (S37: No), the processing of S32 onwards is repeated. After the processing of S38, the BT communication part setup processing is ended. The end of the BT communication part setup processing after the processing of S38 may be on standby until the connection of the Wi-Fi communication part 4 to the AP 90 succeeds in the processings of S54 and S55 to be described later.

After the processing of S38, the communication device 1 may notify the electronic musical instrument 30 that the information about the AP 90 and the input PSW have been acquired. Upon receiving the notification, the electronic musical instrument 30 may restart the communication device 1. The restarted communication device 1 may connect to the AP 90 based on the information about the AP 90 and the input PSW stored in the AP information 11d and the AP password 11e, and may execute the processings after the setup mode.

Figure 16:
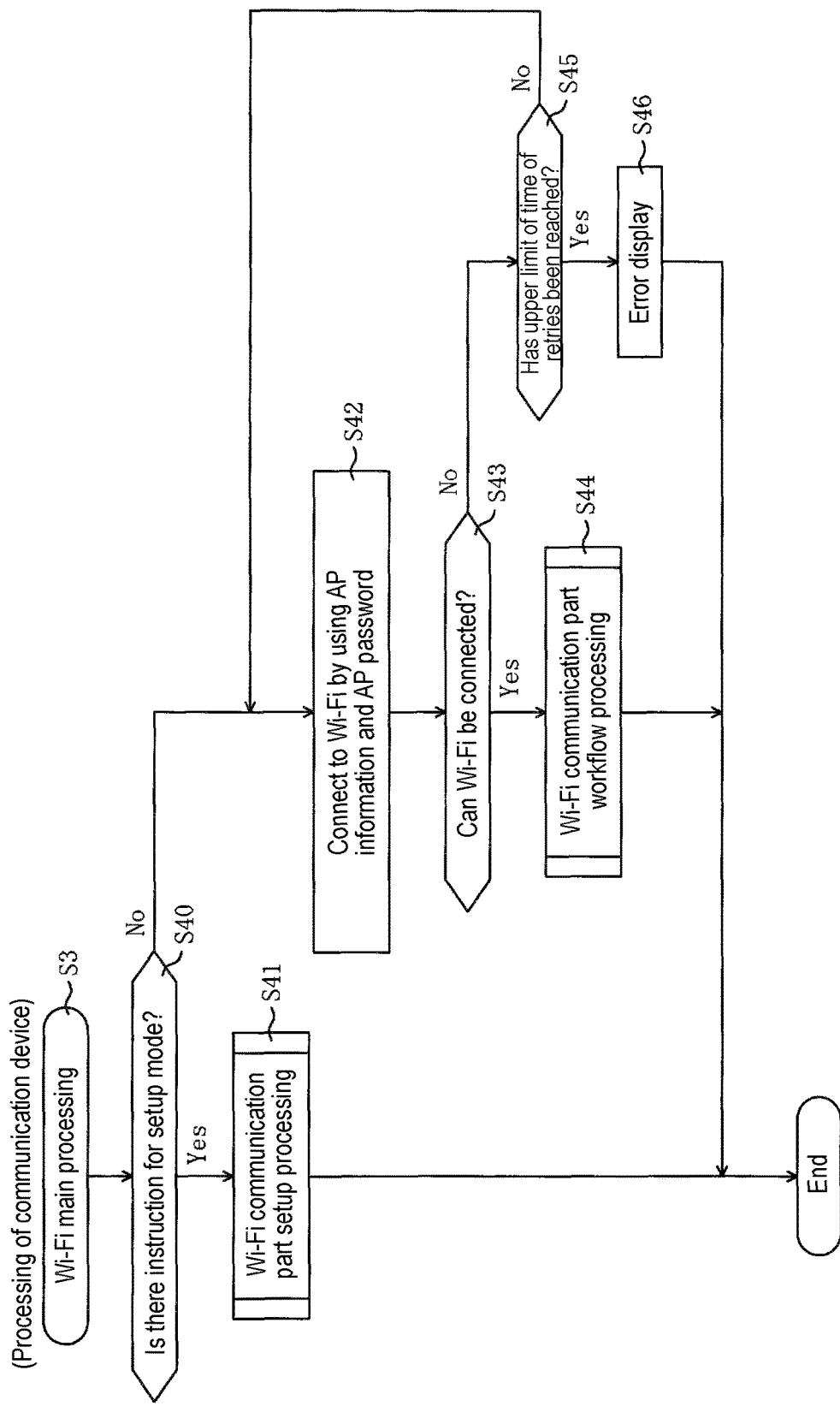
FIG. 16 is a flowchart of a Wi-Fi main processing.

FIG. 16 is a flowchart of the Wi-Fi main processing (S3). In the Wi-Fi main processing, first, it is confirmed whether the operation button 2 of the communication device 1 has been pressed and held and there is an instruction for the setup mode (S40). In the processing of S40, if there is an instruction for the setup mode (S40: Yes), the Wi-Fi communication part setup processing (S41) is executed. Herein, the Wi-Fi communication part setup processing will be described with reference to FIG. 17.

Figure 17:
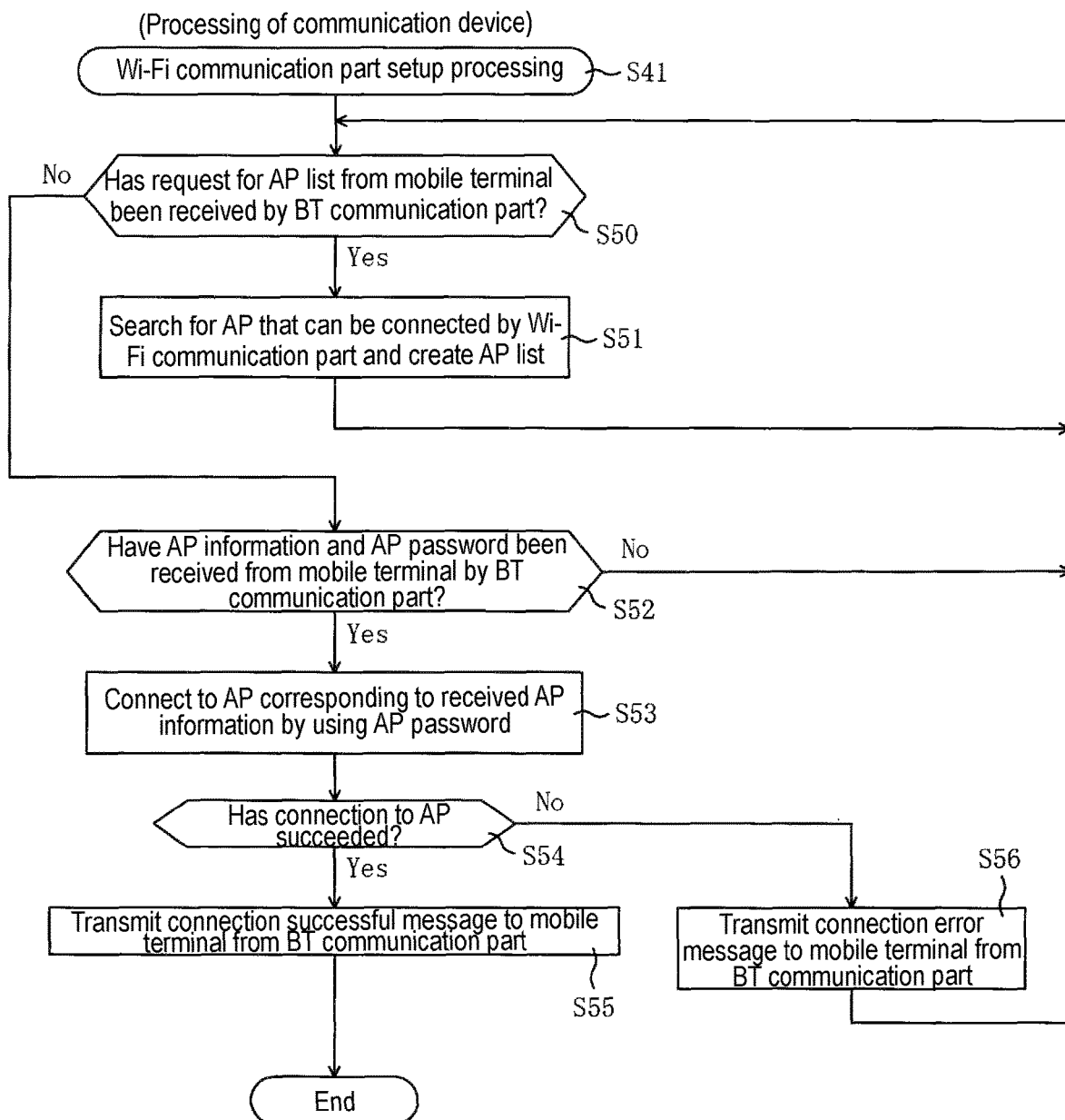
FIG. 17 is a flowchart of a Wi-Fi communication part setup processing.

FIG. 17 is a flowchart of the Wi-Fi communication part setup processing (S41). In the Wi-Fi communication part setup processing, first, it is confirmed whether the request for the list of APs 90 has been received from the mobile terminal 50 by the BT communication part 5 (S50). In the processing of S50, if the request for the list of APs 90 has been received (S50: Yes), a search is performed for the APs 90 that can be connected by the Wi-Fi communication part 4 and a list of the searched APs 90 is created (S51). After the processing of S51, the processing of S50 onwards is repeated.

In the processing of S50, if no request for the list of APs 90 has been received (S50: No), it is confirmed whether the information (AP information) about the AP 90 selected by the user H and the input PSW (AP password) of the AP 90 have been received from the mobile terminal 50 by the BT communication part 5 (S52). In the processing of S52, if the information about the AP 90 and the input PSW have been received (S52: Yes), the AP 90 corresponding to the received information about the AP 90 is connected by the Wi-Fi communication part 4 by using the received input PSW (S53). In the processing of S52, if the information about the AP 90 and the input PSW have not been received (S52: No), the processing of S50 onwards is repeated.

After the processing of S53, it is confirmed whether the connection to the AP 90 by the Wi-Fi communication part 4 has succeeded (S54). In the processing of S54, if the connection to the AP 90 has succeeded (S54: Yes), the fact ("connection successful") that the connection has succeeded is transmitted from the BT communication part 5 to the mobile terminal 50 (S55).

On the other hand, in the processing of S54, if the connection to the AP 90 has failed (S54: No), the fact (connection error) that the connection has failed is transmitted from the BT communication part 5 to the mobile terminal 50 (S56). After the processing of S56, the processing of S50 onwards is repeated. After the processing of S55, the Wi-Fi communication part setup processing is ended.

Next, a processing of the setup mode of the mobile terminal 50 will be described. FIG. 18 is a flowchart of the mobile terminal setup processing (S11). In the mobile terminal setup processing, first, it is confirmed whether user registration of the user H with the server 70 has been completed (S60). In the processing of S60, if the user registration of the user H with the server 70 has not been completed (S60: No), the user registration of the user H is performed by transmitting the account (i.e., e-mail address) and password of the user H to the server 70 (S61). After the processing of S61, the processing of S60 onwards is repeated.

In the processing of S60, if the user registration of the user H with the server 70 has been completed (S60: Yes), login to the server 70 is performed by transmitting the account and password of the user H to the server 70 by communication using the HTTPS protocol (S62). After the processing of S62, it is confirmed whether a response to the login received from the server 70 by communication using the HTTPS protocol is "OK" (S63).

In the processing of S63, if the response to the login is not "OK" (S63: No), display (error display) indicating that the login has failed is performed on the LCD 56 (S64). After the processing of S64, the processing of S62 onwards is repeated.

In the processing of S63, if the response to the login is "OK" (S63: Yes), the HTTPS access authorization information is received from the server 70. Then, pairing with the communication device 1 is performed by searching for the communication device 1 by the BT communication part 60 (S65). After the processing of S65, it is confirmed whether pairing with the communication device 1 has been established (S66). In the processing of S66, if the pairing has not been established (S66: No), the processing of S65 onwards is repeated.

In the processing of S66, if the pairing has been established (S66: Yes), the device registration data is requested from the communication device 1 by the BT communication part 60 (S67). After the processing of S67, it is confirmed whether the device registration data has been received from the communication device 1 by the BT communication part 60 (S68). In the processing of S68, if the device registration data has not been received (S68: No), the processing of S68 is repeated.

In the processing of S68, if the device registration data has been received (S68: Yes), the received device registration data is transmitted to the server 70 from the base communication part 61 by communication using the HTTPS protocol (S69). At this time, the HTTPS access authorization information received by the processing of S63 is included in the transmission.

After the processing of S69, it is confirmed whether a response to the transmission of the device registration data received from the server 70 by communication using the HTTPS protocol is "OK" (S70). In the processing of S70, if the response to the transmission of the device registration data is not "OK" (S70: No), display (error display) indicating that the transmission has failed is performed on the LCD 56 (S71). After the processing of S71, the processing of S67 onwards is repeated. On the other hand, in the processing of S70, if the response to the transmission of the device registration data is "OK" (S70: Yes), a list of APs 90 is requested from the communication device 1 by the BT communication part 60 (S72).

After the processing of S72, it is confirmed whether the list of APs 90 has been received from the communication device 1 by the BT communication part 60 (S73). In the processing of S73, if the list of APs 90 has not been received (S73: No), the processing of S73 is repeated. On the other hand, in the processing of S73, if the list of APs 90 has been received (S73: Yes), the received list of APs 90 is displayed on the LCD 56 (S74).

After the processing of S74, it is confirmed whether an AP 90 on the list displayed on the LCD 56 has been selected via the touch panel 57 and the input PSW (AP password) thereof has been inputted (S75). In the processing of S75, if the AP 90 has not been selected and the input PSW has not been inputted (S75: No), the processing of S75 is repeated. On the other hand, in the processing of S75, if the AP 90 has been selected and the input PSW has been inputted (S75: Yes), the information about the AP 90 and the input PSW are transmitted to the communication device 1 by the BT communication part 60 (S76).

After the processing of S76, it is confirmed whether a result of connection to the AP 90 has been received from the communication device 1 by the BT communication part 60 (S77). In the processing of S77, if the result of connection to the AP 90 has not been received (S77: No), the processing of S77 is repeated. On the other hand, in the processing of S77, if the result of connection to the AP 90 has been received (S77: Yes), it is confirmed whether the received result of connection is "connection successful" (S78).

In the processing of S78, if the received result of connection is "connection error" (S78: No), display (error display) indicating that the connection has failed is performed on the LCD 56 (S79), and the processing of S74 onwards is repeated. On the other hand, in the processing of S78, if the received result of connection is "connection successful" (S78: Yes), the mobile terminal setup processing is ended.

Next, a processing of the setup mode of the server 70 will be described. FIG. 19 is a flowchart of the server setup processing (S20). In the server setup processing, first, standby is performed until communication using the HTTPS protocol occurs (S80). After the processing of S80, it is confirmed whether user registration has been requested from the mobile terminal 50 by communication using the HTTPS protocol (S81).

In the processing of S81, if the user registration has been requested (S81: Yes), it is confirmed whether the account received from the mobile terminal 50 is not registered in the user DB 72b (see FIG. 12A) (S82). In the processing of S82, if the account received from the mobile terminal 50 is not registered in the user DB 72b (S82: Yes), the account and password received from the mobile terminal 50 and a uniquely created user identifier are registered in the user DB 72b (S83). After the processing of S83, the fact ("OK") that the received account has been registered in the user DB 72b is transmitted to the mobile terminal 50 by communication using the HTTPS protocol (S84).

On the other hand, in the processing of S82, if the account received from the mobile terminal 50 has been registered in the user DB 72b (S82: No), the fact (ERROR) that the received account has already been registered in the user DB 72b is transmitted to the mobile terminal 50 by communication using the HTTPS protocol (S85). After the processings of S84 and S85, the processing of S80 onwards is repeated.

In the processing of S81, if no request for user registration has been made (S81: No), it is confirmed whether login has been requested from the mobile terminal 50 by communication using the HTTPS protocol (S86). In the processing of S86, if login has been requested (S86: Yes), login is executed, and it is confirmed whether the login has succeeded (S87). In the processing of S87, if the login has succeeded (S87: Yes), the HTTPS access authorization information of the logged-in user H is created (S88).

After the processing of S88, the created HTTPS access authorization information and the fact ("OK") that the login has succeeded are transmitted to the mobile terminal 50 by communication using the HTTPS protocol (S89).

On the other hand, in the processing of S87, if the login has failed (S87: No), the fact (ERROR) is transmitted by communication using the HTTPS protocol (S90). After the processings of S89 and S90, the processing of S80 onwards is repeated.

In the processing of S86, if it is not a login request (S86: No), it is confirmed whether the device registration data has been received from the mobile terminal 50 by communication using the HTTPS protocol (S91). In the processing of S91, if the device registration data has been received (S91: Yes), it is confirmed whether a device identifier in the received device registration data exists in the device DB 72c (S92).

In the processing of S92, if the device identifier in the received device registration data exists in the device DB 72c (S92: Yes), product information of the received device registration data and the user identifier of the logged-in user H acquired from the user DB 72b are stored to an area for the device identifier of the received device registration data in the device DB 72c (S93). After the processing of S93, the fact ("OK") that the received device registration data has been successfully registered in the device DB 72c is transmitted by communication using the HTTPS protocol (S94).

On the other hand, in the processing of S92, if the device identifier in the received device registration data does not exist in the device DB 72c (S92: No), the fact ("ERROR") that the device registration data is not one belonging to a regular communication device 1 is transmitted by communication using the HTTPS protocol (S95). After the processings of S94 and S95, the server setup processing is ended.

Next, processings of the communication device 1, the mobile terminal 50, and the server 70 after the setup mode will be described. First, a processing of the communication device 1 after the setup mode will be described with reference to FIG. 16 and FIG. 20.

In the processing of S40 of FIG. 16, if there is no instruction for the setup mode (S40: No), the AP 90 is connected by the Wi-Fi communication part 4 by using the information about the AP 90 and the input PSW acquired by the processing of FIG. 15 described above (S42). After the processing of S42, it is confirmed whether connection to the AP 90 can be established (S43).

In the processing of S43, if the AP 90 can be connected (S43: Yes), a Wi-Fi communication part workflow processing (S44) is performed. Details of the Wi-Fi communication part workflow processing will be described later.

On the other hand, if the AP 90 cannot be connected (S43: No), it is confirmed whether the number of attempts to connect to the AP 90 has reached an upper limit of the number (e.g., 10 times) of retries (S45). In the processing of S45, if the number of attempts to connect to the AP 90 has not reached the upper limit of the number of retries (S45: No), the processing of S42 onwards is repeated; if the upper limit of the number of retries has been reached (S45: Yes), an error is displayed by blinking the LED 3 (S46). After the processings of S41, S44, and S46, the Wi-Fi main processing is ended.

Herein, the Wi-Fi communication part workflow processing of S44 will be described with reference to FIG. 20. FIG. 20 is a flowchart of the Wi-Fi communication part workflow processing (S44). In the Wi-Fi communication part workflow processing, first, the server 70 is connected in order to perform communication using the MQTT protocol (S100).

After the processing of S100, it is confirmed whether the server 70 can be connected by the processing of S100 (S101). In the processing of S101, if the server 70 cannot be connected (S101: No), the processing of S100 onwards is repeated.

On the other hand, in the processing of S101, if the server 70 can be connected (S101: Yes), a request topic of authorization information (i.e., the user identifier and the HTTPS access authorization information) is transmitted to the server 70 by the Wi-Fi communication part 4 by using MQTT protocol communication (S102). Such a request topic includes the device identifier of the communication device 1. The processings of S100 and S102 are not necessarily executed according to a judgment made by the communication device 1. For example, in the case where the electronic musical instrument 30 recognizes that the communication device 1 is connected to the server 70, the processings of S100 and S102 may also be executed by giving instructions to the communication device 1 from the electronic musical instrument 30.

After the processing of S102, it is confirmed whether the user identifier and the HTTPS access authorization information have been received from the server 70 by the Wi-Fi communication part 4 by communication using the MQTT protocol (S103). In the processing of S103, if the user identifier and the HTTPS access authorization information have not been received (S103: No), the processing of S103 is repeated.

On the other hand, in the processing of S103, if the user identifier and the HTTPS access authorization information have been received (S103: Yes), the received user identifier and HTTPS access authorization information are transmitted to the electronic musical instrument 30 via the external IF 15 (S104). Hereinafter, communication between the communication device 1 and the electronic musical instrument 30 in the Wi-Fi communication part workflow processing is assumed to be performed via the external IF 15.

The HTTPS access authorization information is not necessarily transmitted to the electronic musical instrument 30, but may, for example, be stored in the communication device 1. At that time, if the HTTPS access authorization information is required for communication using the HTTPS protocol, the electronic musical instrument 30 may instruct the communication device 1 to add the HTTPS access authorization information to the transmission. By doing so, since the HTTPS access authorization information can be prevented from leaking from the external IFs 15 and 37, security in the communication between the electronic musical instrument 30 and the server 70 can be improved.

In the electronic musical instrument 30, an instruction for utilizing a resource such as timbre data is created for the server 70 by using the user identifier and the HTTPS access authorization information received from the communication device 1. Details thereof will be described with reference to FIG. 21B in the electronic musical instrument workflow processing to be described later.

After the processing of S104, subscription registration is performed with respect to the server 70 by the user identifier received by the processing of S103 and the device identifier of the device identifier 11b (S105). From this point on, the communication device 1 becomes able to receive MQTT data including the topic "topic/{user identifier}/{device identifier}/#".

By transmitting the MQTT data including the topic from the mobile terminal 50 to the server 70, the communication device 1 receives the MQTT data from the server 70. A result obtained by receiving the MQTT data from the communication device 1 or the mobile terminal 50 and processing the same by the server 70 is transmitted to the communication device 1 as the MQTT data including the topic. In this way, the communication device 1 becomes able to exchange commands or data with the server 70 or with the mobile terminal 50 via the server 70.

After the processing of S105, various events in the communication device 1 are confirmed (S106). In the processing of S106, if the MQTT data, i.e., a topic from the server 70 and a payload transmitted together with the topic, are received from the server 70 (S106: receive MQTT data from server), the MQTT data is transmitted to the electronic musical instrument 30 via the external IF 15 (S107). Herein, the MQTT data refers to a topic and a payload transmitted together with the topic. This payload includes information accompanying instructions for the electronic musical instrument 30 or the server 70, a resource such as timbre data requested from the server 70, a result of processing by the server 70, etc.

In the processing of S106, if the MQTT data is received from the electronic musical instrument 30 (S106: receive MQTT data from electronic musical instrument), the MQTT data is transmitted to the server 70 by communication using MQTT (S108).

In the processing of S106, if an HTTPS request is received from the electronic musical instrument 30 (S106: receive HTTPS request from electronic musical instrument), the HTTPS request is transmitted to the server 70 by communication using the HTTPS protocol (S109).

In the processing of S106, if an HTTPS response is received from the server 70 (S106: receive HTTPS response from server), the HTTPS response is transmitted to the electronic musical instrument 30 (S110). On the other hand, if no event has been received in the processing of S106 (S106: "no event"), or, after the processings of S107 to S110, the processing of S106 onwards is repeated.

Next, the processing of the electronic musical instrument 30 will be described with reference to FIG. 21A and FIG. 21B. FIG. 21A is a flowchart of the electronic musical instrument main processing. The electronic musical instrument main processing is a processing executed after power-on of the electronic musical instrument 30.

In the electronic musical instrument main processing, first, an electronic musical instrument upon-startup processing (S110) is performed. The electronic musical instrument upon-startup processing is a processing executed at the time of startup of the electronic musical instrument 30 and will be described later with reference to FIG. 33 to FIG. 35. After the electronic musical instrument upon-startup processing of S110, the electronic musical instrument workflow processing (S111) is performed, and other processings (S112) related to the electronic musical instrument 30 are performed, and then the processing of S111 onwards is repeated. Herein, the electronic musical instrument workflow processing of S111 will be described with reference to FIG. 21B.

Figure 21B:
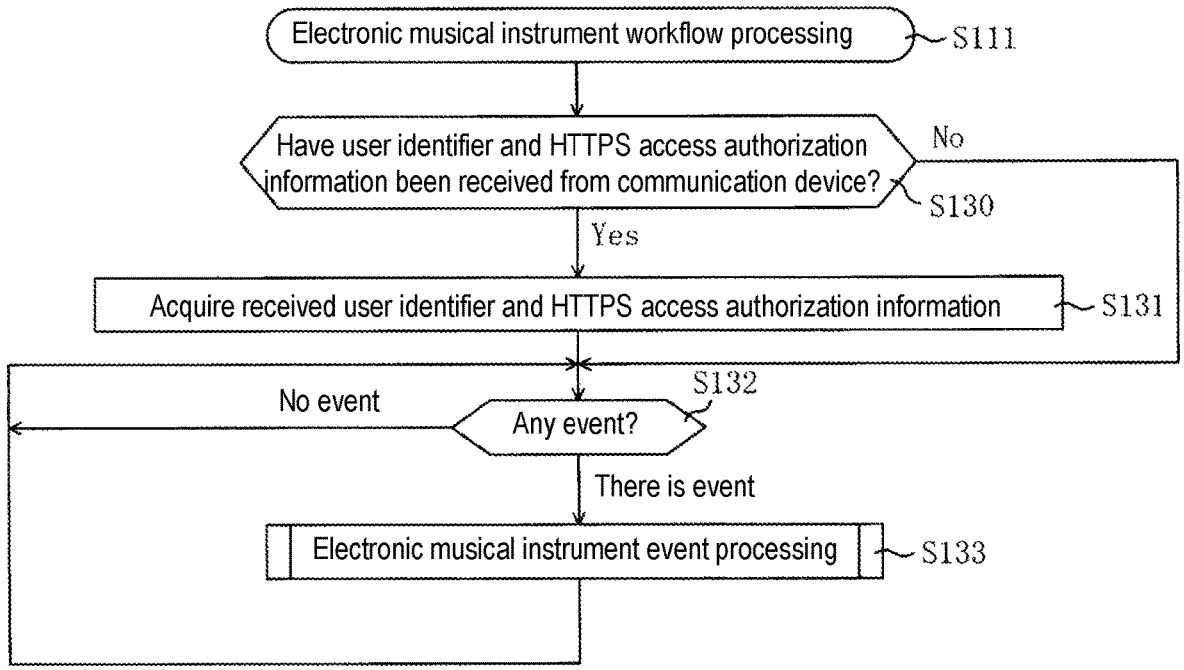
FIG. 21B is a flowchart of an electronic musical instrument workflow processing.

FIG. 21B is a flowchart of the electronic musical instrument workflow processing. In the electronic musical instrument workflow processing, first, it is confirmed whether the user identifier and the HTTPS access authorization information have been received from the communication device 1 via the external IF 37 (S130). Hereinafter, communication between the electronic musical instrument 30 and the communication device 1 in the electronic musical instrument workflow processing is assumed to be performed via the external IF 37.

In the processing of S130, if the user identifier and the HTTPS access authorization information have been received (S130: Yes), the received user identifier and HTTPS access authorization information are acquired (S131). On the other hand, in the processing of S130, if the user identifier and the HTTPS access authorization information have not been received (S130: No), the processing of S131 is skipped.

After the processings of S130 and S131, various events are confirmed in the electronic musical instrument 30 (S132). In the processing of S132, if there is an event (S132: "there is event"), an electronic musical instrument event processing (S133) is executed; if there is no event (S132: "no event"), the processing of S132 onwards is repeated. The electronic musical instrument event processing of S133 will be described later with reference to FIG. 30.

Figure 22:
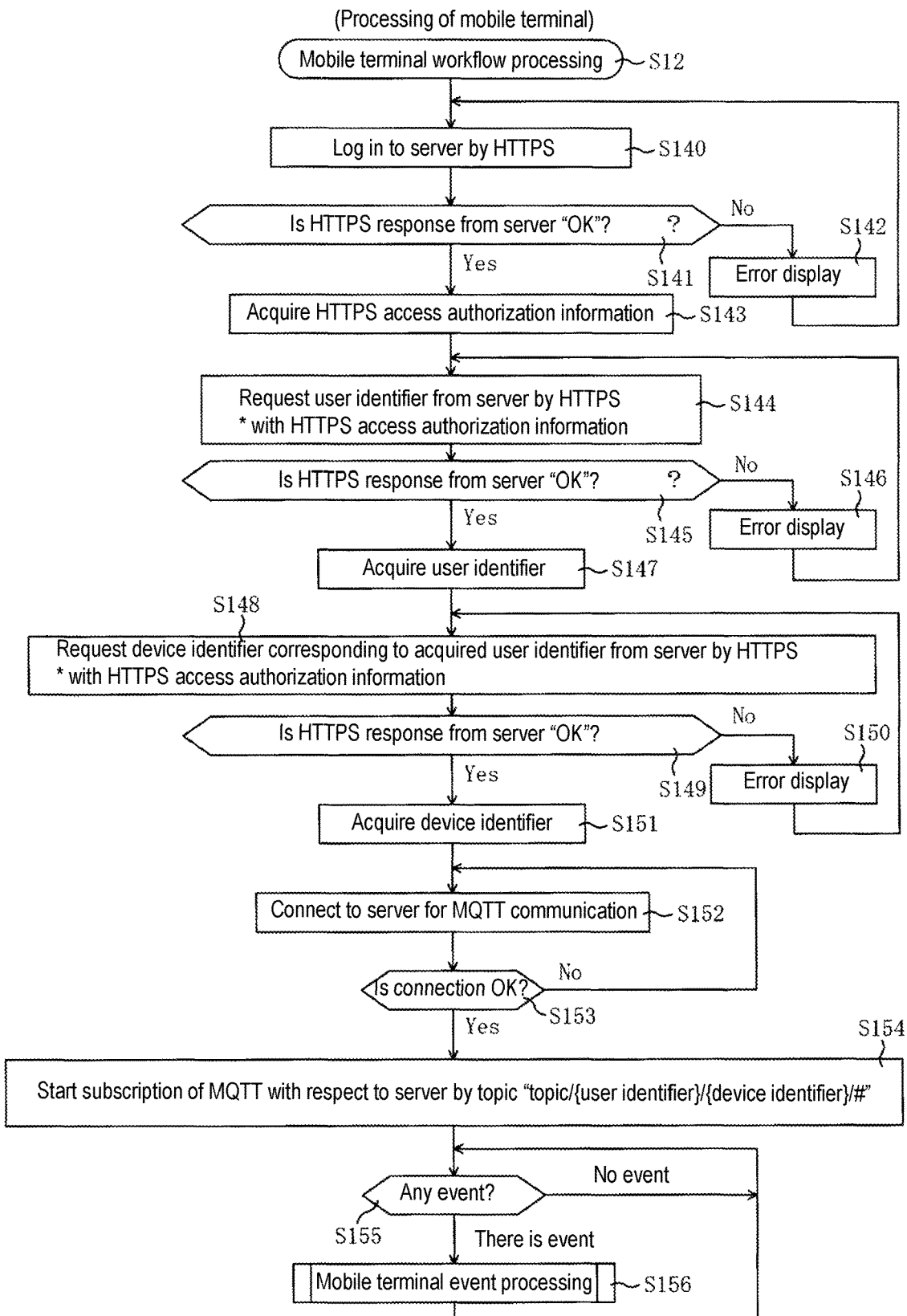
FIG. 22 is a flowchart of a mobile terminal workflow processing.

Next, a processing of the mobile terminal 50 after the setup mode will be described with reference to FIG. 22. FIG. 22 is a flowchart of the mobile terminal workflow processing (S12). In the mobile terminal workflow processing, first, the user H logs in to the server 70 by communication using the HTTPS protocol (S140).

After the processing of S140, it is confirmed whether a response to the login received from the server 70 by communication using the HTTPS protocol is "OK" (S141). In the processing of S141, if the response to the login is not "OK" (S141: No), display (error display) indicating that the login has failed is performed on the LCD 56 (S142). After the processing of S142, the processing of S140 onwards is repeated.

On the other hand, in the processing of S141, if the response to the login is "OK" (S141: Yes), the HTTPS access authorization information received from the server 70 is acquired together with the response to the login (S143). The acquired HTTPS access authorization information will be used in subsequent HTTPS protocol communication from the mobile terminal 50 to the server 70. After the processing of S143, the user identifier of the user H is requested from the server 70 by communication using the HTTPS protocol (S144). At this time, the HTTPS access authorization information received by the processing of S63 in FIG. 18 is also transmitted. After the processing of S144, it is confirmed whether a response to the request for the user identifier is "OK" (S145).

In the processing of S145, if the response to the request for the user identifier is not "OK" (S145: No), display (error display) indicating that the request for the user identifier has failed is performed on the LCD 56 (S146). After the processing of S146, the processing of S144 onwards is repeated. In the processing of S145, if the response to the request for the user identifier is "OK" (S145: Yes), the user identifier is acquired from the server 70 (S147).

After the processing of S147, a device identifier corresponding to the acquired user identifier is requested from the server 70 by communication using the HTTPS protocol (S148). At this time, the HTTPS access authorization information received by the processing of S63 in FIG. 18 is also transmitted. After the processing of S148, it is confirmed whether a response to the request for the device identifier is "OK" (S149). In the processing of S149, if the response to the request for the device identifier is not "OK" (S149: No), display (error display) indicating that the request for the device identifier has failed is performed on the LCD 56 (S150). After the processing of S150, the processing of S148 onwards is repeated. In the processing of S149, if the response to the request for the device identifier is "OK" (S149: Yes), the device identifier is acquired from the server 70 (S151).

After the processing of S151, the server 70 is connected in order to perform communication using the MQTT protocol (S152). After the processing of S152, it is confirmed whether the server 70 can be connected by the processing of S152 (S153). In the processing of S153, if the server 70 cannot be connected (S153: No), the processing of S152 onwards is repeated.

In the processing of S153, if the server 70 can be connected (S153: Yes), subscription registration is performed with respect to the server 70 by the user identifier received by the processing of S147 and the device identifier received by the processing of S151 (S154). From this point on, the mobile terminal 50 becomes able to receive MQTT data including the topic "topic/{user identifier}/{device identifier}/# (#: any command such as data request or data)".

By transmitting the MQTT data including the topic from the communication device 1 to the server 70, the mobile terminal 50 receives the MQTT data from the server 70. A result obtained by receiving the MQTT data from the communication device 1 or the mobile terminal 50 and processing the same by the server 70 is transmitted to the mobile terminal 50 as the MQTT data including the topic. In this way, the mobile terminal 50 becomes able to exchange commands or data with the server 70 or with the communication device 1 via the server 70.

After the processing of S154, various events of the mobile terminal 50 are confirmed (S155). In the processing of S155, if there is an event (S155: "there is event"), a mobile terminal event processing (S156) is executed; if there is no event (S155: "no event"), the processing of S155 onwards is repeated. The mobile terminal event processing of S156 will be described later with reference to FIG. 25.

Figure 23:
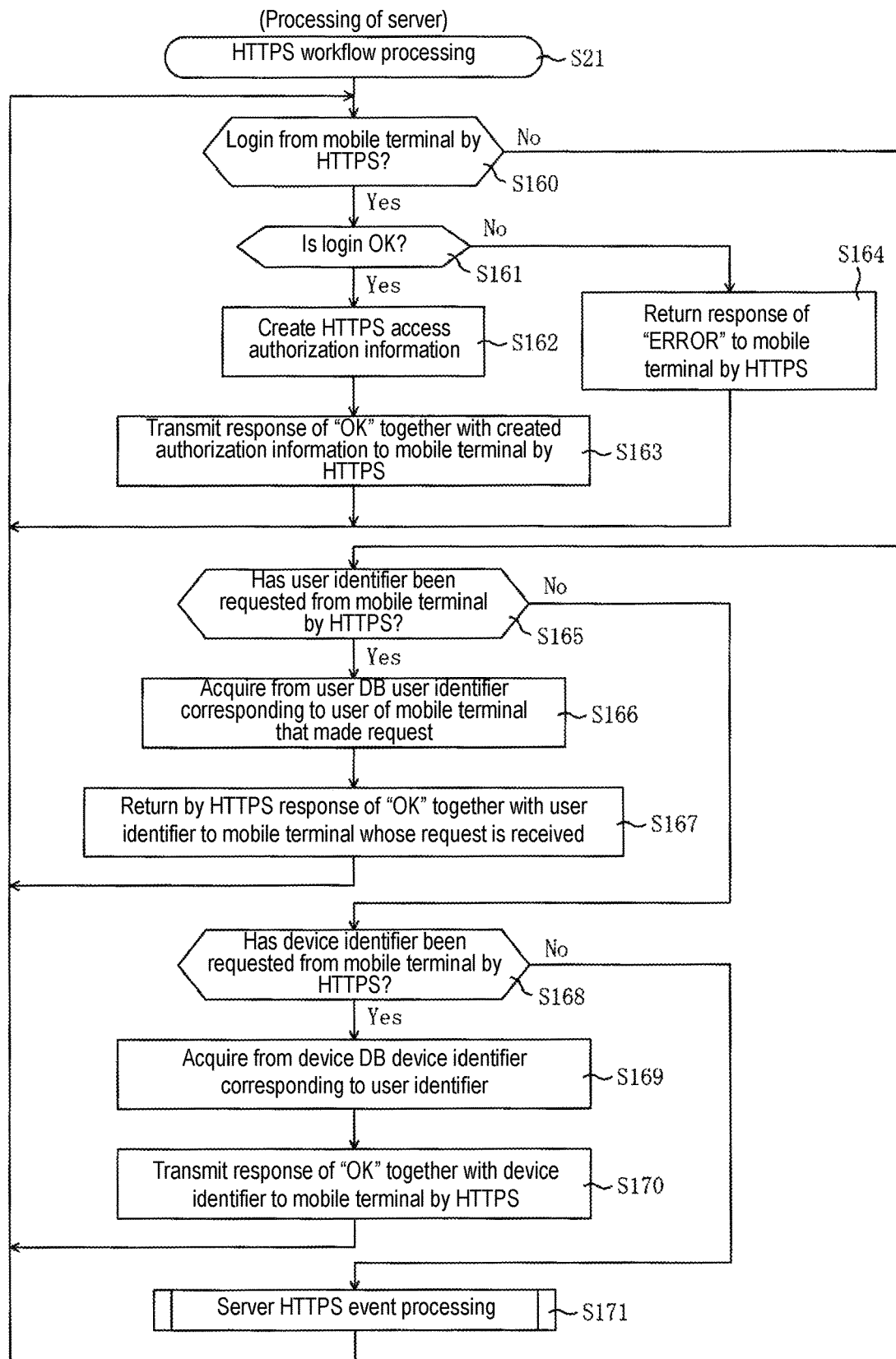
FIG. 23 is a flowchart of an HTTPS workflow processing.

Next, a processing of the server 70 after the setup mode will be described with reference to FIG. 23 and FIG. 24. FIG. 23 is a flowchart of the HTTPS workflow processing (S21). In the HTTPS workflow processing, first, it is confirmed whether login has been requested from the mobile terminal 50 by communication using the HTTPS protocol (S160).

In the processing of S160, if login has been requested (S160: Yes), login is executed, and it is confirmed whether the login has succeeded (OK) (S161). In the processing of S161, if the login has succeeded (S161: Yes), the HTTPS access authorization information of the logged-in user H is created (S162). After the processing of S162, a response of "OK" to the login is transmitted together with the created HTTPS access authorization information to the mobile terminal 50 by communication using the HTTPS protocol (S163).

On the other hand, in the processing of S161, if the login has failed (S161: No), a response of "ERROR" to the login is transmitted to the mobile terminal 50 by communication using the HTTPS protocol (S164). After the processings of S163 and S164, the processing of S160 onwards is repeated.

In the processing of S160, if it is not a login request (S160: No), it is confirmed whether a request for a user identifier has been made from the mobile terminal 50 by communication using the HTTPS protocol (S165). In the processing of S165, if a request for the user identifier has been made (S165: Yes), a user identifier corresponding to the account of the user H of the mobile terminal 50 that made the request is acquired from the user DB 72b (S166). After the processing of S166, the acquired user identifier and a response of "OK" to the request for the user identifier are transmitted to the mobile terminal 50 by communication using the HTTPS protocol (S167). After the processing of S167, the processing of S160 onwards is repeated.

In the processing of S165, if it is not a request for the user identifier (S165: No), it is confirmed whether a request for a device identifier has been made from the mobile terminal 50 by communication using the HTTPS protocol (S168). In the processing of S168, if a request for the device identifier has been made (S168: Yes), a user identifier corresponding to the account of the user H of the mobile terminal 50 that made the request is acquired from the user DB 72b, and a device identifier corresponding to the user identifier is further acquired from the device DB 72c (S169).

After the processing of S169, the acquired device identifier and a response of "OK" to the request for the device identifier are transmitted to the mobile terminal 50 by communication using the HTTPS protocol (S170). After the processing of S170, the processing of S160 onwards is repeated.

In the processing of S168, if it is not a request for the device identifier (S168: No), a server HTTPS event processing (S171) is executed, and the processing of S160 onwards is repeated. The server HTTPS event processing of S171 will be described later with reference to FIG. 28.

Figure 24:
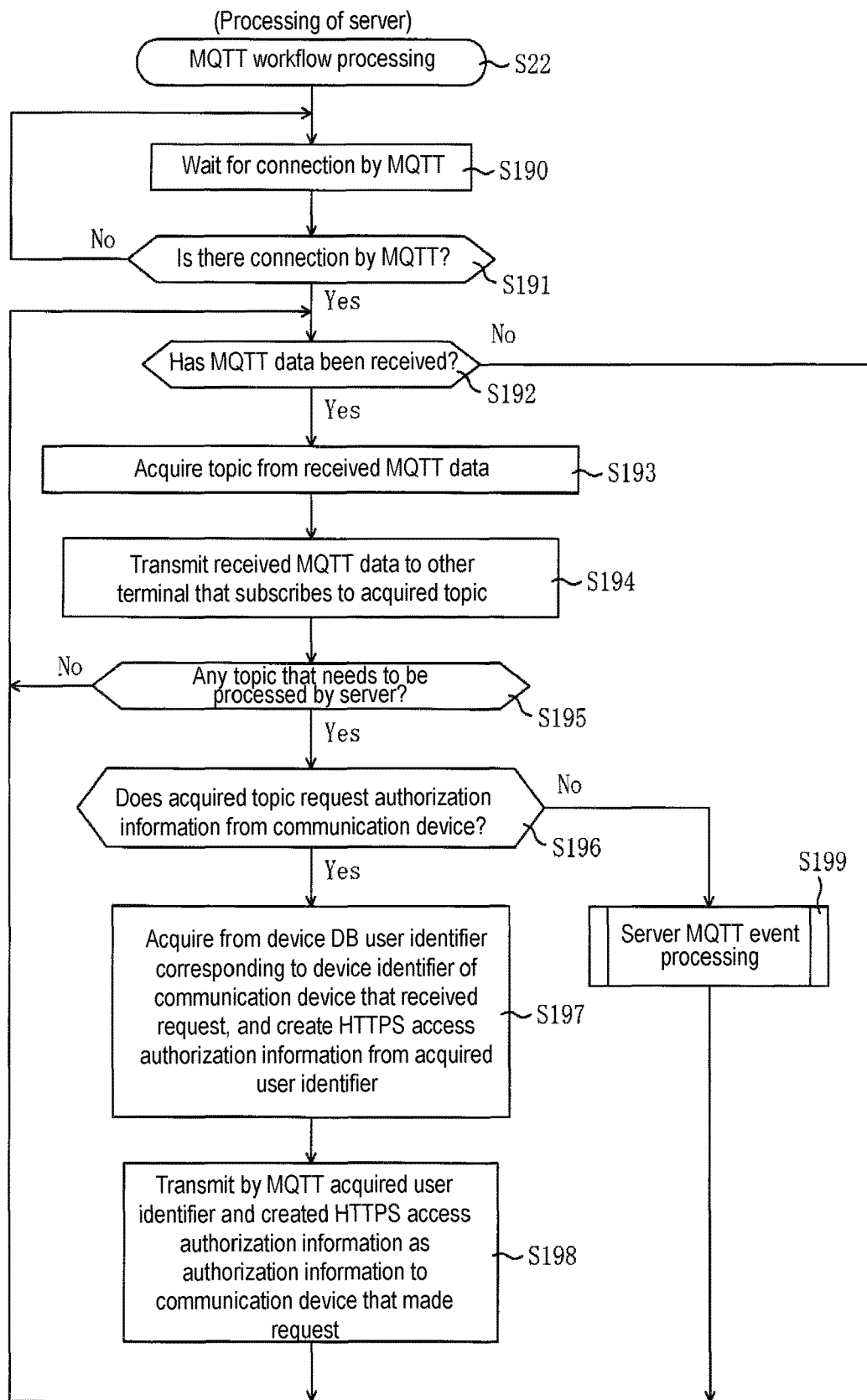
FIG. 24 is a flowchart of an MQTT workflow processing.

FIG. 24 is a flowchart of the MQTT workflow processing (S22). In the MQTT workflow processing, first, standby is performed until communication connection using the MQTT protocol occurs (S190). After the processing of S190, it is confirmed whether a connection has been made by communication using the MQTT protocol (S191). In the processing of S191, if no connection has been made by communication using the MQTT protocol (S191: No), the processing of S190 onwards is repeated.

On the other hand, in the processing of S191, if a connection has been made by communication using the MQTT protocol (S191: Yes), it is further confirmed whether an MQTT data has been received (S192).

In the processing of S192, if the MQTT data has been received (S192: Yes), a topic of the received MQTT data is acquired (S193). After the processing of S193, the MQTT data received by the processing of S192 is transmitted to a terminal (i.e., the communication device 1 or the mobile terminal 50) that subscribes to the acquired topic (S194).

Accordingly, since the MQTT data received from the communication device 1 or the mobile terminal 50 is transmitted to the mobile terminal 50 or the communication device 1 used by the same user H, the MQTT data transmitted from the communication device 1 or the mobile terminal 50 can be utilized and managed at the terminals of both devices.

After the processing of S194, it is confirmed whether the topic acquired by the processing of S193 includes a command that needs to be processed by the server 70 (S195). In the processing of S195, if the acquired topic includes a command that needs to be processed by the server 70 (S195: Yes), it is confirmed whether the command of the topic relates to a request for authorization information (i.e., user identifier and HTTPS access authorization information) from the communication device 1 (S196).

In the processing of S196, if it relates to a request for authorization information from the communication device 1 (S196: Yes), a user identifier corresponding to the device identifier of the communication device 1 that received the request is acquired from the device DB 72c, and the HTTPS access authorization information is created from the acquired user identifier (S197). After the processing of S197, the user identifier acquired and the HTTPS access authorization information created by the processing of S197 are transmitted to the communication device 1 that made the request by communication using the MQTT protocol (S198).

On the other hand, in the processing of S196, if it is not related to the request for authorization information from the communication device 1 (S196: No), the server MQTT event processing (S199) is executed. The server MQTT event processing of S199 will be described later with reference to FIG. 27.

Next, the event processing in each of the mobile terminal 50, the server 70, and the electronic musical instrument 30 will be described. In the event processing, the loading, the writing, and the installation described with reference to FIG. 4 to FIG. 7 are mainly processed. First, the event processing of the mobile terminal 50 will be described with reference to FIG. 25.

Figure 25:
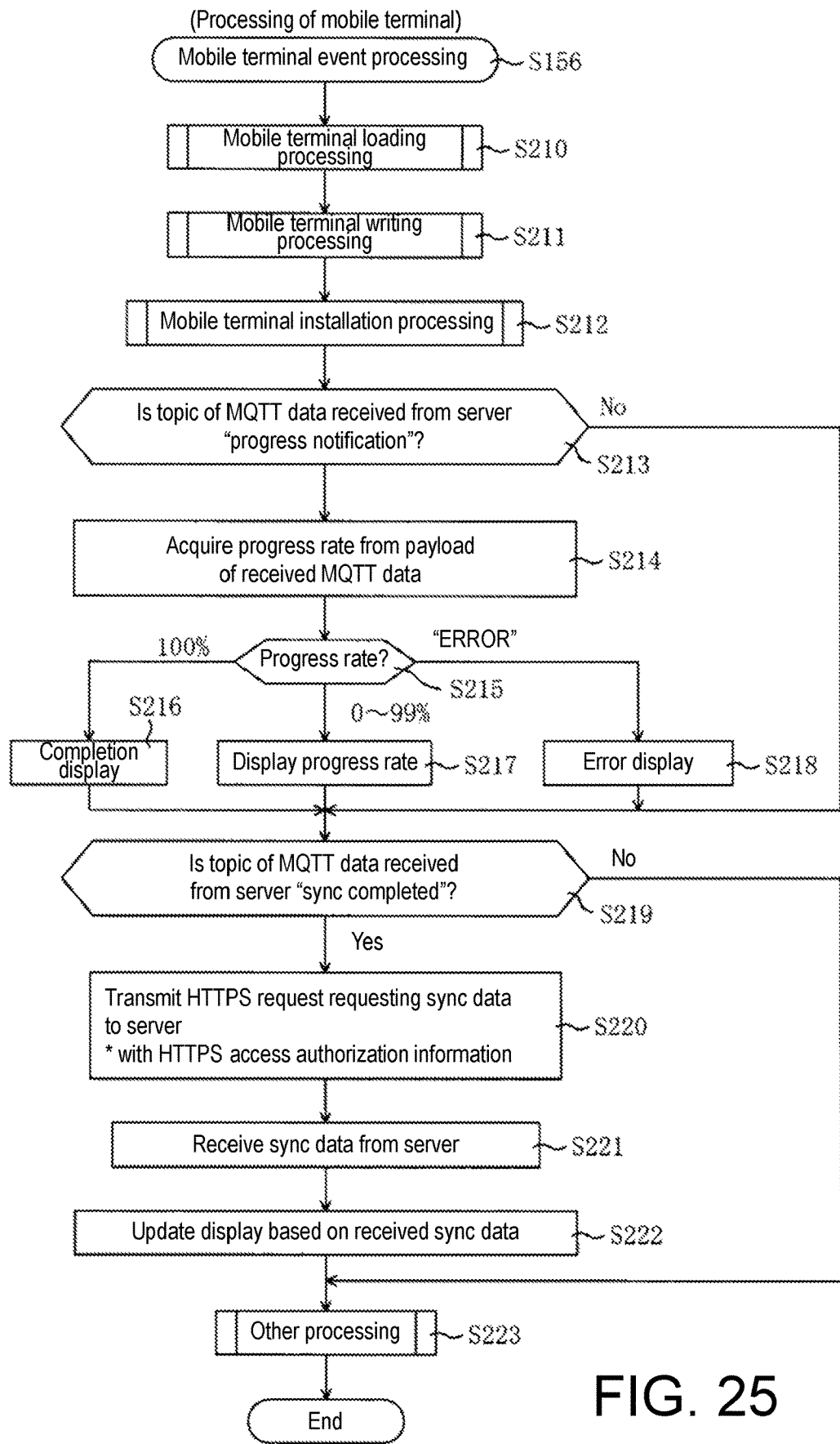
FIG. 25 is a flowchart of a mobile terminal event processing.

FIG. 25 is a flowchart of the mobile terminal event processing (S156). In the mobile terminal event processing, first, a mobile terminal loading processing (S210), a mobile terminal writing processing (S211), and a mobile terminal installation processing (S212) are executed. These processings will be described with reference to FIG. 26A to FIG. 26C.

Figure 26A:
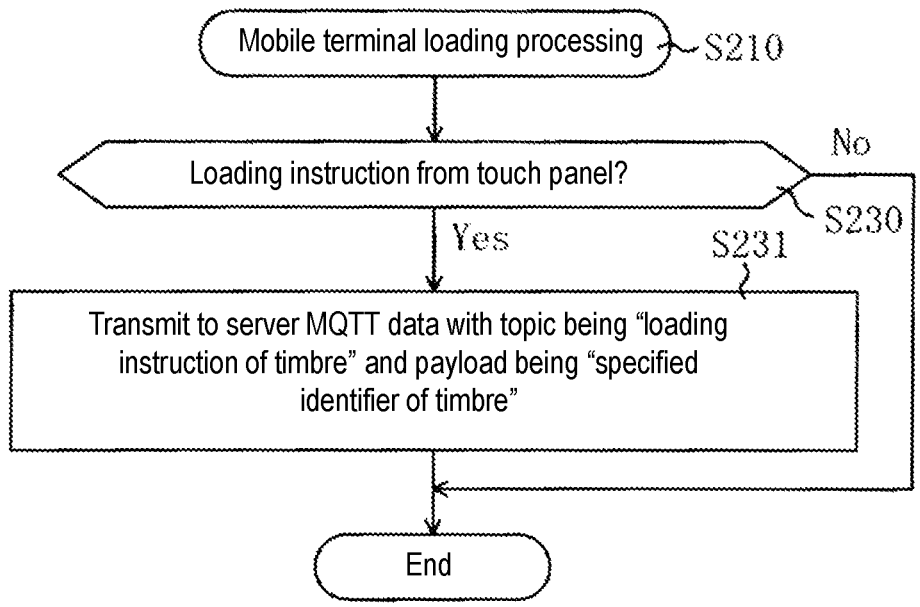
FIG. 26A is a flowchart of a mobile terminal loading processing.

FIG. 26A is a flowchart of the mobile terminal loading processing (S210). The mobile terminal loading processing is a processing related to loading in the mobile terminal 50. In the mobile terminal loading processing, first, it is confirmed whether loading has been instructed via the touch panel 57 (S230). In the processing of S230, if loading has been instructed (S230: Yes), an MQTT data is created with the topic being "instruction for loading timbre data" and the payload being "identifier of timbre data" specified via the touch panel 57. The topic of such an MQTT data includes the user identifier of the user H and the device identifier of the device registration data of the communication device 1 acquired by the processing of S67 of FIG. 18. The created MQTT data is transmitted to the server 70 by communication using the MQTT protocol (S231).

In the processing of S230, if loading has not been instructed (S230: No), the processing of S231 is skipped. After the processings of S230 and S231, the mobile terminal loading processing is ended.

Figure 26B:
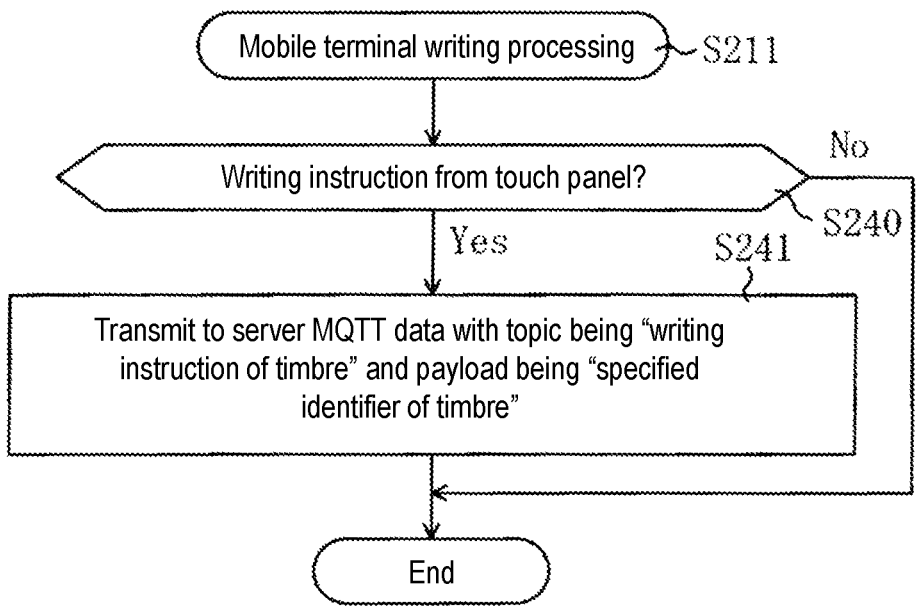
FIG. 26B is a flowchart of a mobile terminal writing processing.

FIG. 26B is a flowchart of the mobile terminal writing processing (S211). The mobile terminal writing processing is a processing related to writing in the mobile terminal 50. In the mobile terminal writing processing, first, it is confirmed whether writing has been instructed via the touch panel 57 (S240). In the processing of S240, if writing has been instructed (S240: Yes), an MQTT data is created with the topic being "instruction for writing timbre data" and the payload being "identifier of timbre data" specified via the touch panel 57. The topic of such an MQTT data includes the device identifier of the device registration data of the communication device 1 and the user identifier of the user H. The created MQTT data is transmitted to the server 70 by communication using the MQTT protocol (S241).

In addition, "identifier indicating writing destination area" may also be included in the payload of the MQTT data transmitted by the processing of S241. Such an MQTT data is also transmitted from the server 70 to the electronic musical instrument 30 in the processing of S270 to be described later. Then, when the electronic musical instrument 30 stores the timbre data received from the server 70 by the processing of S335 to be described later, the timbre data received from the server 70 may be stored to an area of the timbre memory 32b corresponding to "identifier indicating writing destination area" included in the payload of the MQTT data received by the processing of S270.

In the processing of S240, if writing has not been instructed (S240: No), the processing of S241 is skipped. After the processings of S240 and S241, the mobile terminal writing processing is ended.

Figure 26C:
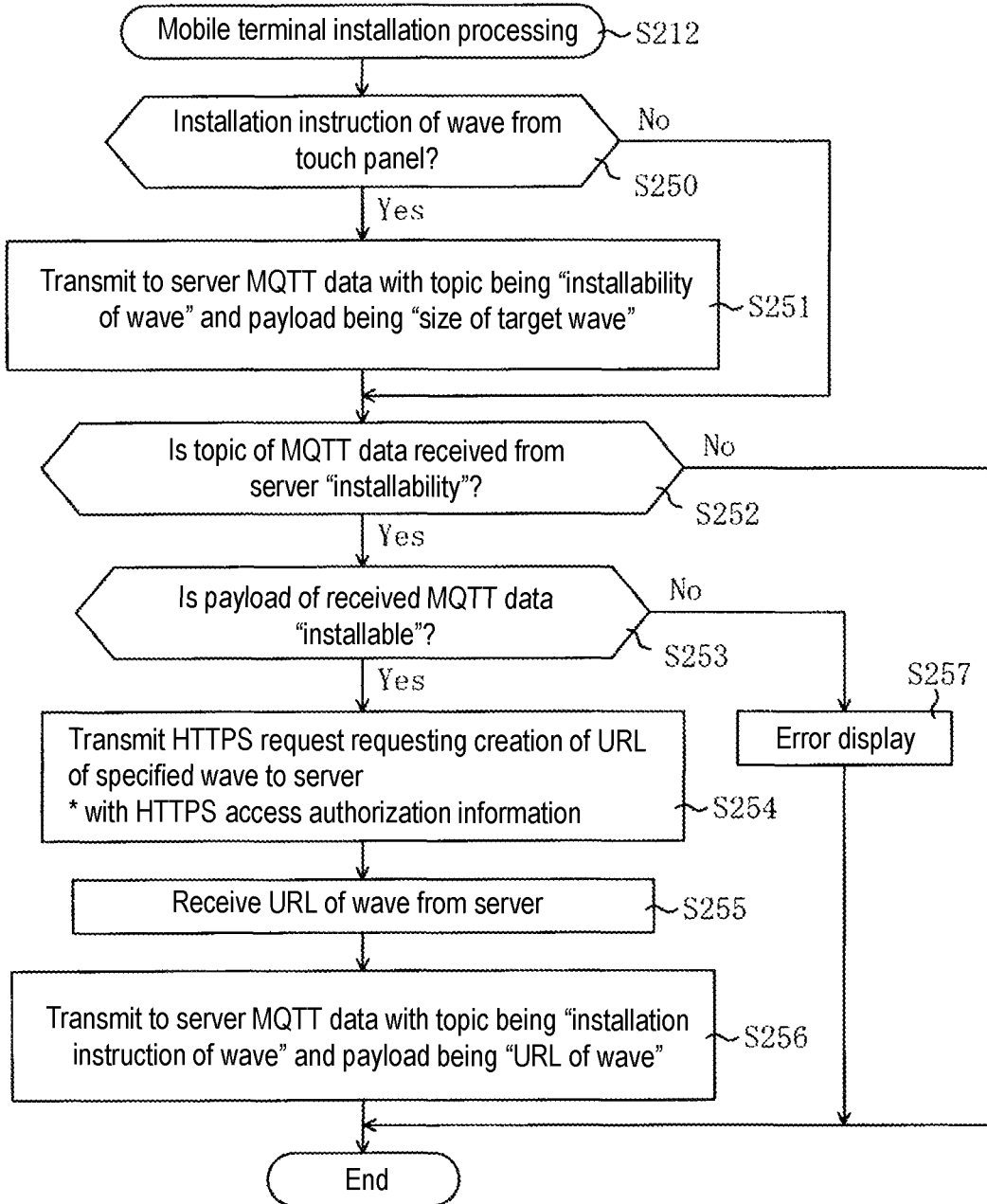
FIG. 26C is a flowchart of a mobile terminal installation processing.

FIG. 26C is a flowchart of the mobile terminal installation processing (S212). The mobile terminal installation processing is a processing related to installation in the mobile terminal 50. In the mobile terminal installation processing, first, it is confirmed whether installation has been instructed via the touch panel 57 (S250).

In the processing of S250, if installation has been instructed (S250: Yes), an MQTT data is created with the topic being "installability of wave data" and the payload being "size of wave data (specified via touch panel 57)". The topic of such an MQTT data includes the device identifier of the device registration data of the communication device 1 and the user identifier of the user H. The created MQTT data is transmitted to the server 70 by communication using the MQTT protocol (S251). In the processing of S250, if installation has not been instructed (S250: No), the processing of S251 is skipped.

After the processings of S250 and S251, it is confirmed whether the topic of the MQTT data received from the server 70 is "installability" (S252). Specifically, it is confirmed whether the device identifier of the device registration data of the communication device 1, the user identifier of the user H, and "installability" are all included in the topic of the received MQTT data. In the processing of S252, if the topic of the received MQTT data is "installability" (S252: Yes), it is confirmed whether the payload of the MQTT data received by the processing of S252 is "installable" (S253).

In the processing of S253, if the payload is "installable" (S253: Yes), an HTTPS request requesting creation of a URL of the wave data (specified via the touch panel 57) is transmitted to the server 70 by communication using the HTTPS protocol (S254). At this time, the HTTPS access authorization information acquired by the processing of S143 in FIG. 22 is also transmitted.

After the processing of S254, the URL of the wave data requested by the processing of S254 is received from the server 70 (S255). After the processing of S255, an MQTT data is created with the topic being "instruction for installing wave data" and the payload being "URL of wave data" received by the processing of S255, and the created MQTT data is transmitted to the server 70 by communication using the MQTT protocol (S256).

In the processing of S253, if the payload is not "installable" (S253: No), display (error display) indicating that the wave data cannot be installed is performed on the LCD 56 (S257). In the processing of S252, if the topic of the received MQTT data is not "installability" (S252: No), or, after the processings of S256 and S257, the mobile terminal installation processing is ended.

Returning to FIG. 25, after the mobile terminal installation processing of S212, it is confirmed whether the topic of the MQTT data received from the server 70 is "progress notification" (S213). Specifically, it is confirmed whether the device identifier of the device registration data of the communication device 1, the user identifier of the user H, and "progress notification" are all included in the topic of the received MQTT data. In the processing of S213, if the topic of the received MQTT data is "progress notification" (S213: Yes), a progress rate is acquired from the payload of the received MQTT data (S214), and the progress rate is confirmed (S215).

In the processing of S215, if the progress rate is 100% (S215: "100%"), display indicating that the writing or installation is completed is performed on the LCD 56 (S216). In the processing of S215, if the progress rate is 0 to 99% (S215: "0 to 99%"), the progress rate is displayed on the LCD 56 (S217). In the processing of S215, if "error" is stored instead of the progress rate (S215: "ERROR"), display (error display) indicating that the writing or installation has failed is performed on the LCD 56 (S218).

In the processing of S213, if the topic of the received MQTT data is not "progress notification" (S213: No), or, after the processings of S216 to S218, it is confirmed whether the topic of the MQTT data received from the server 70 is "sync completed" (S219). Specifically, it is confirmed whether the device identifier of the device registration data of the communication device 1, the user identifier of the user H, and "sync completed" are all included in the topic of the received MQTT data.

In the processing of S219, if the topic of the received MQTT data is "sync completed" (S219: Yes), an HTTPS request requesting the sync data 72e is transmitted to the server 70 by communication using the HTTPS protocol (S220). At this time, the HTTPS access authorization information acquired by the processing of S143 in FIG. 22 is also transmitted. After the processing of S220, the sync data 72e is received from the server 70 (S221), and display based on the received sync data 72e is performed on the LCD 56 (S222).

In the processing of S219, if the topic of the received MQTT data is not "sync completed" (S219: No), or, after the processing of S222, other processings (S223) are executed, and the mobile terminal event processing is ended. Examples of other processings of S223 include: creating an MQTT data or an HTTPS request corresponding to an instruction inputted to the mobile terminal 50 and transmitting to the server 70; analyzing an MQTT data received by the mobile terminal 50 and performing a processing according to the MQTT data; and performing a processing according to an HTTPS response from the server 70.

Figure 27:
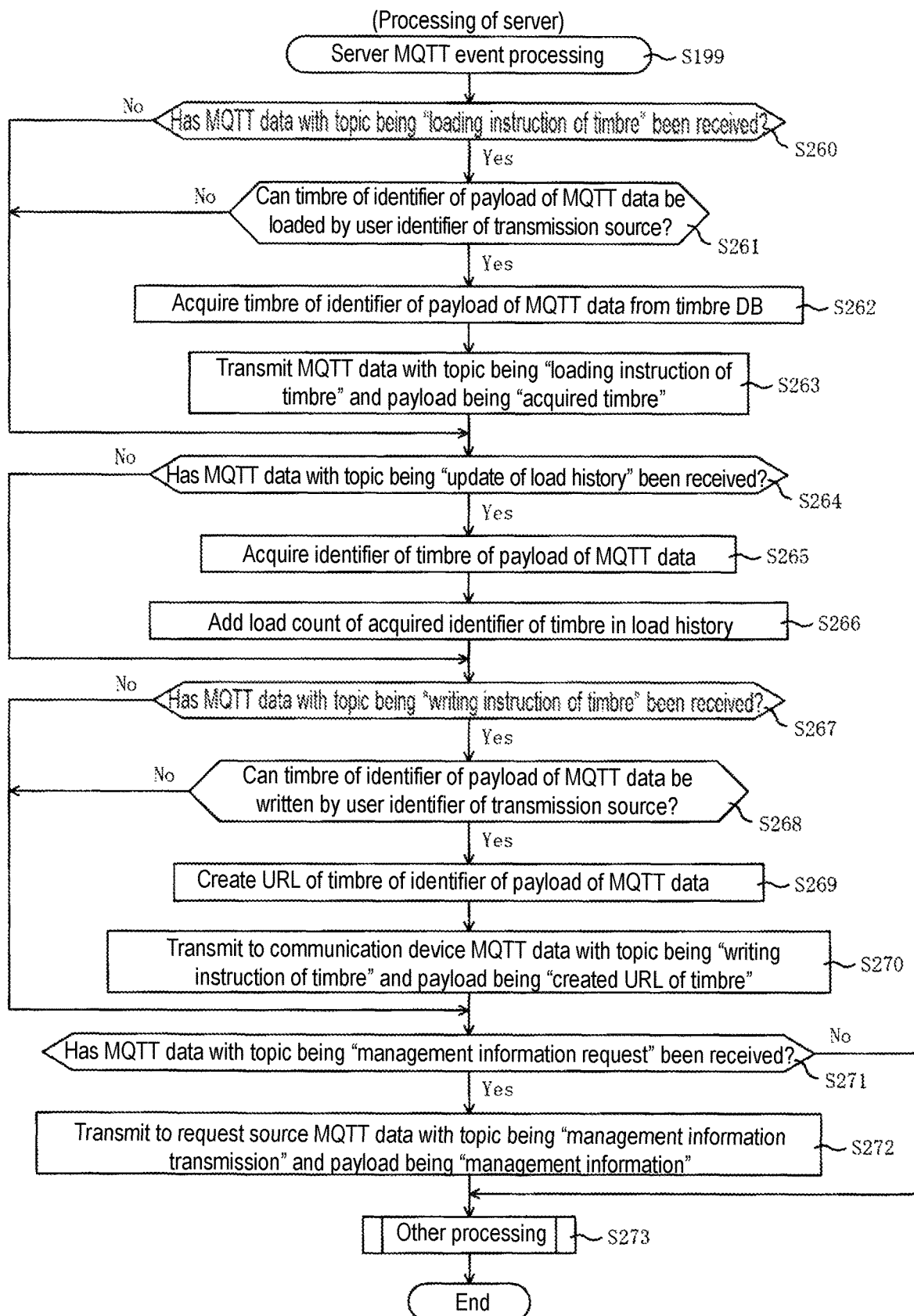
FIG. 27 is a flowchart of a server MQTT event processing.

Next, the event processing in the communication using the MQTT protocol of the server 70 will be described with reference to FIG. 27. FIG. 27 is a flowchart of the server MQTT event processing (S199). In the server MQTT event processing, first, it is confirmed whether an MQTT data with the topic being "instruction for loading timbre data" has been received (S260).

In the processing of S260, if an MQTT data with the topic being "instruction for loading timbre data" has been received (S260: Yes), it is confirmed whether the timbre data corresponding to the identifier included in the payload of the received MQTT data can be loaded (used) by the user identifier of the user H who has transmitted the MQTT data (S261). Specifically, with reference to the management information 72g, it is confirmed whether the user H has already purchased the timbre data corresponding to the identifier included in the payload of the received MQTT data, or whether the timbre data can be used with the subscription authority of the user H.

In the processing of S261, if the timbre data can be loaded (S261: Yes), the timbre data corresponding to the identifier of the timbre data of the payload of the MQTT data received by the processing of S260 is acquired from the timbre DB 72d (S262). After the processing of S262, an MQTT data is created with the topic being "instruction for loading timbre data" and the payload being "timbre data" acquired by the processing of S262. The topic of such an MQTT data includes the device identifier and the user identifier of the topic received by the processing of S260. The created MQTT data is transmitted to the devices (i.e., the electronic musical instrument 30 and the mobile terminal 50) registered for subscription by the device identifier and the user identifier of the topic received by the processing of S260 (S263).

If an MQTT data with the topic being "instruction for loading timbre data" has not been received in the processing of S260 (S260: No), if the timbre data cannot be loaded in the processing of S261 (S261: No), or, after the processing of S263, it is confirmed whether an MQTT data with the topic being "update of load history" has been received (S264). In the processing of S264, if an MQTT data with the topic being "update of load history" has been received (S264: Yes), the identifier of the timbre data of the payload of the received MQTT data is acquired (S265).

After the processing of S265, 1 is added to the load count corresponding to the user identifier of the topic of the MQTT data and the acquired identifier of the timbre data in the load history 72f (S266).

In the processing of S264, if an MQTT data with the topic being "update of load history" has not been received (S264: No), or, after the processing of S266, it is confirmed whether an MQTT data with the topic being "instruction for writing timbre data" has been received (S267). In the processing of S267, if an MQTT data with the topic being "instruction for writing timbre data" has been received (S267: Yes), it is confirmed whether the timbre data corresponding to the identifier included in the payload of the received MQTT data can be written (used) by the user identifier of the user H who has transmitted the MQTT data (S268).

Specifically, with reference to the management information 72g, it is confirmed whether the user H has already purchased the timbre data corresponding to the identifier included in the payload of the received MQTT data, or whether the timbre data can be used with the subscription authority of the user H. In the processing of S268, if the timbre data can be written (S268: Yes), a URL is created for acquiring the timbre data of the identifier of the payload of the received MQTT data from the timbre DB 72d (S269).

After the processing of S269, an MQTT data is created with the topic being "instruction for writing timbre data" and the payload being "URL" created by the processing of S269. The topic of such an MQTT data includes the device identifier and the user identifier of the topic received by the processing of S267. The created MQTT data is transmitted to the devices (i.e., the electronic musical instrument 30 and the mobile terminal 50) registered for subscription by the device identifier and the user identifier of the topic received by the processing of S267 (S270).

If an MQTT data with the topic being "instruction for writing timbre data" has not been received in the processing of S267 (S267: No), if the timbre data cannot be written in the processing of S268 (S268: No), or after the processing of S270, it is confirmed whether an MQTT data with the topic being "management information request" indicating a request for management information has been received (S271). In the processing of S271, if an MQTT data with the topic being "management information request" has been received (S271: Yes), first, a user identifier corresponding to the "device identifier" in the topic of the received MQTT data (i.e., "topic/{user identifier}/{device identifier}/"management information request") is acquired from the device DB 72c. Then, management information of the acquired user identifier, i.e., the personal management information 72g1 corresponding to the user identifier of the user H of the request source device and the shared management information 72g2 are acquired from the management information 72g (see FIG. 13 respectively). Next, an MQTT data is created with the topic being "management information transmission" indicating transmission of management information and the payload being the acquired management information, and the MQTT data is transmitted (returned) to the above request source device (S272).

The user identifier is acquired from the device DB 72c corresponding to the "device identifier" in the topic of the MQTT data received in S271, and the management information corresponding to the user identifier is acquired from the management information 72g, but the disclosure is not limited thereto. Management information corresponding to the "user identifier" in the topic of the MQTT data received in S271 may also be acquired from the management information 72g.

In the processing of S271, if an MQTT data with the topic being "management information request" has not been received (S271: No), or after the processing of S272, other processings (S273) are performed, and the server MQTT event processing is ended. Examples of other processings of S273 include transmitting an MQTT data other than the above received from the communication device 1 (the electronic musical instrument 30) or the mobile terminal 50 to another device registered for subscription.

As described above, in the server MQTT event processing, if the topic of a specific MQTT data is received in the processings of S260, S264, and S267, the server 70 executes a necessary processing in advance, and the processing result and the topic of the received MQTT data are transmitted to another device registered for subscription. Accordingly, in the electronic musical instrument 30 or the mobile terminal 50 to which the MQTT data is transmitted, after receiving the MQTT data, since it is not necessary to request the server 70 to perform a processing according to the topic of the MQTT data, resources on the server 70 can be used more quickly.

Further, the processing result of a specific command is registered to the server 70 for subscription without being transmitted to another device, and by transmitting an MQTT data with the command as the topic to the server 70, it is possible to have the server 70 perform only the processing according to the specific command. Thereby, the MQTT data can be used as a processing request for the server 70 (not intended to be transmitted to another device).

Figure 28:
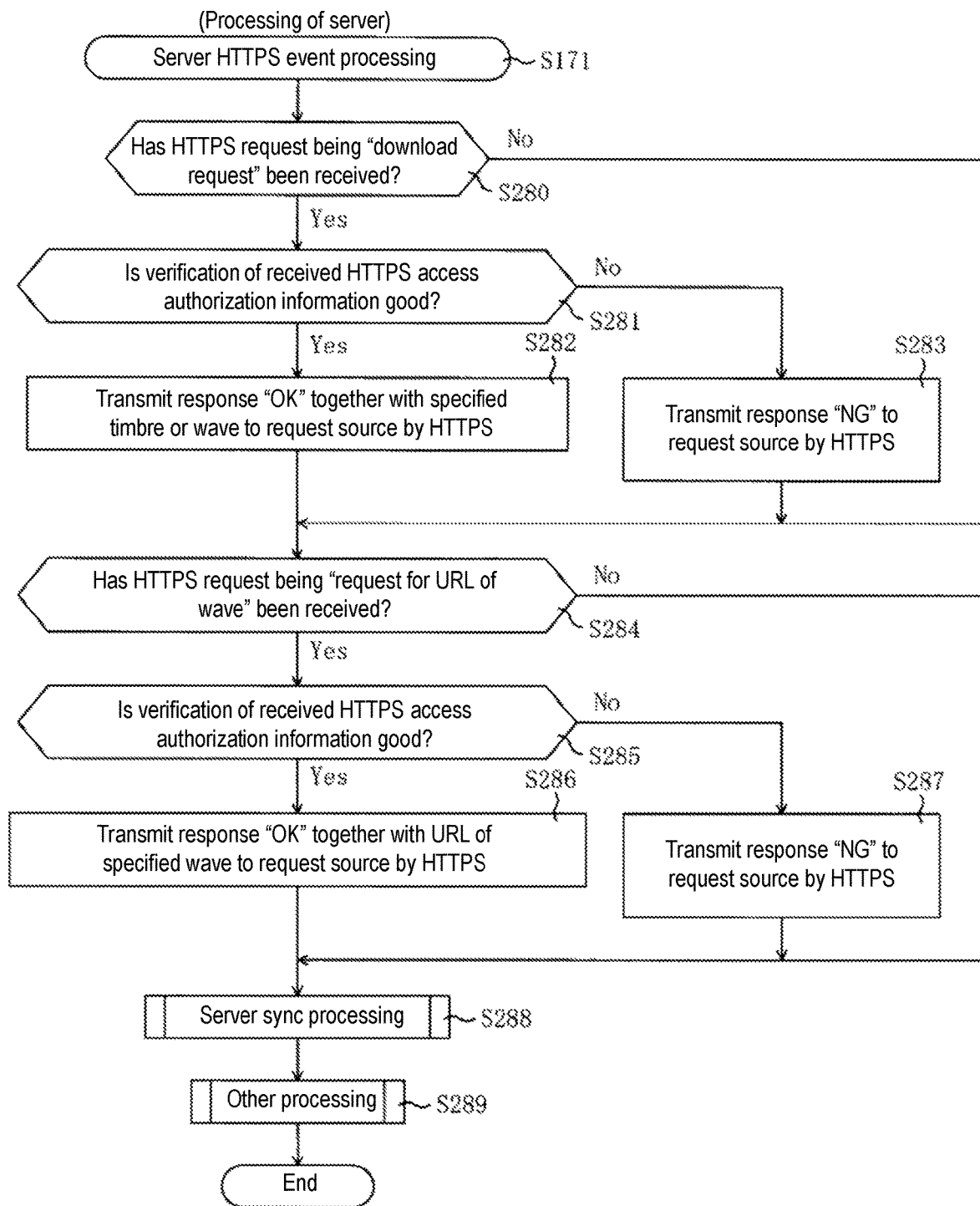
FIG. 28 is a flowchart of a server HTTPS event processing.

Next, the event processing in the communication using the HTTPS protocol of the server 70 will be described with reference to FIG. 28 and FIG. 29. FIG. 28 is a flowchart of the server HTTPS event processing (S171). In the server HTTPS event processing, first, it is confirmed whether an HTTPS request being an acquisition request using a URL of a timbre data or a wave data has been received (S280).

In the processing of S280, if an HTTPS request being an acquisition request has been received (S280: Yes), it is confirmed whether there is no problem with the HTTPS access authorization information received together with the URL in the HTTPS request (S281). In the processing of S281, the user identifier may be confirmed instead of the HTTPS access authorization information, or both the HTTPS access authorization information and the user identifier may be confirmed. In the processing of S281, if there is no problem with the HTTPS access authorization information and the user identifier (S281: Yes), together with a response "OK", the timbre data or the wave data specified by the URL is transmitted to the request source of the HTTPS request by communication using the HTTPS protocol (S282).

On the other hand, in the processing of S281, if there is a problem with the HTTPS access authorization information or the user identifier (S281: No), a response "NG" is transmitted to the request source of the HTTPS request by communication using the HTTPS protocol (S283).

In the processing of S280, if an HTTPS request being an acquisition request has not been received (S280: No), or, after the processings of S282 and S283, it is confirmed whether an HTTPS request being a request for creating a URL of a wave data has been received (S284). In the processing of S284, if an HTTPS request being a request for creating a URL of a wave data has been received (S284: Yes), it is confirmed whether there is no problem with the HTTPS access authorization information received in the HTTPS request (S285). In the processing of S285, the user identifier may be confirmed instead of the HTTPS access authorization information, or both the HTTPS access authorization information and the user identifier may be confirmed.

In the processing of S285, if there is no problem with the HTTPS access authorization information and the user identifier (S285: Yes), together with a response "OK" to the request source of the HTTPS request, a URL for acquiring the specified wave data from the timbre DB 72d is transmitted to the request source of the HTTPS request by communication using the HTTPS protocol (S286). On the other hand, in the processing of S285, if there is a problem with the HTTPS access authorization information or the user identifier (S285: No), a response "NG" is transmitted to the request source of the HTTPS request by communication using the HTTPS protocol (S287).

In the processing of S284, if an HTTPS request being a request for creating a URL of a wave data has not been received (S284: No), or, after the processings of S286 and S287, a server sync processing (S288) is executed. Herein, the server sync processing will be described with reference to FIG. 29.

Figure 29:
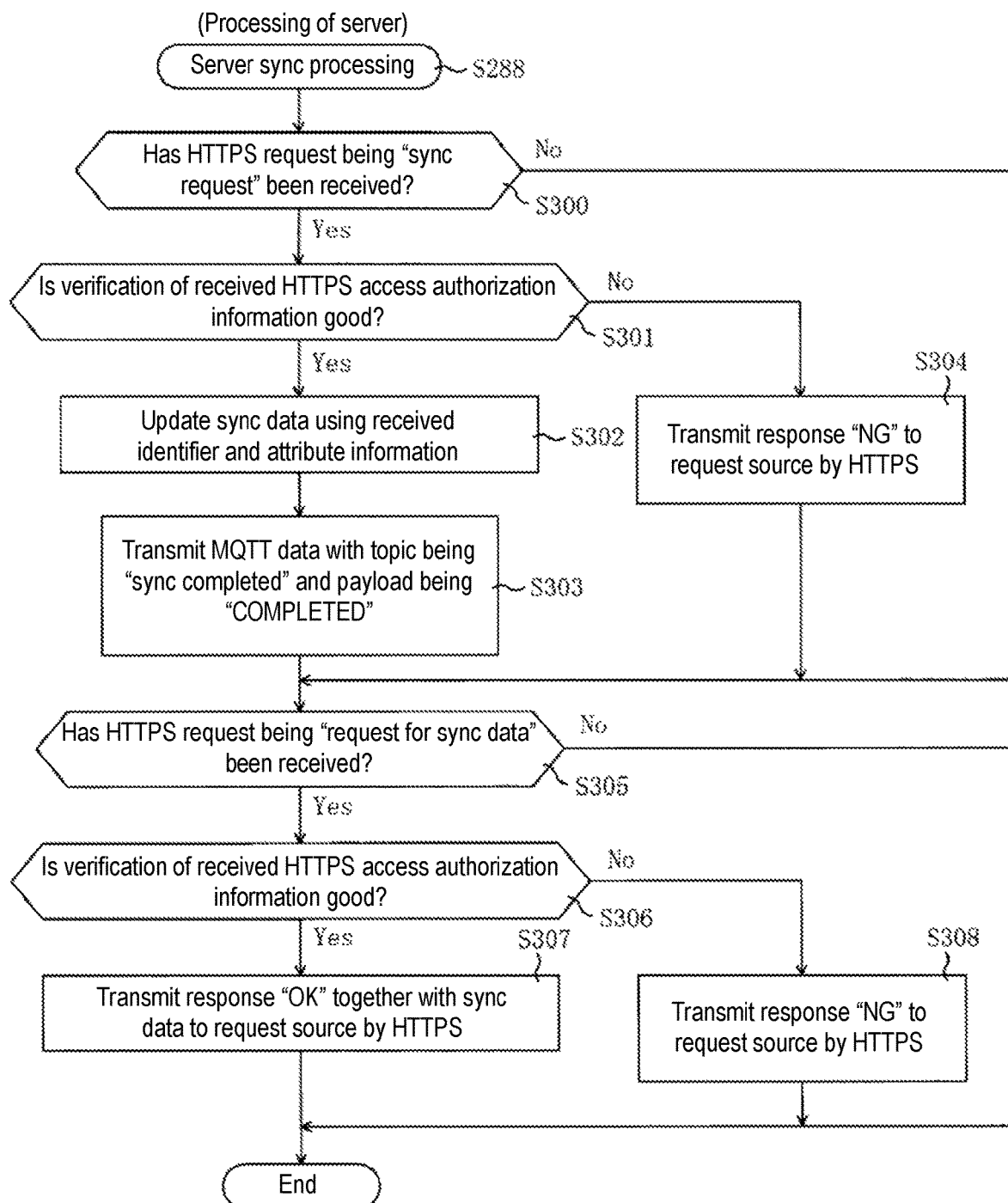
FIG. 29 is a flowchart of a server sync processing.

FIG. 29 is a flowchart of the server sync processing (S288). The server sync processing is a processing related to the update of the sync data 72e in the server 70. In the server sync processing, first, it is confirmed whether an HTTPS request being a sync instruction request has been received (S300). In the processing of S300, if an HTTPS request being a sync instruction request has been received (S300: Yes), it is confirmed whether there is no problem with the HTTPS access authorization information received in the HTTPS request (S301).

In the processing of S301, if there is no problem with the HTTPS access authorization information (S301: Yes), by storing the identifier and attribute information of the timbre data or the wave data received in the HTTPS request to the sync data 72e, the sync data 72e is updated (S302).

After the processing of S302, an MQTT data is created with the topic being "sync completed" and the payload being "COMPLETED". The topic of such an MQTT data includes the device identifier and the user identifier of the request source of the HTTPS request received by the processing of S300. The created MQTT data is transmitted to a device registered for subscription by the device identifier and the user identifier of the request source of the HTTPS request (S303).

On the other hand, in the processing of S301, if there is a problem with the HTTPS access authorization information (S301: No), a response "NG" is transmitted to the request source of the HTTPS request by communication using the HTTPS protocol (S304).

In the processing of S300, if an HTTPS request being a sync instruction request has not been received (S300: No), or, after the processings of S303 and S304, it is confirmed whether an HTTPS request being a request for the sync data 72e has been received (S305). In the processing of S305, if an HTTPS request being a request for the sync data 72e has been received (S305: Yes), it is confirmed whether there is no problem with the HTTPS access authorization information received in the HTTPS request (S306). In the processing of S306, the user identifier may be confirmed instead of the HTTPS access authorization information, or both the HTTPS access authorization information and the user identifier may be confirmed.

In the processing of S306, if there is no problem with the HTTPS access authorization information and the user identifier (S306: Yes), together with a response "OK", the sync data 72e is transmitted to the request source of the HTTPS request by communication using the HTTPS protocol (S307). On the other hand, in the processing of S306, if there is a problem with the HTTPS access authorization information or the user identifier (S306: No), a response "NG" is transmitted to the request source of the HTTPS request by communication using the HTTPS protocol (S308). In the processing of S305, if an HTTPS request being a request for the sync data 72e has not been received (S305: No), or, after the processings of S307 and S308, the server sync processing is ended.

Returning to FIG. 28, after the server sync processing of S288, other processings (S289) are executed, and the server HTTPS event processing is end. Examples of other processings of S289 include a processing of performing a processing for an HTTPS request other than the above received from the communication device 1 or the mobile terminal 50, and transmitting the result as an HTTPS response by communication using the HTTPS protocol.

Figure 30:
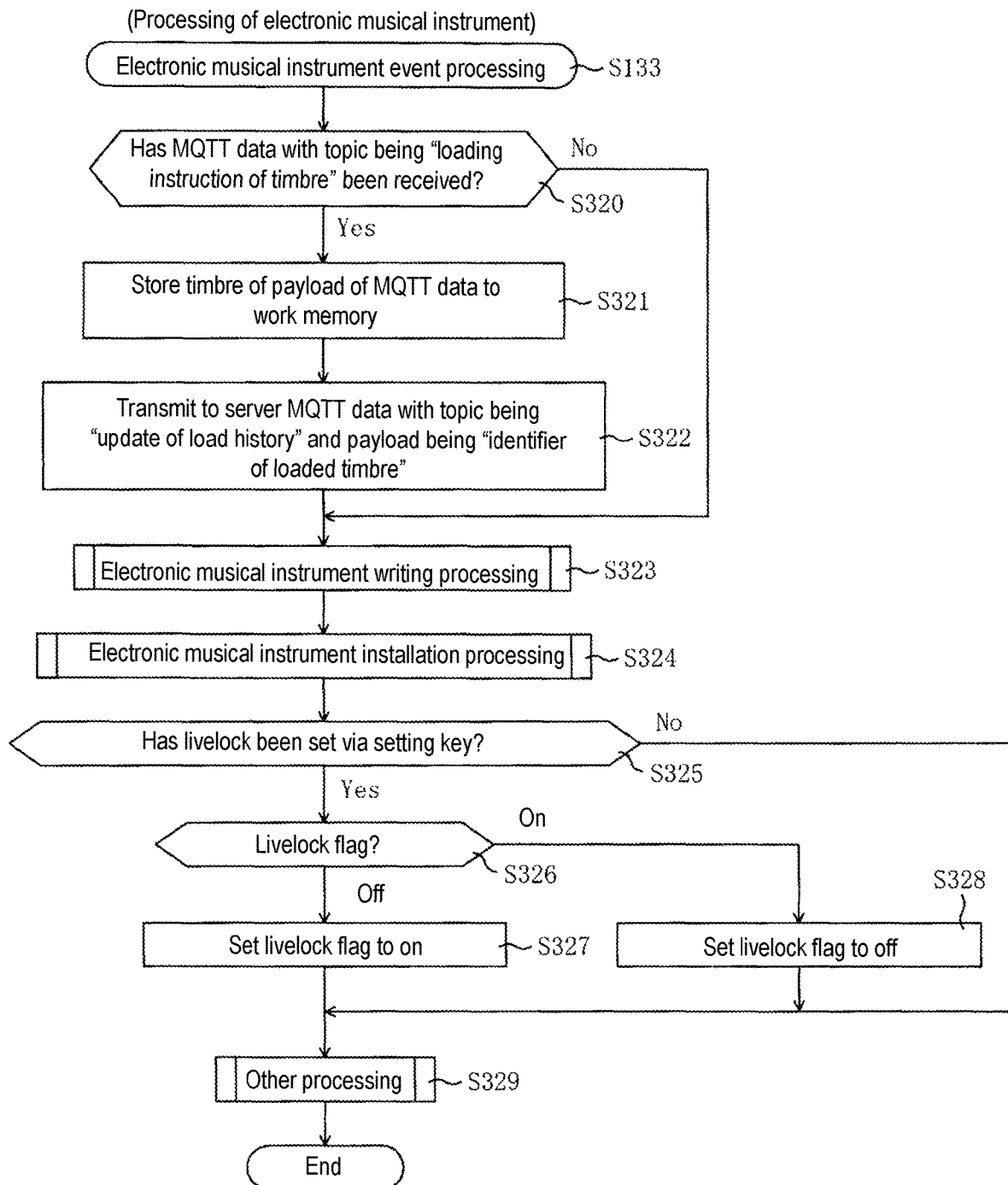
FIG. 30 is a flowchart of an electronic musical instrument event processing.

The event processing in the electronic musical instrument 30 will be described with reference to FIG. 30 to FIG. 32. FIG. 30 is a flowchart of the electronic musical instrument event processing (S133). In the electronic musical instrument event processing, first, it is confirmed whether the topic of an MQTT data received from the server 70 is "instruction for loading timbre data" (S320). Specifically, it is confirmed whether the device identifier of the device registration data of the communication device 1, the user identifier received by the processing of S131 in FIG. 21B, and "instruction for loading timbre data" are all included in the topic of the received MQTT data.

In the processing of S320, if the topic of the received MQTT data is "instruction for loading timbre data" (S320: Yes), the timbre data is acquired from the payload of the received MQTT data and stored to the work memory 33a (S321). After the processing of S321, an MQTT data is created with the topic being "update of load history" and the payload being "identifier of timbre data" stored in the work memory 33a. The topic of such an MQTT data includes the device identifier of the communication device 1 and the user identifier received by the processing of S131 in FIG. 21B. The created MQTT data is transmitted to the server 70 by communication using the MQTT protocol (S322).

In the processing of S320, if the topic of the received MQTT data is not "instruction for loading timbre data" (S320: No), or, after the processing of S322, an electronic musical instrument writing processing (S323) and an electronic musical instrument installation processing (S324) are executed. Herein, these processings will be described with reference to FIG. 31 and FIG. 32.

Figure 31:
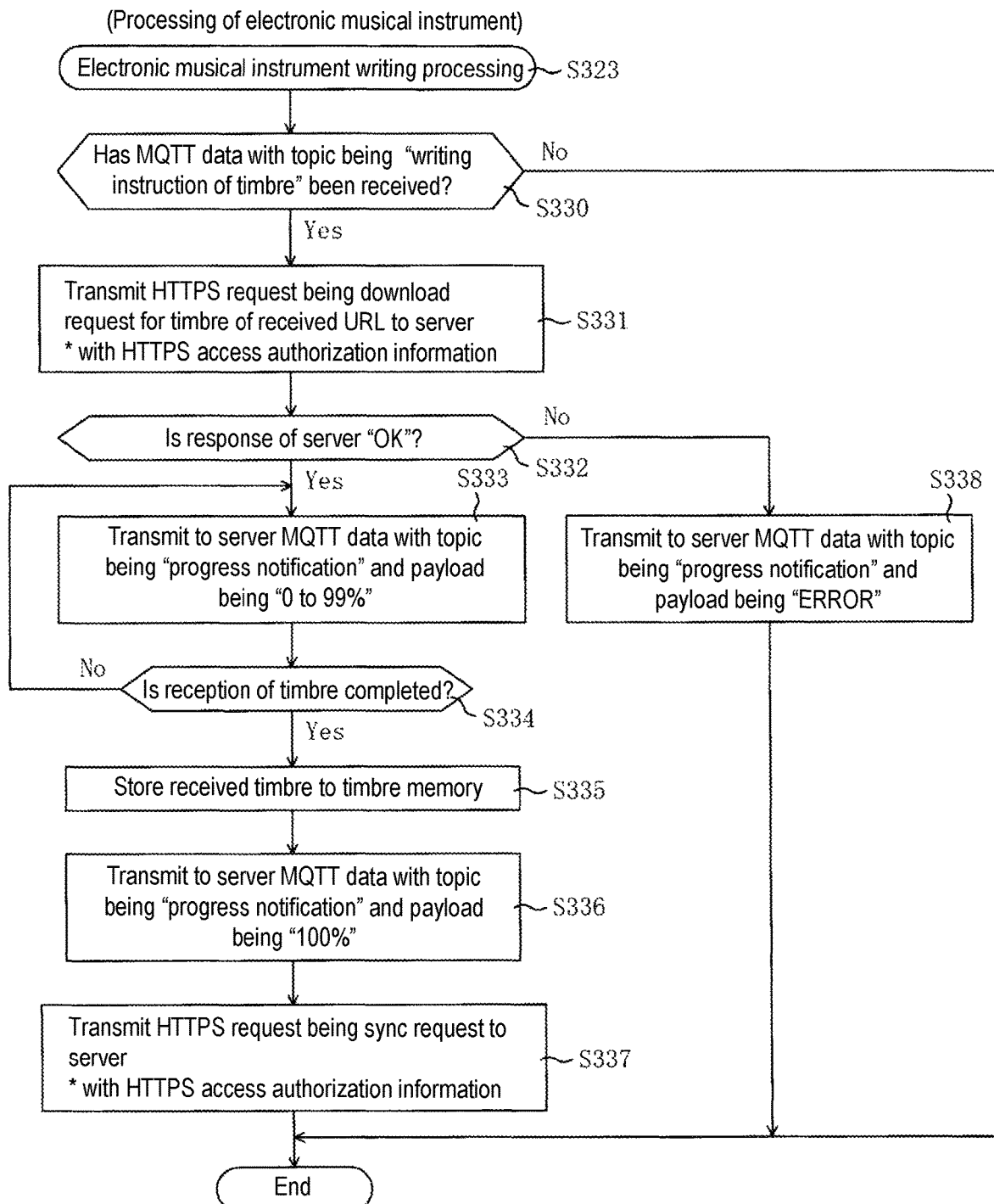
FIG. 31 is a flowchart of an electronic musical instrument writing processing.

FIG. 31 is a flowchart of the electronic musical instrument writing processing (S323). The electronic musical instrument writing processing is a processing related to the writing in the electronic musical instrument 30. In the electronic musical instrument writing processing, first, it is confirmed whether the topic of an MQTT data received from the server 70 is "instruction for writing timbre data" (S330). Specifically, it is confirmed whether the device identifier of the device registration data of the communication device 1, the user identifier received by the processing of S131 in FIG. 21B, and "instruction for writing timbre data" are all included in the topic of the received MQTT data.

In the processing of S330, if the topic of the received MQTT data is "instruction for writing timbre data" (S330: Yes), an HTTPS request being an acquisition request for a timbre data of a URL of the payload of the received MQTT data is transmitted to the server 70 by communication using the HTTPS protocol (S331). At this time, the HTTPS access authorization information acquired by the processing of S131 in FIG. 21B is also transmitted.

After the processing of S331, it is confirmed whether a response to the acquisition request of the processing of S331 is "OK" (S332). In the processing of S332, if the response is "OK" (S332: Yes), an MQTT data is created with the topic being "progress notification" and the payload being a value (0 to 99%) according to a rate of receiving the timbre data. The topic of such an MQTT data includes the device identifier of the communication device 1 and the user identifier received by the processing of S131 in FIG. 21B. The created MQTT data is transmitted to the server 70 by communication using the MQTT protocol (S333).

After the processing of S333, it is confirmed whether reception of the timbre data is completed (S334). In the processing of S334, if reception of the timbre data is not completed (S334: No), the processing of S333 onwards is repeated. On the other hand, in the processing of S334, if reception of the timbre data is completed (S334: Yes), the received timbre data is stored to the timbre memory 32b (S335).

After the processing of S335, an MQTT data is created with the topic being "progress notification" and the payload being "100%". The topic of the MQTT data includes the device identifier of the communication device 1 and the user identifier received by the processing of S131 in FIG. 21B. The created MQTT data is transmitted to the server 70 by communication using the MQTT protocol (S336).

After the processing of S336, an HTTPS request being a sync instruction request is transmitted to the server 70 by communication using the HTTPS protocol (S337). At this time, the identifier and attribute information of the written timbre data and the HTTPS access authorization information acquired by the processing of S131 in FIG. 21B are also transmitted.

In the processing of S332, if the response is not "OK" (S332: No), an MQTT data is created with the topic being "progress notification" and the payload being "ERROR". The topic of such an MQTT data includes the device identifier of the communication device 1 and the user identifier received by the processing of S131 in FIG. 21B. The created MQTT data is transmitted to the server 70 by communication using the MQTT protocol (S338).

In the processing of S330, if the topic of the received MQTT data is not "instruction for writing timbre data" (S330: No), or, after the processings of S337 and S338, the electronic musical instrument writing processing is ended.

Figure 32:
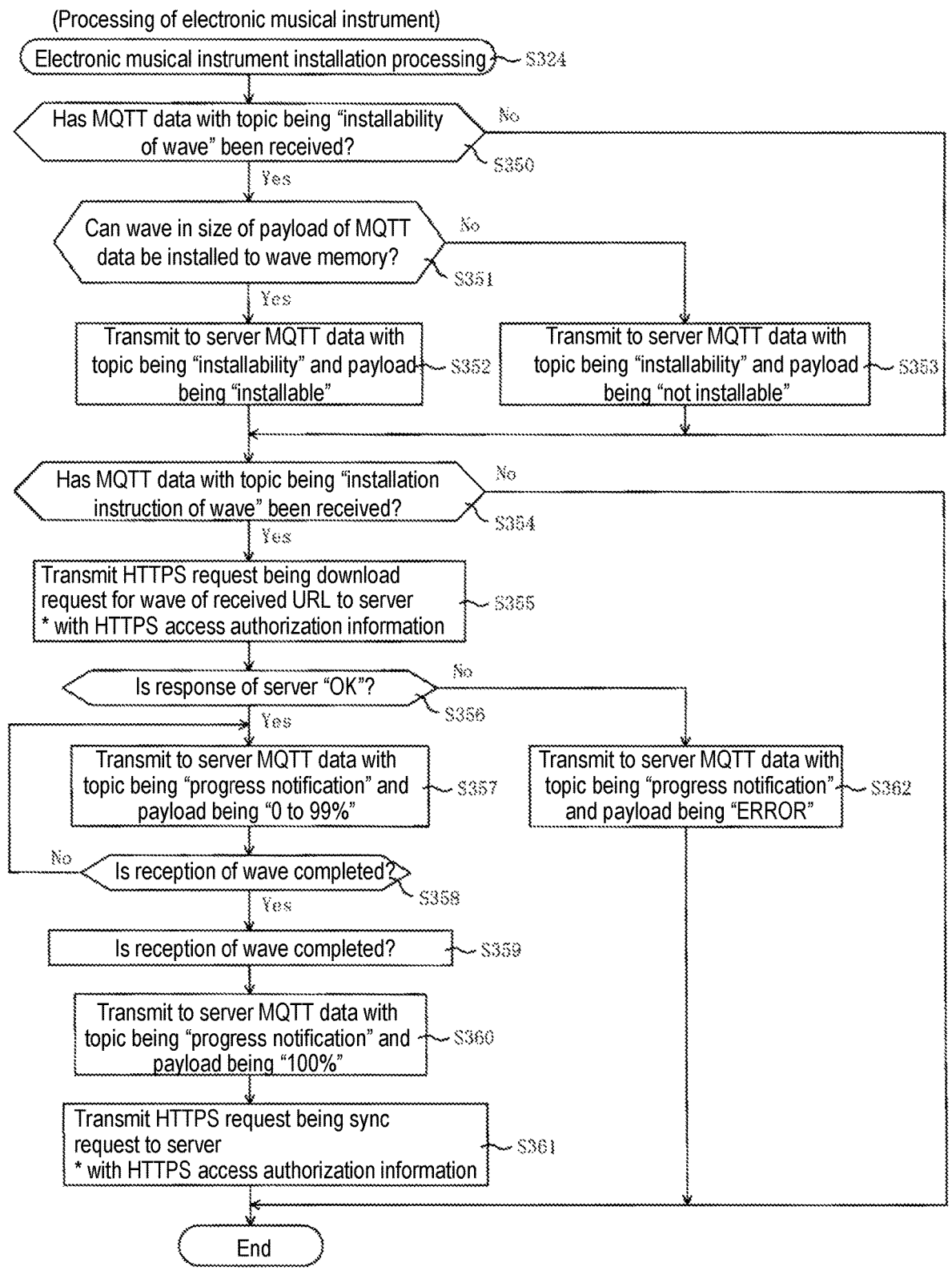
FIG. 32 is a flowchart of an electronic musical instrument installation processing.

FIG. 32 is a flowchart of the electronic musical instrument installation processing (S324). The electronic musical instrument installation processing is a processing related to the installation in the electronic musical instrument 30. In the electronic musical instrument installation processing, first, it is confirmed whether the topic of an MQTT data received from the server 70 is "installability" (S350). Specifically, it is confirmed whether the device identifier of the communication device 1, the user identifier received by the processing of S131 in FIG. 21B, and "installability" are all included in the topic of the received MQTT data.

In the processing of S350, if the topic of the received MQTT data is "installability" (S350: Yes), it is confirmed whether a wave data in a size set in the payload of the received MQTT data can be stored to the wave memory 32c (S351). In the processing of S351, if the wave data can be stored to the wave memory 32c (S351: Yes), an MQTT data is created with the topic being "installability" and the payload being "installable". The topic of such an MQTT data includes the device identifier of the communication device 1 and the user identifier received by the processing of S131 in FIG. 21B. The created MQTT data is transmitted to the server 70 by communication using the MQTT protocol (S352).

On the other hand, in the processing of S351, if the wave data cannot be stored to the wave memory 32c (S351: No), an MQTT data is created with the topic being "installability" and the payload being "not installable". The topic of such an MQTT data includes the device identifier of the communication device 1 and the user identifier received by the processing of S131 in FIG. 21B. The created MQTT data is transmitted to the server 70 by communication using the MQTT protocol (S353).

In the processing of S350, if the topic of the received MQTT data is not "installability" (S350: No), or, after the processings of S352 and S353, it is confirmed whether the topic of the MQTT data received from the server 70 is "instruction for installing wave data" (S354). Specifically, it is confirmed whether the device identifier of the communication device 1, the user identifier received by the processing of S131 in FIG. 21B, and "instruction for installing wave data" are all included in the topic of the received MQTT data.

In the processing of S354, if the topic of the received MQTT data is "instruction for installing wave data" (S354: Yes), an acquisition request for the wave data of the URL of the payload of the received MQTT data is transmitted to the server 70 by communication using the HTTPS protocol (S355). At this time, the HTTPS access authorization information acquired by the processing of S131 in FIG. 21B is also transmitted.

After the processing of S355, it is confirmed whether a response to the acquisition request of the processing of S355 is "OK" (S356). In the processing of S356, if the response is "OK" (S356: Yes), an MQTT data is created with the topic being "progress notification" and the payload being a value (0 to 99%) according to a rate of receiving the wave data. The topic of such an MQTT data includes the device identifier of the communication device 1 and the user identifier received by the processing of S131 in FIG. 21B. The created MQTT data is transmitted to the server 70 by communication using the MQTT protocol (S357).

After the processing of S357, it is confirmed whether reception of the wave data is completed (S358). In the processing of S358, if reception of the wave data is not completed (S358: No), the processing of S357 onwards is repeated. On the other hand, in the processing of S358, if reception of the wave data is completed (S358: Yes), the received wave data is stored to the wave memory 32c (S359).

After the processing of S359, an MQTT data is created with the topic being "progress notification" and the payload being "100%". The topic of the MQTT data includes the device identifier of the communication device 1 and the user identifier received by the processing of S131 in FIG. 21B. The created MQTT data is transmitted to the server 70 by communication using the MQTT protocol (S360).

After the processing of S360, an HTTPS request being a sync instruction request is transmitted to the server 70 by communication using the HTTPS protocol (S361). At this time, the identifier and attribute information of the installed wave data and the HTTPS access authorization information acquired by the processing of S131 in FIG. 21B are also transmitted.

In the processing of S356, if the response is not "OK" (S356: No), an MQTT data is created with the topic being "progress notification" and the payload being "ERROR". The topic of such an MQTT data includes the device identifier of the communication device 1 and the user identifier received by the processing of S131 in FIG. 21B. The created MQTT data is transmitted to the server 70 by communication using the MQTT protocol (S362).

In the processing of S354, if the topic of the received MQTT data is not "instruction for installing wave data" (S354: No), or, after the processings of S361 and S362, the electronic musical instrument installation processing is ended.

Returning to FIG. 30, after the electronic musical instrument installation processing of S324, it is confirmed whether setting of the livelock flag 32e has been instructed via the setting key 35 (S325). In the processing of S325, if setting of the livelock flag 32e has been instructed (S325: Yes), the state of the livelock flag 32e is confirmed (S326). In the processing of S326, if the livelock flag 32e is off (S326: "off"), the livelock flag 32e is set to on (S327); and if the livelock flag 32e is on (S326: "on"), the livelock flag 32e is set to off (S328).

In the processing of S325, if setting of the livelock flag 32e has not been instructed (S325: No), or after the processings of S327 and S328, other processings (S329) are executed, and the electronic musical instrument event processing is ended. Examples of other processings of S329 include: in the case where an instruction for the server 70 is inputted from the user H via the setting key 35 of the electronic musical instrument 30, creating an MQTT data or an HTTPS request according to the instruction and transmitting to the communication device 1; in the case where another MQTT data is received from the server 70, analyzing the received MQTT data and performing a processing according to the analyzed MQTT data; and in the case where an HTTPS response is received from the server 70, performing a processing according to the received HTTPS response.

Figure 33:
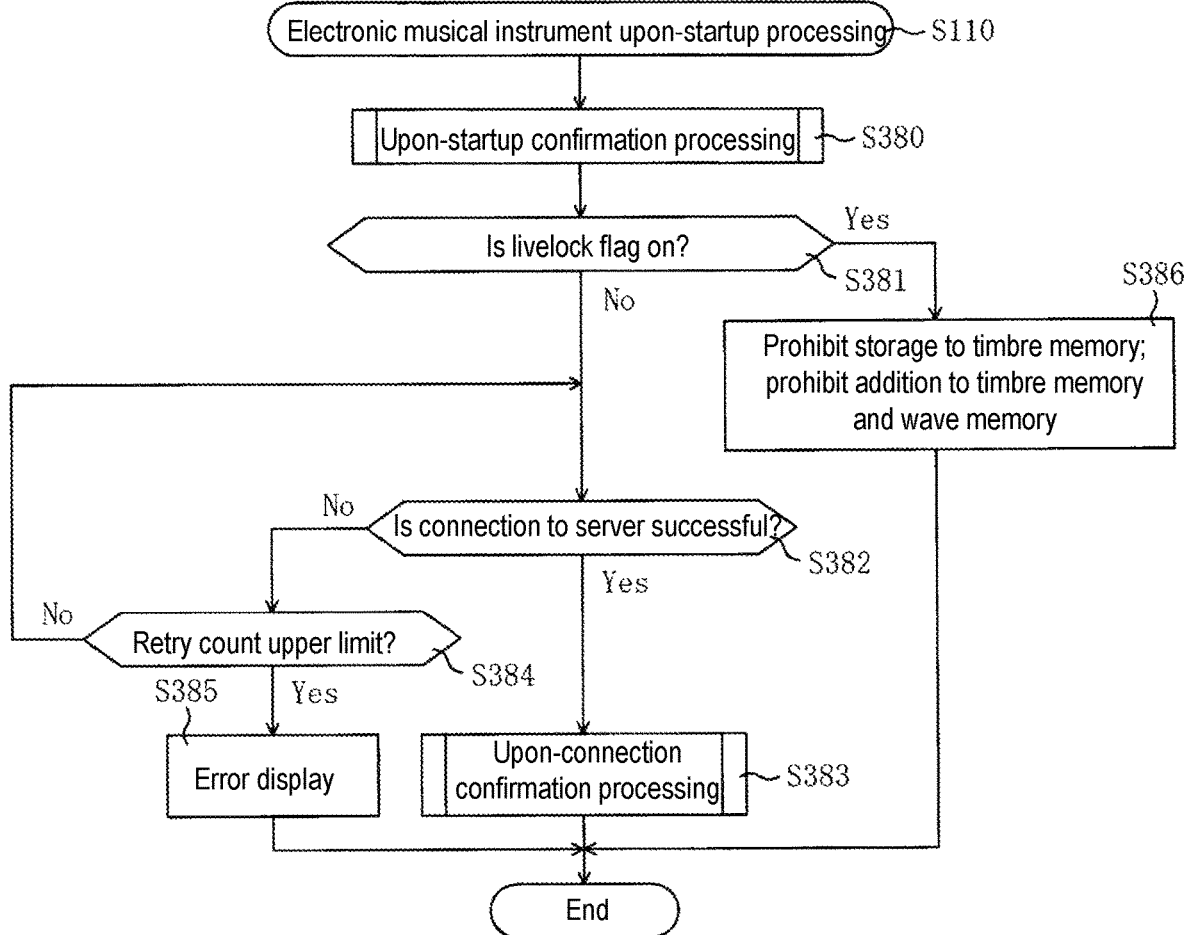
FIG. 33 is a flowchart of an electronic musical instrument upon-startup processing.

Next, referring to FIG. 33 to FIG. 35, the processing at the time of startup of the electronic musical instrument 30 will be described. FIG. 33 is a flowchart of the electronic musical instrument upon-startup processing (S110). In the electronic musical instrument upon-startup processing, first, an upon-startup confirmation processing (S380) is executed. Herein, the upon-startup confirmation processing will be described with reference to FIG. 34.

Figure 34:
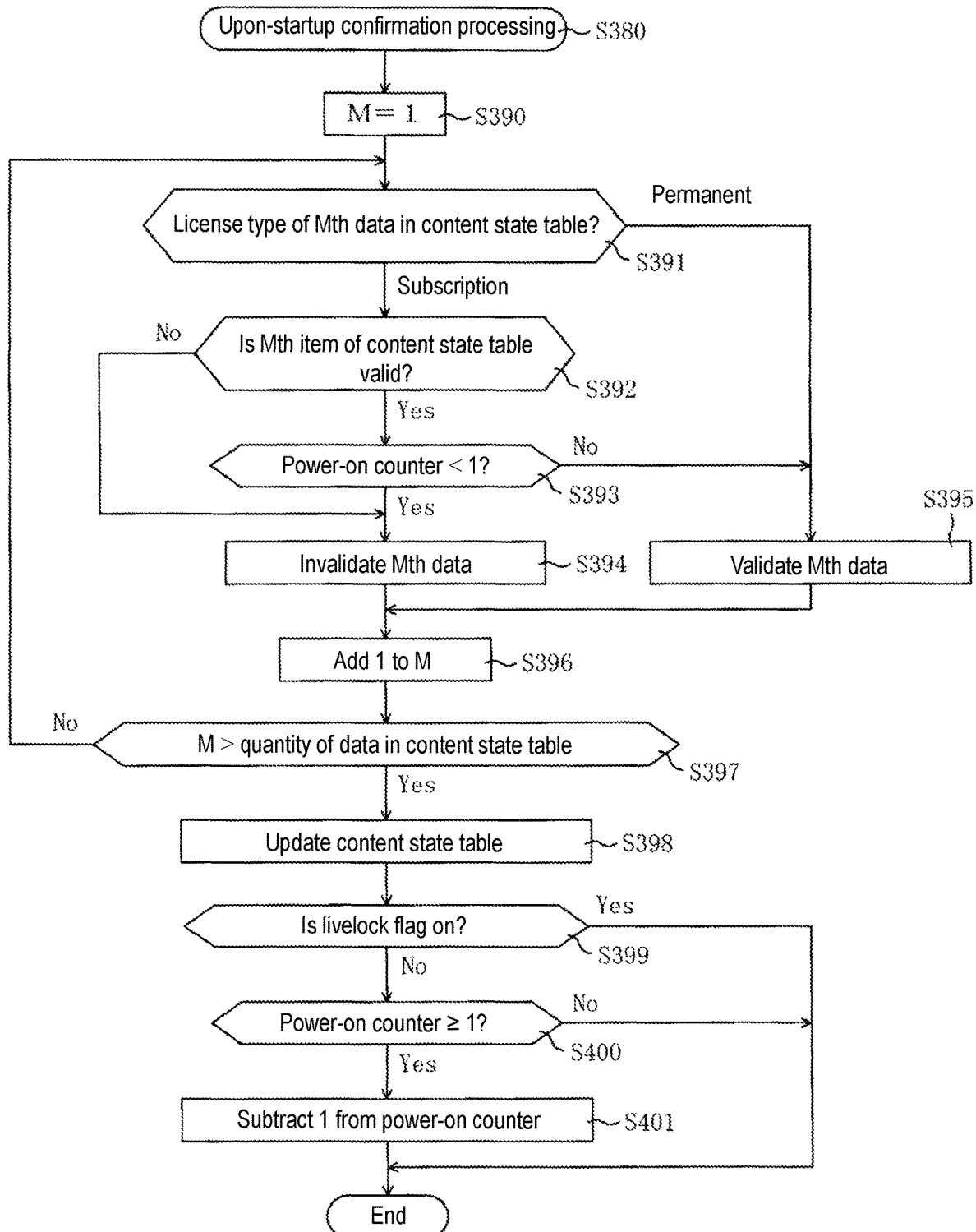
FIG. 34 is a flowchart of an upon-startup confirmation processing.

FIG. 34 is a flowchart of the upon-startup confirmation processing. In the upon-startup confirmation processing, first, 1 is set as a counter variable M indicating a reference position (i.e., "No." in FIG. 10B) of the content state table 32d (S390). After the processing of S390, the license type of the $M^{th}$ sound data in the content state table 32d is confirmed (S391).

In the processing of S391, if the license type of the $M^{th}$ sound data in the content state table 32d is the subscription type (S391: "subscription"), it is confirmed whether "valid" is stored in the $M^{th}$ item of the content state table 32d (S392). In the processing of S392, if "valid" is stored in the $M^{th}$ item of the content state table 32d (S392: Yes), it is confirmed whether the value of the power-on counter 32f is smaller than 1 (S393).

In the processing of S393, if the value of the power-on counter 32f is smaller than 1 (S393: Yes), because the power of the electronic musical instrument 30 has been turned on 10 times since the communication with the server 70 turned into an unestablishable state, the $M^{th}$ sound data of the subscription type in the content state table 32d is set to be invalid (S394). Accordingly, the sound data becomes unusable by the electronic musical instrument 30.

In the processing of S392, if "invalid" is stored in the $M^{th}$ item of the content state table 32d (S392: No), it means that in the content state table 32d updated in a previous round by S398 and S421 (see FIG. 35) to be described later, the sound data invalidated due to expiration of the subscription authority or the like is set to be invalid by the processing of S394.

On the other hand, if the license type of the $M^{th}$ sound data in the content state table 32d is the permanent type in the processing of S391 (S391: "permanent"), or if the value of the power-on counter 32f is 1 or more in the processing of S393 (S393: No), the $M^{th}$ sound data of the subscription type in the content state table 32*d* is validated (S395). Accordingly, the sound data becomes usable by the electronic musical instrument 30.

After the processings of S394 and S395, 1 is added to the counter variable M (S396), and it is confirmed whether the counter variable M is larger than the quantity of sound data in the content state table 32*d* (S397). In the processing of S397, if the counter variable M is equal to or less than the quantity of sound data in the content state table 32*d* (S397: No), the processing of S391 onwards is performed.

In the processing of S397, if the counter variable M is larger than the quantity of sound data in the content state table 32*d* (S397: Yes), the state of the sound data set to be valid/invalid by the processings of S394 and S395 is reflected in the content state table 32*d* to update the content state table 32*d* (S398).

After the processing of S398, it is confirmed whether the livelock flag 32*e* is on (S399). In the processing of S399, if the livelock flag 32*e* is off (S399: No), it is confirmed whether the value of the power-on counter 32*f* is 1 or more (S400). In the processing of S400, if the value of the power-on counter 32*f* is 1 or more (S400: Yes), 1 is subtracted from the power-on counter 32*f* (S401).

On the other hand, in the processing of S399, if the livelock flag 32*e* is on (S399: Yes), or if the value of the power-on counter 32*f* is less than 1 (S400: No), the processing of S401 is skipped. That is, if the livelock flag 32*e* is turned on, subtraction of the power-on counter 32*f* is not performed.

Accordingly, with the livelock flag 32*e* being turned on and the electronic musical instrument 30 being unable to be connected with the server 70, even if the user H repeatedly turns on the power of the electronic musical instrument 30, it is possible to prevent subscription-type sound data, which are dependent on the count of power-on of the electronic musical instrument 30, from becoming unusable. Accordingly, the user H can use the subscription-type sound data by turning on the livelock flag 32*e* without concern.

After the processings of S399 and S401, the upon-startup confirmation processing is ended.

Returning to FIG. 33, after the upon-startup confirmation processing of S380, it is confirmed whether the livelock flag 32*e* is on (S381). In the processing of S381, if the livelock flag 32*e* is off (S381: No), it is confirmed whether the connection with the server 70 is successful (S382). Specifically, it is confirmed whether the communication device 1 is connected to Wi-Fi by the processing of S43 in the Wi-Fi main processing of FIG. 16, and the Wi-Fi communication part workflow processing of S44 is executed.

In the processing of S382, if the connection with the server 70 is successful (S382: Yes), an upon-connection confirmation processing (S383) is executed. Herein, the upon-connection confirmation processing will be described with reference to FIG. 35.

Figure 35:
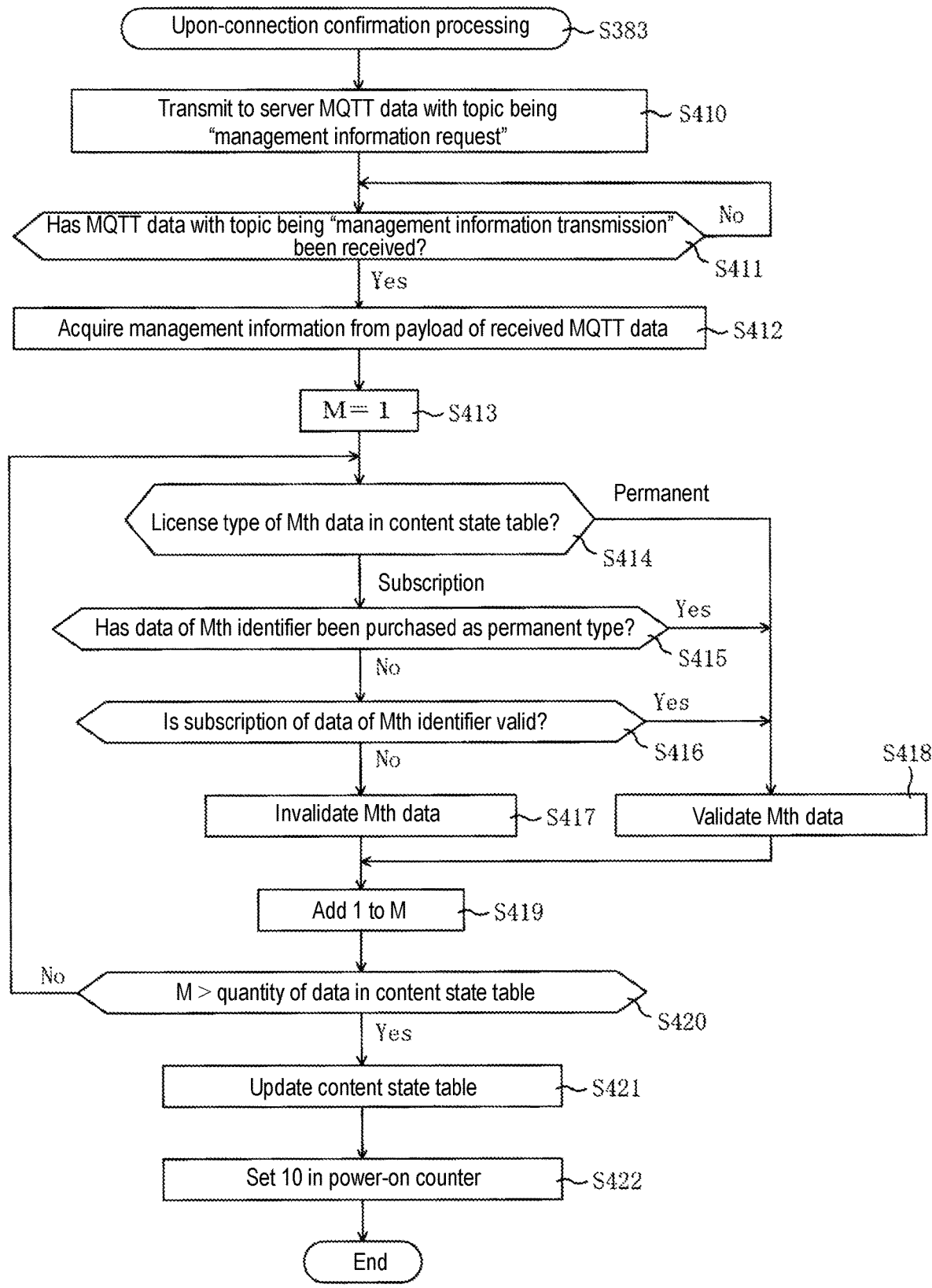
FIG. 35 is a flowchart of an upon-connection confirmation processing.

FIG. 35 is a flowchart of the upon-connection confirmation processing. In the upon-connection confirmation processing, first, an MQTT data with the topic being "management information request" (i.e., "topic/{user identifier}/{device identifier}/"management information request") is transmitted to the server 70 by communication using the MQTT protocol (S410). After the processing of S410, it is confirmed whether an MQTT data with the topic being "management information transmission" has been received from the server 70 (S411). In the processing of S411, if an MQTT data with the topic being "management information transmission" has been received (S411: Yes), management information is acquired from the payload of the received MQTT data and stored to the management information 33*b* (S412). On the other hand, in the processing of S411, if an MQTT data with the topic being "management information transmission" has not been received (S411: No), the processing of S411 is repeated.

After the processing of S412, 1 is set as the counter variable M indicating the reference position of the content state table 32*d* (S413). After the processing of S413, the license type of the M$^{th}$ sound data in the content state table 32*d* is confirmed (S414). In the processing of S414, if the license type of the M$^{th}$ sound data in the content state table 32*d* is the subscription type (S414: "subscription"), it is confirmed according to the management information 33*b* whether the sound data has been purchased as the permanent type (S415).

In the processing of S415, if the M$^{th}$ sound data in the content state table 32*d* has not been purchased as the permanent type (S415: No), it is confirmed according to the management information 33*b* whether the subscription authority of the M$^{th}$ sound data in the content state table 32*d* is valid (S416).

In the processing of S416, if the subscription authority of the M$^{th}$ sound data in the content state table 32*d* is invalid (S416: No), the M$^{th}$ sound data of the subscription type in the content state table 32*d* is set to be invalid (S417). Accordingly, the sound data becomes unusable by the electronic musical instrument 30.

On the other hand, if the license type of the M$^{th}$ sound data in the content state table 32*d* is the permanent type in the processing of S414 (S414: "permanent"), if the M$^{th}$ sound data in the content state table 32*d* has been purchased as the permanent type in the processing of S415 (S415: Yes), or if the subscription authority of the M$^{th}$ sound data in the content state table 32*d* is valid in the processing of S416 (S416: Yes), the M$^{th}$ sound data of the subscription type in the content state table 32*d* is set to be valid (S418). Accordingly, the sound data becomes usable by the electronic musical instrument 30.

After the processings of S417 and S418, 1 is added to the counter variable M (S419), and it is confirmed whether the counter variable M is larger than the quantity of sound data in the content state table 32*d* (S420). In the processing of S420, if the counter variable M is equal to or less than the quantity of sound data in the content state table 32*d* (S420: No), the processing of S414 onwards is performed.

In the processing of S420, if the counter variable M is larger than the quantity of sound data in the content state table 32*d* (S420: Yes), the state of the sound data set to be valid/invalid by the processings of S417 and S418 is reflected in the content state table 32*d* to update the content state table 32*d* (S421).

After the processing of S421, the power-on counter 32*f* is set to 10 (i.e., the initial value) in response to reception being possible from the management information from the server 70 (S422). After the processing of S422, the upon-connection confirmation processing is ended.

Returning to FIG. 33, in the processing of S382, if the connection with the server 70 has failed (S382: No), it is confirmed whether a count of attempts to connect to the server 70 has reached an upper limit of a retry count (e.g., 10 times) (S384). In the processing of S384, if the count of attempts to connect to the server 70 is less than or equal to the retry count (S384: No), the processing of S382 onwards is repeated. On the other hand, in the processing of S384, if the count of attempts to connect to the server 70 exceeds the retry count (S384: Yes), a notification (error display) that the connection to the server 70 cannot be established is displayed on the LCD 36 (S385).

In the processing of S381, if the livelock flag 32e is on (S381: Yes), a limitation during turn-on of the livelock flag 32e, i.e., prohibition of storing timbre data to the timbre memory 32b and prohibition of adding new subscription-type sound data to the timbre memory 32b and the wave memory 32c, is instructed (S386). Afterwards, in the electronic musical instrument 30, it becomes not allowable to store subscription-type timbre data to the timbre memory 32b and add new subscription-type sound data to the timbre memory 32b and the wave memory 32c. After the processings of S383, S385, and S386, the electronic musical instrument upon-startup processing is ended.

That is, if the connection to the server 70 can be established (S382: Yes), validity/invalidity of the sound data is set based on the management information acquired from the server 70 by the upon-connection confirmation processing of S383. On the other hand, if the connection to the server 70 cannot be established (S382: No), the upon-connection confirmation processing of S383 is not executed, and validity/invalidity of the sound data is set based on the content state table 32d immediately before the connection to the server 70 becomes unestablishable according to the upon-startup confirmation processing of S380 which has been previously executed.

Further, if the livelock flag 32e is on (S381: Yes), the upon-connection confirmation processing of S382 is not executed, and validity/invalidity of the sound data is set based on the content state table 32d immediately before the livelock flag 32e is turned on according to the upon-startup confirmation processing of S380 which has been previously executed. At this time, according to the processing of S386, storage of subscription-type timbre data and addition of new subscription-type sound data are prohibited.

By setting validity/invalidity of sound data by the upon-startup confirmation processing and the upon-connection confirmation processing immediately after the power of the electronic musical instrument 30 is turned on, it is possible to reliably set validity/invalidity of the sound data when the connection with the server 70 cannot be established or the livelock flag 32e is turned on. Further, the sound data that are newly usable by the user H by, for example, newly purchasing the subscription authority can be appropriately used on the electronic musical instrument 30. On the other hand, it is possible to suppress illegally continuing to use the subscription-type sound data of the electronic musical instrument that has become unusable due to expiration of the subscription authority or a change to the subscription authority.

Further, management information is acquired from the server 70 by the upon-connection confirmation processing executed upon turn-on of the power of the electronic musical instrument 30, and validity/invalidity of the sound data is set based on the management information. For example, when the time period of the subscription authority of the user H has expired, the sound data of the subscription authority is set to be invalid by the upon-connection confirmation processing upon turn-on of the power of the electronic musical instrument 30 after the expiration of the time period. Accordingly, it is possible to appropriately set validity/invalidity of sound data of a subscription authority having an expiration date in the electronic musical instrument 30 without connecting a device for managing the time and date such as a real-time clock (RTC) to the electronic musical instrument 30.

Although the disclosure has been described based on the above embodiments, obviously various improvements or modifications may be made.

In the above embodiments, the communication device 1 is configured to be connected to the electronic musical instrument 30. However, the disclosure is not limited thereto. The communication device 1 may also be built in the electronic musical instrument 30, and the processing concerning the communication device 1 may also be executed by the electronic musical instrument 30. In this case, the device identifier is set as an identifier uniquely set for each electronic musical instrument 30, and such a device identifier or product information (i.e., device registration data) may be stored in the electronic musical instrument 30.

In the above embodiments, the communication device 1 is provided with the AP information 11d and the AP password 11e, and the AP 90 is connected by using the information about the AP 90 and the input PSW stored in the AP information 11d and the AP password 11e. However, the disclosure is not limited thereto. For example, the information about the AP 90 and the input PSW received from the mobile terminal 50 may be stored to the electronic musical instrument 30 (e.g., the flash ROM 32). When the communication device 1 is connected to the AP 90, the information about the AP 90 and the input PSW stored in the electronic musical instrument 30 may be acquired from the electronic musical instrument 30, and the AP 90 may be connected by using the acquired information about the AP 90 and the acquired input PSW.

In the above embodiments, the communication device 1 is provided with the operation button 2 and the LED 3, and by pressing and holding the operation button 2, the communication device 1 is caused to shift to the setup mode, and the LED 3 is caused to blink at this time. However, the disclosure is not limited thereto. For example, by a predetermined operation of the setting key 35 of the electronic musical instrument 30, the communication device 1 may be caused to shift to the setup mode, and the LCD 36 may display that the communication device 1 is in the setup mode. In this case, the operation button 2 and the LED 3 may be omitted from the communication device 1.

In the above embodiments, the server 70 creates the HTTPS access authorization information based on the user identifier of the user H and transmits the same to the communication device 1 and the mobile terminal 50, and reception of resources is performed by communication using the HTTPS protocol based on the HTTPS access authorization information from the communication device 1 and the mobile terminal 50. However, the authorization information created by the server 70 is not limited to the HTTPS access authorization information. The server 70 may create authorization information in other communication protocols and transmit the same to the communication device 1 and the mobile terminal 50, and the communication device 1 and the mobile terminal 50 may receive resources from the server 70 by using the authorization information transmitted from the server 70.

In the above embodiments, the AP 90 to be connected by Wi-Fi by the communication device 1 is selected by the user H by the mobile terminal 50, and the input PSW is inputted by the user H by the mobile terminal 50. However, the disclosure is not limited thereto. For example, in the case where the AP 90 that can be connected by the mobile terminal 50 is selected by the user H from the list of the APs 90 received from the communication device 1, input of the input PSW by the user H by the mobile terminal 50 may be omitted, and a password used by the mobile terminal 50 for connecting the AP 90 may be transmitted as the input PSW to the communication device 1. Further, in the case where the AP 90 that can be connected by the mobile terminal 50 is included in the list of APs 90 received from the communication device 1, selection of the AP 90 by the user H by the mobile terminal 50 may be omitted, the AP 90 that can be connected by the mobile terminal 50 may be automatically selected, and the information about the AP 90 concerning the AP 90 that can be connected by the mobile terminal 50 and a password used for connecting the AP 90 may be transmitted to the communication device 1.

In the above embodiments, the load history 72f stores a load count of the timbre data, but the disclosure is not limited thereto. Instead of a load count, the date and time when the timbre data is stored to the work memory 33a may be stored. Accordingly, for example, when the user H instructs from the mobile terminal 50 to load the electronic musical instrument 30, by preferentially displaying on the LCD 56 the timbre data frequently used on the date and time period of loading, it is possible to prompt the user H to use the timbre data preferred by the user H on this date and time period.

In the above embodiments, in the case where the communication with the server 70 cannot be established, the time period of setting validity or invalidity of the sound data based on the content state table 32d has been set to a time period from when the communication with the server 70 becomes unestablishable to when the power of the electronic musical instrument 30 has been turned on 10 times. However, the disclosure is not limited thereto, and the time period may also be set to end when the power of the electronic musical instrument 30 has been turned on 10 times or less (e.g., 5 times) or 10 times or more (e.g., 30 times). Further, the above number of times may be changed according to the user H. For example, the higher the rank of the subscription authority (e.g., "professional" and "ultimate") of the user H, or the larger the quantity (e.g., 10 or more) of permanent-type sound data purchased by the user H, the larger the above number of times (e.g., 50 times) may be set.

Further, in the case where the communication with the server 70 cannot be established, the time period of setting validity or invalidity of the sound data based on the content state table 32d may also be set to end when an operating time of the electronic musical instrument 30 accumulated since the communication with the server 70 turns into an unestablishable state reaches a predetermined time (e.g., 10 hours).

Further, in the electronic musical instrument 30, in the case where the communication with the server 70 cannot be established, the mobile terminal 50 may receive the management information of the server 70, the received management information may be transmitted from the mobile terminal 50 to the communication device 1 and the electronic musical instrument 30 via Bluetooth or the like, and validity or invalidity of the sound data of the electronic musical instrument 30 may be set based on the management information received by the electronic musical instrument 30.

Further, the management information acquired from the server 70 may be stored to a storage medium such as a USB memory, and in the case where the electronic musical instrument 30 cannot communicate with the server 70, the management information may be acquired from the storage medium connected to the external IF 37, and validity and invalidity of the sound data may be set based on the acquired management information.

Further, in the time period of setting validity or invalidity of the sound data based on the content state table 32d in the case where the communication with the server 70 cannot be established, the same limitation on the sound data as in the case where the livelock flag 32e is turned on may also applied.

In the above embodiments, the limitation is imposed on the subscription-type sound data while the livelock flag 32e is on in the electronic musical instrument 30. However, the disclosure is not limited thereto, and the limitation may also be imposed on the permanent-type sound data, and the limitation may also be imposed on both the subscription-type and the permanent-type sound data. Further, it is also possible not to impose a limitation on the sound data while the livelock flag 32e is on.

Further, as the limitation imposed while the livelock flag 32e is on, storage of subscription-type timbre data and addition of new subscription-type sound data are prohibited. However, the imposed limitation is not limited thereto, other limitations may also be imposed, such as prohibition of backup/restoration of sound data, prohibition of import/export of sound data, shortening of the time period of the subscription authority (e.g., shortening by one month per lock instruction). Further, turn-on of the livelock flag 32e may be allowed in the case where the user H is charged a predetermined amount of money (e.g., $10 is charged for each turn-on of the livelock flag 32e).

Further, the limitation imposed in the case where the livelock flag 32e is on may be changed according to the user H. For example, if the user H has a high rank of subscription authority (e.g., "professional" or "ultimate"), or if the quantity of permanent-type sound data purchased by the user H is large (e.g., 10 or more), the above limitation may be set to only one of prohibition of storage of subscription-type timbre data and prohibition of addition of new subscription-type sound data.

Further, in the above embodiments, subtraction of the power-on counter 32f is suppressed in the case where the livelock flag 32e is on (FIGS. 34, S399 to S401). However, the disclosure is not limited thereto, and subtraction of the power-on counter 32f may also be performed in the case where the livelock flag 32e is on. Accordingly, even if the livelock flag 32e is on, in the case where the electronic musical instrument 30 continues to be unable to connect with the server 70 up to when the power of the electronic musical instrument 30 has been turned on 10 times, since the subscription-type sound data becomes unusable, it is possible to prevent the sound data from being used for an unreasonably long period of time.

In the above embodiments, the upon-connection confirmation processing of S383 is executed in the case where the power of the electronic musical instrument 30 is turned on and the connection with the server 70 is successful (FIG. 33, S382). However, the disclosure is not limited thereto, and the upon-connection confirmation processing may also be executed at any timing after the connection with the server 70 is successful. For example, by repeatedly executing the upon-connection confirmation processing at intervals of 10 minutes, the valid/invalid state of the sound data stored in the management information 72g of the server 70 can be reflected in the electronic musical instrument 30 in real time.

In the above embodiments, the communication system S is composed of the electronic musical instrument 30 to which the communication device 1 is connected, the mobile terminal 50, and the server 70. However, the disclosure is not limited thereto. The mobile terminal 50 may be equipped with the function of the server 70, and the server 70 may be omitted from the communication system S. Alternatively, the server 70 may be equipped with the function of the mobile terminal 50, and the mobile terminal 50 may be omitted from the communication system S.

In the above embodiments, by connecting the communication device 1 to the AP 90 by Wi-Fi, and by connecting the AP 90 to the Internet N, the communication device 1 communicates with the server 70 via the Internet N. However, the disclosure is not limited thereto. For example, the communication device 1 may be connected to the base station 100 and be connected to the Internet N via the base station 100 in the same manner as the mobile terminal 50. In this case, the base station 100 to which the communication device 1 is connected and the base station 100 to which the mobile terminal 50 is connected do not have to be the same base station. The communication device 1 may be connected to the AP 90 by a wireless communication standard other than Wi-Fi, or the communication device 1 and the Internet N may be connected by wired communication.

By connecting the mobile terminal 50 to the base station 100 and connecting the base station 100 to the Internet N, the mobile terminal 50 communicates with the server 70 via the Internet N. However, the disclosure is not limited thereto. For example, the mobile terminal 50 may be connected to the AP 90 by Wi-Fi and may be connected to the Internet N via the AP 90. In this case, the AP 90 to which the communication device 1 is connected and the AP 90 to which the mobile terminal 50 is connected do not have to be the same access point. The mobile terminal 50 and the Internet N may also be connected by wired communication.

In the above embodiments, the communication device 1 and the mobile terminal 50 communicate with each other by Bluetooth. However, the disclosure is not limited thereto. For example, the communication device 1 and the mobile terminal 50 may be communicated by other short-range wireless communication standards such as ZigBee, or the communication device 1 and the mobile terminal 50 may be wire-connected for communication.

In the above embodiments, the mobile terminal 50 has been described as an example of the terminal to which an instruction is inputted from the user H. However, the disclosure is not limited thereto. For example, a personal computer or a tablet terminal may also serve as the terminal to which an instruction is inputted from the user H.

In the above embodiments, the electronic musical instrument 30 has been described as the electronic device to which the communication device 1 is connected. However, the disclosure is not limited thereto. A video device for processing a video or another device such as an audio device, a mixer, an effector, and an amplifier may also serve as the electronic device to which the communication device 1 is connected. At this time, as resources, instead of the sound data described above, the server 70 may store various data usable by the electronic device, such as video data, audio data, data concerning video editing such as scene switching, function expansion data which expand the functions of the electronic device, updater, automatic performance data, as well as content data such as tunes, lyrics, musical scores, etc. Further, by executing the control program 32a on a computer such as a PC or a tablet terminal, operations equivalent to those of the electronic musical instrument 30 of the above embodiments may be realized on the computer.

What is claimed is:

1. An electronic device connected to a server which stores, for each user, management information related to allowability of use of data of a subscription type permitted to be used within a predetermined period without being connected to a device for keeping and managing time and date, the electronic device comprising:
   a storage which stores the data;
   and a processor configured to:
   establish a communication with the server to confirm, with the server, management information comprising a subscription authority of a desired level owned by a user of the electronic device, wherein the subscription authority indicates a contract type for the user to use the data and is set to a plurality of levels of authority for acquiring at least a portion of the data;
   permit using, in the electronic device, data deemed usable at the desired level indicated by the subscription authority in the confirmed management information, among data of the subscription type stored in the storage;
   prohibit using, in the electronic device, data deemed unusable in the confirmed management information, among data of the subscription type stored in the storage, comprising prohibiting storing edited timbre data in the storage;
   accumulate a number of times that power of the electronic device has been turned on since the communication with the server became unestablishable;
   and permit using, in the electronic device, the data of the subscription type stored in the storage based on the confirmed management information before communication with the server became unestablishable for a time period from when communication with the server becomes unestablishable to when the accumulated number of times reaches a predetermined number of times, comprising allowing storing edited timber data in the storage.

2. The electronic device according to claim 1, wherein the processor confirms the management information of the user on the server based on information of the electronic device.

3. The electronic device according to claim 1, wherein the processor confirms the management information of the user on the server based on information of the user who uses the electronic device.

4. The electronic device according to claim 1, wherein the processor prohibits using, in the electronic device, data of the subscription type stored in the storage in a case where an unestablishable state of communication with the server has continued for the prescribed period or more.

5. The electronic device according to claim 1, wherein the storage stores information of the data of the subscription type made usable by the processor in the confirmed management information, wherein in a case where communication with the server cannot be established, for a prescribed period, the processor permits using, in the electronic device, data of the subscription type stored in the storage based on the information of the data of the subscription type stored in the storage.

6. The electronic device according to claim 1, wherein the confirming, the permitting and the prohibiting are executed after power of the electronic device is turned on.

7. The electronic device according to claim 1, wherein the management information of the server stores, for each user, information related to allowability of use of data of a permanent type permitted to be used permanently, and the processor permits using, in the electronic device, data deemed usable in confirmed management information, among data of the permanent type stored in the storage.

8. The electronic device according to claim 1, wherein the electronic device is an electronic musical instrument.

9. The electronic device according to claim 1, wherein the data are sound data.

10. The electronic device according to claim 1, wherein the data are function expansion data.

11. The electronic device according to claim 1, wherein the data are content data.

12. A data usage method executed in an electronic device connected to a server which stores, for each user, management information related to allowability of use of data of a subscription type permitted to be used within a predetermined period without being connected to a device for keeping and managing time and date, the data usage method comprising:
- establishing a communication with the server to confirm, with the server, management information comprising a subscription authority owned by a user of the electronic device wherein the subscription authority indicates a desired level among a plurality of levels of authority for the use of data;
- permitting using, in the electronic device, data deemed usable at the desired level indicated by the subscription authority in the confirmed management information, among data of the subscription type stored in a storage of the electronic device;
- prohibiting using, in the electronic device, data deemed unusable in the confirmed management information, among data of the subscription type stored in the storage, comprising prohibiting storing edited timbre data in the storage;
- accumulating a number of times that power of the electronic device has been turned on since the communication with the server became unestablishable; and
- permitting using, in the electronic device, the data of the subscription type stored in the storage based on the confirmed management information before communication with the server became unestablishable for a time period from when communication with the server becomes unestablishable to when the accumulated number of times reaches a predetermined number of times, comprising allowing storing edited timber data in the storage.

13. A non-transitory computer readable recording medium, storing an electronic device program causing a computer to execute a usage processing of data of a subscription type permitted to be used within a predetermined period, wherein the computer comprises a storage and is connected to a server which stores, for each user, management information related to allowability of use of the data without being connected to a device for keeping and managing time and date, the electronic device program causing the computer to:
- operate the storage which stores the data;
- establish a communication with the server to confirm, with the server, management information comprising a subscription authority owned by the user of the computer, wherein the subscription authority indicates a desired level among a plurality of levels of authority for the use of data;
- permit using data deemed usable at the desired level indicated by the subscription authority in the confirmed management information, among data of the subscription type stored in the storage;
- prohibit using, in the computer, data deemed unusable in the confirmed management information, among data of the subscription type stored in the storage, comprising prohibiting storing edited timbre data in the storage;
- accumulate a number of times that power of the electronic device has been turned on since the communication with the server became unestablishable; and
- permit using the data of the subscription type stored in the storage based on the confirmed management information before communication with the server became unestablishable for a time period from when communication with the server becomes unestablishable to when the accumulated number of times reaches a predetermined number of times, comprising allowing storing edited timber data in the storage.

* * * * *